US007016940B2

(12) United States Patent
Matsuda et al.

(10) Patent No.: US 7,016,940 B2
(45) Date of Patent: Mar. 21, 2006

(54) RECEIVING APPARATUS AND METHOD, SENDING APPARATUS AND METHOD, RECORDING MEDIUM, AND COMMUNICATION SYSTEM

(75) Inventors: Koichi Matsuda, Tokyo (JP); Hiroshi Ueno, Tokyo (JP)

(73) Assignee: Sony Corporation, Tokyo (JP)

(*) Notice: Subject to any disclaimer, the term of this patent is extended or adjusted under 35 U.S.C. 154(b) by 794 days.

(21) Appl. No.: 09/929,052

(22) Filed: Aug. 15, 2001

(65) Prior Publication Data
US 2002/0049819 A1   Apr. 25, 2002

(30) Foreign Application Priority Data

Aug. 24, 2000   (JP)   ............................. 2000-253333
Mar. 29, 2001   (JP)   ............................. 2001-096789

(51) Int. Cl.
*G06F 15/16*   (2006.01)
(52) U.S. Cl. ...................................... 709/206; 709/202
(58) Field of Classification Search ................ 709/206
See application file for complete search history.

(56) References Cited

U.S. PATENT DOCUMENTS

| | | | |
|---|---|---|---|
| 6,179,713 B1 * | 1/2001 | James et al. ................... 463/42 |
| 6,219,054 B1 * | 4/2001 | Komoda et al. ............. 715/841 |
| 6,336,216 B1 * | 1/2002 | Curtis et al. ................... 717/11 |
| 6,539,396 B1 * | 3/2003 | Bowman-Amuah ..... 707/103 R |

2002/0160836 A1 *  10/2002  Watanabe et al. ............. 463/42

FOREIGN PATENT DOCUMENTS

WO   WO 92/22033   12/1992
WO   WO 99/20014   4/1999

OTHER PUBLICATIONS

PBEM Panzer General Procedures (play by mail for Panzer General video game); www.wargamer.com/pg/addons/PBEM_Inst.txt; 9 pages.*
U.S. Appl. No. 09/929,052, filed Aug. 15, 2001, Pending.
U.S. Appl. No. 10/107,406, filed Mar. 28, 2002, Pending.
Y. Sakama, et al., NTT Review, Telecommunications Association, vol. 9, No. 3, XP-000694464, pp. 40-48, "Agent Communications on OCN", May 1, 1997.

* cited by examiner

*Primary Examiner*—John B. Walsh
(74) *Attorney, Agent, or Firm*—Obllon, Spivak, McClelland, Maier & Neustadt, P.C.

(57) ABSTRACT

Disclosed is a receiving apparatus and method, a sending apparatus and method, recording medium, and a communication system for sending or receiving electronic mail. In operatively associated with a command for opening an electronic mail message, a syntax analysis module extracts a script attached to the electronic mail message as an attachment file and analyzes the syntax of the extracted script. An execution module executes processing corresponding to the data accompanying the script or an input event. An output module controls the outputting of the results of this processing. With this configuration, a sender of electronic mail is allowed to make its recipient to quickly and securely take actions desired by the sender.

8 Claims, 40 Drawing Sheets

F I G. 3
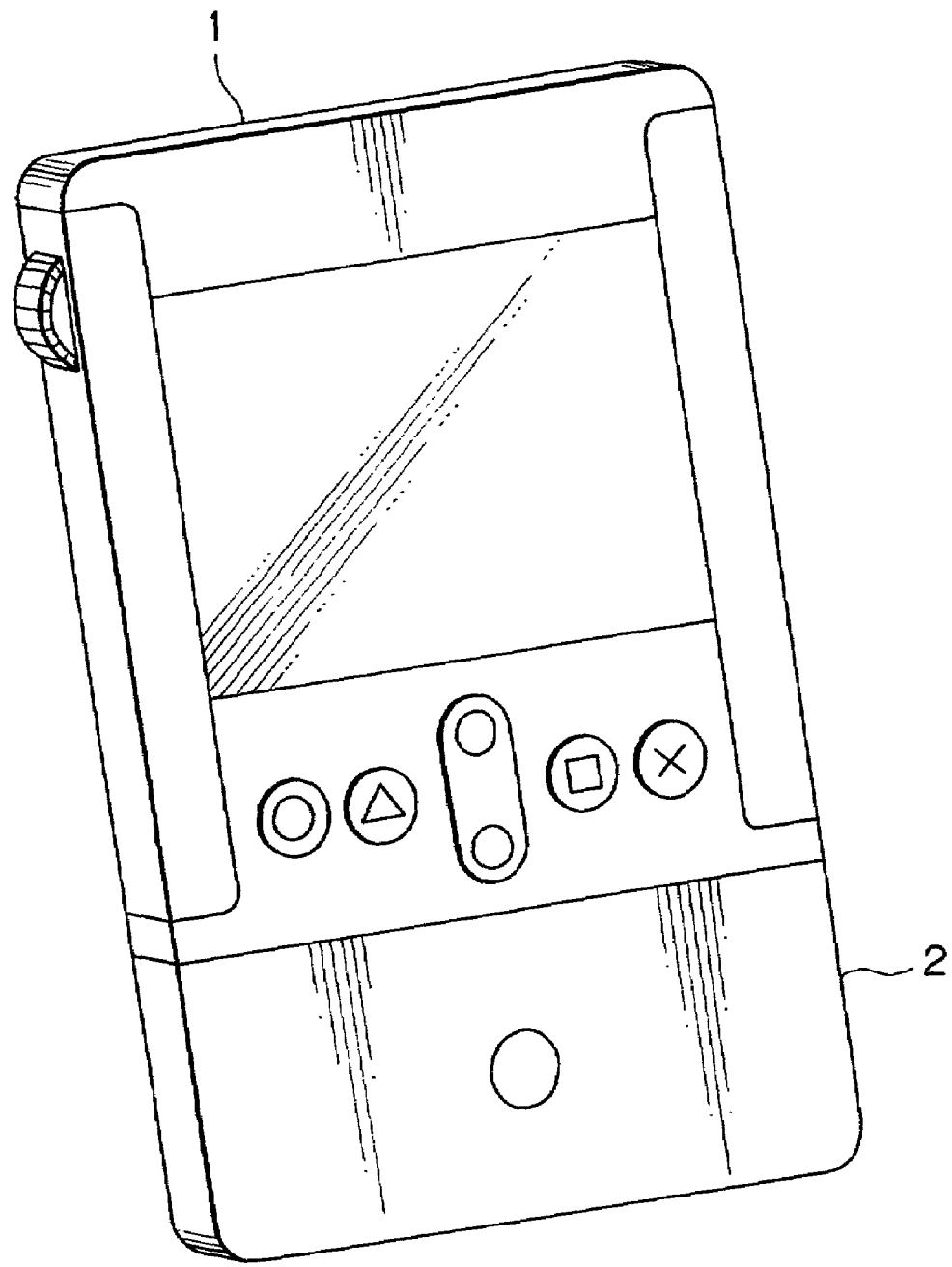

FIG. 15

BODY
```
To: "Someone" <someone@sony.co.jp>
Subject:othello
MIME-Version: 1.0
Content-Type: multipart/mixed;
boundary="----=_NextPart_000_0011_01BFA9E7.2EE28580"

------=_NextPart_000_0011_01BFA9E7.2EE28580
Content-Type: text/plain;
          charset="iso-2022-jp"
Content-Transfer-Encoding: 7bit Second move of Othello
```

SCRIPT
```
------=_NextPart_000_0011_01BFA9E7.2EE28580
Content-Type: application/x-emma <SCRIPT LANGUAGE=emmascript>
function othello() {
        show() ;
}
function ontap() {
        var x = getx() ;
        var y = gety() ;
        if(check(x,y)==false) {
                confirm("error")
                return;
        }
        update(x,y);
        Sendmail(getsender());
        exit;
}
function onload() {
        othello() ;
}
...
</SCRIPT>

------=_NextPart_000_0011_01BFA9E7.2EE28580--

----Next_Part(Wed_Apr_19_11:42:48_2000_705)----
```

FIG. 17

```
------=_NextPart_000_0011_01BFA9E7.2EE28580
Content-Type: application/x-emma <SCRIPT LANGUAGE=javascript>
function othello() {
        show() ;
}
function ontap() {
        var x = getx() ;
        var y = gety() ;
        if(check(x,y)==false) {
             confirm("error")
             return;
        }
        update(x,y);
        sendmail(getsender());
        exit;
}
function onload() {
        othello() ;
}
...
</SCRIPT>
```

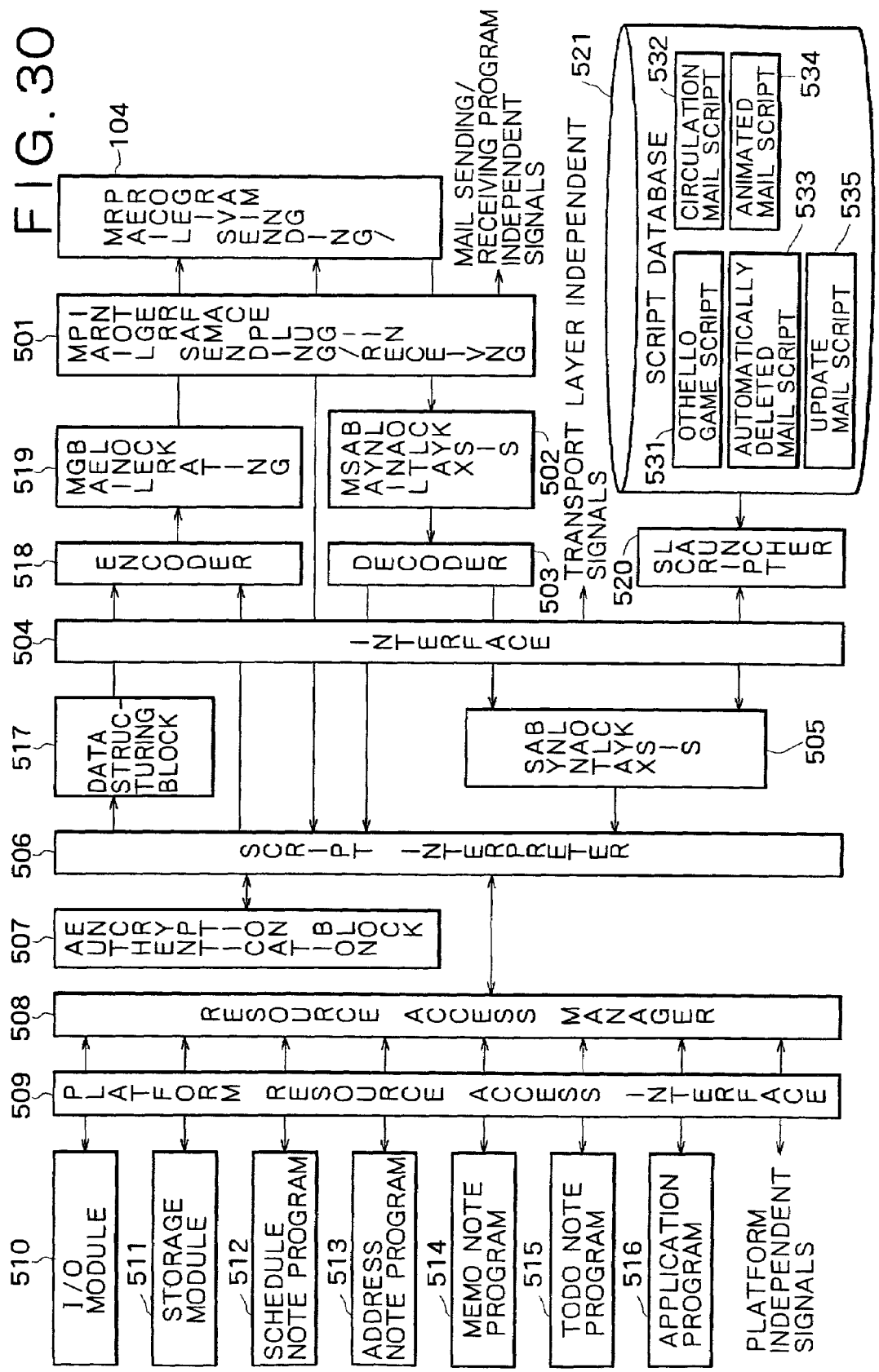

FIG. 31

```
To: "Someone" <someone@sony.co.jp>
Subject: othello
MIME-Version: 1.0
Content-Type: multipart/mixed;
boundary="----=_NextPart_000_0011_01BFA9E7.2EE28580"

------=_NextPart_000_0011_01BFA9E7.2EE28580
Content-Type: text/plain;
        charset="iso-2022-jp"
Content-Transfer-Encoding: 7bit Second move of Othello
```
(BODY)

```
------=_NextPart_000_0011_01BFA9E7.2EE28580
Content-Type: application/x-emma <SCRIPT LANGUAGE=emmascript>
function othello() {
        show() ;
}
function ontap() {
        var x = getx() ;
        var y = gety() ;
        if(check(x,y)==false) {
                confirm("error")
                return;
        }
        update(x,y);
        Sendmail(getsender());
        exit;
}
function onload() {
        othello() ;
}
...
</SCRIPT>
</SIGNATURE>
347a9d8684ab96533fb6b51906facf9
</SIGNATURE>

------=_NextPart_000_0011_01BFA9E7.2EE28580--

----Next_Part(Wed_Apr_19_11:42:48_2000_705)----
```
(SCRIPT)

RECEIVING APPARATUS AND METHOD, SENDING APPARATUS AND METHOD, RECORDING MEDIUM, AND COMMUNICATION SYSTEM

BACKGROUND OF THE INVENTION

The present invention relates generally to a receiving apparatus and method, a sending apparatus and method, recording medium, and a communication system and, more particularly, to a receiving apparatus and method, a sending apparatus and method, recording medium, and a communication system for sending or receiving electronic mail.

Today, systems for sending/receiving text-based data via networks for example, or so-called electronic mail systems are in wide use.

A receiving apparatus which receives electronic mail (hereafter also referred to simply as mail) displays the received mail in the form of text.

There may be a situation in which a sender of mail desires that its recipient take some action as a result of receiving the mail.

A problem, however, is that the action to be taken by the recipient of electronic mail as desired by the sender of mail may not always be taken.

For example, the action desired by the sender of mail is not taken unless its recipient reads the mail, correctly understands its contents, and takes the action accordingly.

Likewise, if the data is attached to electronic mail, the required action will not be taken unless the application program corresponding to the data has not been executed on the recipient side.

For example, if a confirmation of attending a party is sent in electronic mail, the sender expects the recipient to read the mail and return an answer whether or not to attend the party.

However, in the conventional technologies, for the sender to receive the answer from the recipient, the recipient must correctly understand the contents of the received electronic mail, check the schedule of the party, write whether or not the recipient will attend the party to the return mail, and return that mail to the sender.

However, there is no guarantee that the sender can always receive the return mail of attendance/absence from the recipient.

This problem may be circumvented by attaching mail with an application program for making the recipient return mail. In this case, the recipient must activate the application program.

If a game such as Othello is executed via electronic mail for example, the Othello board may be described with symbols "+" and "−" and pieces with black and white dot symbols to exchange boards and pieces in the form of text, thereby making moves of the game.

However, every time a new move is inserted, the alignment of these symbols is disordered, so that each player must correct the alignment in each move.

It may be also possible to describe the contents of a game screen in PowerPoint (trademark) (an application program by Microsoft Corporation) for example and send the generated file along with electronic mail. In this case, however, the recipient must activate the corresponding application program every time he receives the electronic mail. Therefore, unless the recipient has the corresponding application program, he cannot view the game screen.

Further, in the case of Othello for example, each player must determine whether a new move has been made in accordance with the rules of the game and turn over the piece on the basis of the new move, which sometimes causes an error.

SUMMARY OF THE INVENTION

It is therefore an object of the present invention to make the recipient of electronic mail quickly and surely take actions desired by the sender.

[Means for Solving the Problem]

In carrying out the invention and according to a first aspect thereof, there is provided a receiving apparatus for receiving mail, comprising: extracting means for extracting a script attached to the mail as an attachment file in operative association with a command for opening the mail; executing means for executing syntax analysis on the extracted script; and output control means for executing processing corresponding to data accompanying the script or an input event and controlling the output of a result of the processing.

In carrying out the invention and according to a second aspect thereof, there is provided a receiving method for a receiving apparatus for receiving mail, comprising the steps of: extracting a script attached to the mail as an attachment file in operative association with a command for opening the mail; executing syntax analysis on the extracted script; and executing processing corresponding to data accompanying the script or an input event and controlling the output of a result of the processing.

In carrying out the invention and according to a third aspect thereof, there is provided a first recording medium storing a computer-readable program for processing reception of mail, comprising the steps of: extracting a script attached to the mail as an attachment file in operative association with a command for opening the mail; executing syntax analysis on the extracted script; and executing processing corresponding to data accompanying the script or an input event and controlling the output of a result of the processing.

With these configurations, a script attached to electronic mail as an attachment file is extracted in operative association with a command for opening the electronic mail, the syntax of the extracted script is analyzed, the data accompanying the script or an input event is processed, and the outputting of a processing result is controlled. Consequently, the sender of electronic mail can make its recipient quickly and securely take actions desired by the sender.

In carrying out the invention and according to a fourth aspect thereof, there is provided a sending apparatus for sending mail comprising: generating means for generating, by executing a first script, a second script to be stored in the mail; storage means for storing the second script into the mail; and sending control means for controlling the sending of the mail storing the second script.

In carrying out the invention and according to a fifth aspect thereof, there is provided a sending method for a sending apparatus for sending mail, comprising the steps of: generating, by executing a first script, a second script to be stored in the mail; storing the second script into the mail; and controlling the sending of the mail storing the second script.

In carrying out the invention and according to a sixth aspect thereof, there is provided a second recording medium storing a computer-readable program for processing sending of mail, the program comprising the steps of: generating, by executing a first script, a second script to be stored in the mail; storing the second script into the mail; and controlling the sending of the mail storing the second script.

With these configurations, by the execution of a first script, a second script is generated, the second script is stored in electronic mail, and the sending of the electronic mail having the second script is controlled. Consequently, the sender of electronic mail can make its recipient quickly and securely take actions desired by the sender.

In carrying out the invention and according to a seventh aspect thereof, there is provided a communication system having a sending apparatus for sending mail and a receiving apparatus for receiving the mail, wherein the sending apparatus comprising: generating means for generating, by executing a first script, a second script to be stored in the mail; storage means for storing the second script into the mail; and sending control means for controlling the sending of the mail storing the second script; the receiving apparatus comprising: extracting means for extracting the second script in operative association with a command for opening the mail; executing means for executing syntax analysis on the extracted second script; and output control means for executing processing corresponding to data accompanying the second script or an input event and controlling the output of a result of the processing.

With this configuration, by the execution of a first script, a second script to be stored in electronic mail is generated, the second script is stored in electronic mail, the sending of the electronic mail having the second script is controlled, the second script is extracted in operative association with a command for opening the electronic mail, the syntax of the extracted second script is analyzed, the processing corresponding to the data accompanying the second script or an input event is executed, and the outputting of the processing result is controlled. Consequently, the sender of electronic mail can make its recipient quickly and securely take actions desired by the sender.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 3 is a perspective view illustrating the PDA held in a cradle.

FIG. 15 is a diagram illustrating an example of mail message.

FIG. 17 is a diagram illustrating an exemplary script.

FIG. 30 is a block diagram illustrating a detailed configuration of the interpreter.

FIG. 31 is a diagram illustrating an example of mail message including a script storing authentication data.

DETAILED DESCRIPTION OF PREFERRED EMBODIMENTS

Figure 1:
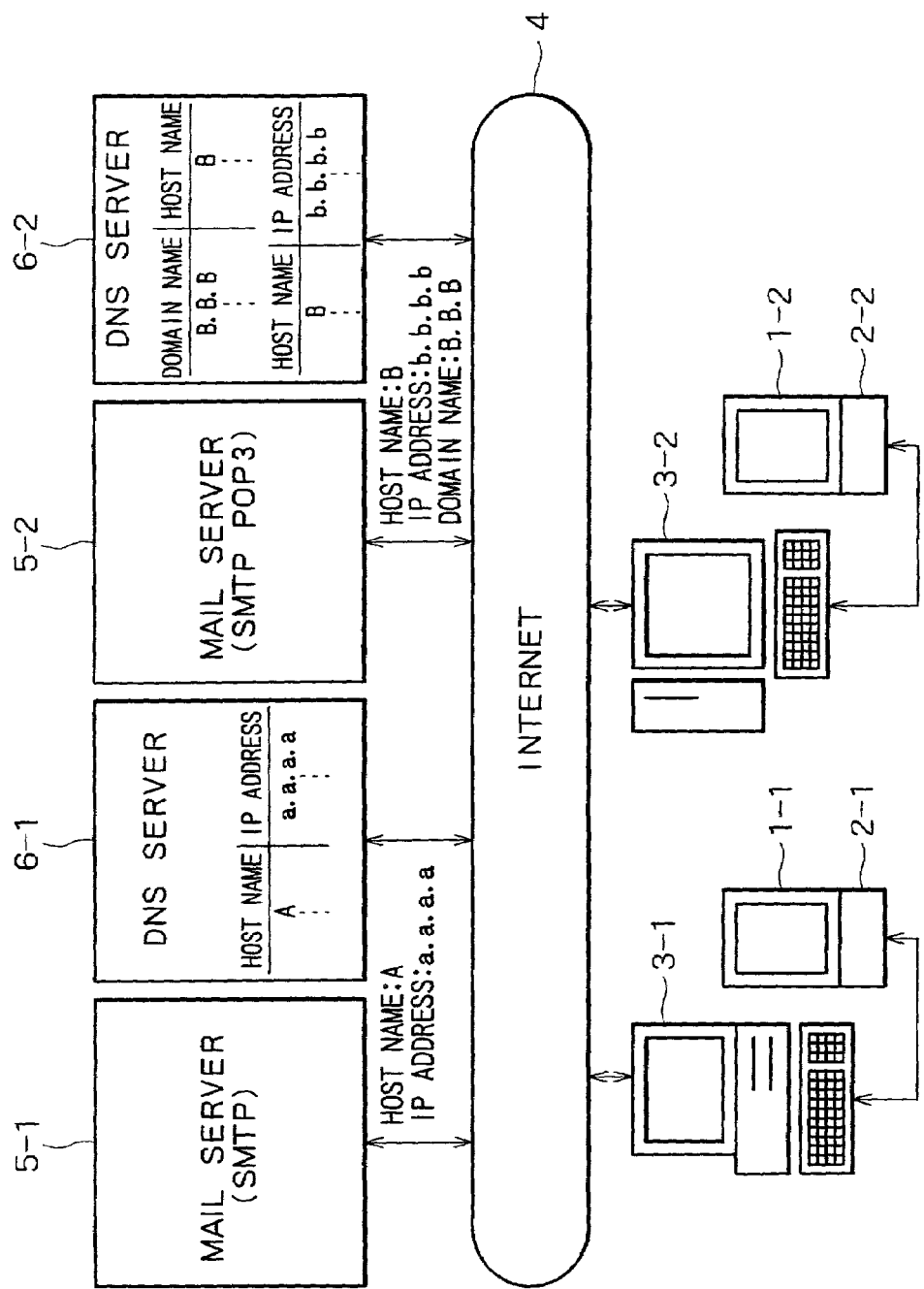
FIG. 1 is a block diagram illustrating a mail sending/receiving system practiced as one embodiment of the invention.

Now, referring to FIG. 1, there is shown a block diagram illustrating a mail sending/receiving system practiced as one embodiment of the invention. A PDA (Personal Digital Assistant) 1-1, loaded in a cradle 2-1, is connected to a personal computer 3-1 via the cradle 2-1.

The PDA 1-1 sends electronic mail to a PDA 1-2 via the cradle 2-1, the personal computer 3-1, the Internet 4, mail servers 5-1 and 5-2, and DNS (Domain Name System) servers 6-1 and 6-2. The PDA 1-2 extracts a script (written in Java for example) if any from the received mail and executes the extracted script.

The PDA 1-2, loaded in a cradle 2-2, is connected to a personal computer 3-2 via the cradle 2-2.

The PDA 1-2 sends mail to the PDA 1-1 via the cradle 2-2, the personal computer 3-2, the Internet 4, the mail servers 5-1 and 5-2, and the DNS servers 6-1 and 6-2. The PDA 1-1 extracts a script if any from the received mail and executes the extracted script.

The cradle 2-1 is connected to the PDA 1-1 and the personal computer 3-1 by the serial communication based on USB (Universal Serial Bus) or RS232C. The cradle 2-1 has a terminal for connection with the PDA 1-1 and a cable for connection with the personal computer 3-1 and executes mail sending/receiving between the loaded PDA 1-1 and the personal computer 3-1. Also, the cradle 2-1 supplies power to the loaded PDA 1-1.

The personal computer 3-1 is connected to the PDA 1-1 via the cradle 2-1 and to the Internet 4 via a public switched telephone line and an Internet connection service provider, not shown. The personal computer 3-1 sends electronic mail received from the PDA 1-1 to the mail server 5-1 via the Internet 4 and electronic mail received from the mail server 5-1 to the PDA 1-1.

The cradle 2-2 is connected to the PDA 1-2 and the personal computer 3-2 by the serial communication based on USB or RS232C. The cradle 2-2 has a terminal for connection with the PDA 1-2 and a cable for connection with the personal computer 3-2 and executes mail sending/receiving between the loaded PDA 1-2 and the personal computer 3-2. Also, the cradle 2-2 supplies power to the loaded PDA 1-2.

The personal computer 3-2 is connected to the PDA 1-2 via the cradle 2-2 and to the Internet 4 via a public switched telephone line and an Internet connection service provider, not shown. The personal computer 3-2 sends electronic mail received from the PDA 1-2 to the mail server 5-2 via the Internet 4 and electronic mail received from the mail server 5-2 to the PDA 1-2.

The mail server 5-1 receives electronic mail from the PDA 1-1 or PDA 1-2 via the Internet 4 and, if the domain of the address of the received mail does not correspond to the mail server 5-1, transfers the mail to another mail server, for example, the mail server 5-2. The mail server 5-1 receives electronic mail transferred from the mail server 5-2 via the Internet 4 and, if the domain of the address of the received mail does not correspond to the mail server 5-2, transfers the mail to another mail server, not shown.

If the domain of the address of electronic mail received from the PDA 1-1 or PDA 1-2 or the mail server 5-2 via the Internet 4 corresponds to the mail server 5-1, the mail server 5-1 stores the received mail into its mail box called a spool.

The mail server 5-2 receives electronic mail from the PDA 1-1 or PDA 1-2 via the Internet 4 and, if the domain of the address of the received mail does not correspond to the mail server 5-2, transfers the mail to another mail server, for example, the mail server 5-1. The mail server 5-2 receives electronic mail transferred from the mail server 5-1 via the Internet 4 and, if the domain of the address of the received mail does not correspond to the mail server 5-2, transfers the mail to another mail server, not shown.

If the domain of the address of electronic mail received from the PDA 1-1 or PDA 1-2 or the mail server 5-1 via the Internet 4 corresponds to the mail server 5-2, the mail server 5-2 stores the received mail into its mail box called a spool.

When the DNS server 6-1 receives a host name from the PDA 1-1 or PDA 1-2 or the mail server 5-1 or 5-2, the DNS server 6-1 sends the IP (Internet Protocol) address corresponding to the received host name to the sender thereof.

When the DNS server 6-1 receives a domain name from the mail server 5-1 or 5-2, the DNS server 6-1 sends the host name of the mail server (for example, the mail server 5-1 or 5-2) corresponding to the received domain name to the sender thereof.

When the DNS server 6-2 receives a host name from the PDA 1-1 or PDA 1-2 or the mail server 5-1 or 5-2, the DNS server 6-2 sends the IP address corresponding to the received host name to the sender thereof.

When the DNS server 6-2 receives a domain name from the mail server 5-1 or 5-2, the DNS server 6-2 sends the host name of the mail server (for example, the mail server 5-1 or 5-2) corresponding to the received domain name to the sender thereof.

In what follows, the PDA 1-1 and the PDA 1-2 are generically referred simply as a PDA 1 unless otherwise notified. Likewise, the cradle 2-1 and the cradle 2-2 as a cradle 2, and the personal computer 3-1 and the personal computer 3-2 as a personal computer 3.

The following describes mail sending/receiving processing to be executed via the Internet 4.

The sending and receiving of electronic mail via the Internet 4 is very much like those of postal mail. In postal mail, a letter arrives at its recipient in four steps; (I) write a letter, (II) put it into a post, (III) send/receive it between post offices, and (IV) deliver it to its recipient.

In electronic mail based on the Internet, mail arrives at its recipient in four steps; (I) write mail by use of a mail sending/receiving program, (II) press the send button of this program upon finishing the writing, (III) transfer mail between mail servers, and (IV) the recipient presses the receive button of his mail sending/receiving program.

The mail sending/receiving program sends and receive electronic mail. The mail sending/receiving program is also called a mailer and has the capabilities equivalent to the mail box on the road and the letter box at home.

Most mail sending/receiving programs have capabilities of displaying mail on a display screen or editor capabilities for mail writing. The user operates the mail sending/receiving program to send and receive electronic mail.

Typical mail sending/receiving programs are Outlook Express (trademark) of Microsoft Corporation, Eudora Pro (trademark) of QUALCOMM Incorporated, and such free software as Becky! InterMail, and Al-Mail32, for example.

Each mail server has a role of the post office, so to speak. The mail server receives mail sent from a mail sending/receiving program and sends the received mail to a mail sending/receiving program. A typical mail server program is Sendmail (trademark) of Sendmail Incorporated, for example.

The mail server has three main roles. First, the mail server properly sends mail received from a mail sending/receiving program to another mail server. Second, the mail server arranges the mail received from another mail server as classified by destination (or recipient) and manages the mail thus arranged. Third, the mail server sends the managed mail to mail sending/receiving programs upon their requests.

Processing of the mail sending/receiving program for sending mail to a mail server is different from the processing of the mail server for sending mail to the mail sending/receiving program in processing procedure and communication procedure.

The processing procedure is referred to as a protocol. The processing of the mail sending/receiving program for sending mail to the mail server and the processing of the mail server for sending mail to another mail server are executed on the basis of SMTP (Simple Mail Transfer Protocol) in many cases.

The processing of the mail sending/receiving program for receiving mail from the mail server is executed on the basis of POP3 (Post Office Protocol Version 3) in many cases.

The mail server has different ports for SMTP and POP3. The mail sending/receiving program, when sending mail, communicates with the mail server via the port corresponding to SMTP and, when receiving mail, communicates with the mail server via the port corresponding to POP3.

In the case of postal mail, a letter sent from abroad is postmarked every time it passes a country. Likewise, electronic mail is marked.

When electronic mail is sent, the head part of the body of the mail is postmarked every time it passes a mail server. This postmark is called a header because it is attached to the head of the mail.

The header is broadly divided into three blocks; the lowest part (nearest to the body) of mail is a block which is attached by the mail sending/receiving program and the upper two parts are blocks which are attached by the mail server.

The header stores more recent information as these parts go up.

The header information attached by the mail sending/receiving program is similar to the address of postal mail. "From" stores the mail address of the sender, "To" stores the address of the recipient, and "Subject" stores the title of that mail message.

Of the blocks attached by the mail server, "Received" stores a time stamp. "From" stores the name of the server through which this mail has passed.

Each mail server attaches each passing mail with this block "Received." Therefore, sequentially checking the "Received" blocks from bottom to top indicates the mail servers through this mail has passed.

The following describes the setting of the mail sending/receiving program. The information which must be properly set for sending mail includes the electronic mail address corresponding to the mail sending/receiving program and the host name of the mail server corresponding to SMTP.

The electronic mail address corresponding to the mail sending/receiving program is the address of the sender corresponding to sender's name. If the electronic mail address corresponding to the mail sending/receiving program is not set, the recipient cannot know its sender. If the destination address is not known, the mail cannot be returned.

The mail sending/receiving program inserts the electronic mail address corresponding thereto into the "From" line in the header. The electronic mail address corresponding to the mail sending/receiving program is also used as the destination address to which the recipient writes back. Some mail sending/receiving programs can change the recipient of answer mail by setting the item of return address.

To the host name of the mail corresponding to SMTP, the host name of the mail server to which the mail sending/receiving program sends mail is set. When sending mail, the mail sending/receiving program sends mail to the mail server on the basis of the host name of the mail server corresponding to SMTP. The host name is written as "mailserver.so-net.ne.jp" for example.

The electronic mail address and the host name are written on the basis of a domain name. The domain name is written as a country name, organization type, and company name each separated from the other by a comma ".". In each domain name, the larger divisions come backward in domain name character string.

Each electronic mail address consists of the user name followed by delimiter "@" followed by the domain name.

The host name consists of the server name followed by delimiter "." followed by the domain name.

As written such, each electronic mail address or host name provides a unique mail address or host name.

The domain names of electronic mail address and host name may have upper and lower cases, no distinction being made between them.

The following describes the sending of electronic mail by a mail sending/receiving program to a mail server. In sending mail, the mail sending/receiving program must acquire the IP address corresponding to the host name. The IP address is written as a combination of numerals and commas like "192.168.0.1" for example.

DNS is a system for converting a host name into an IP address. The Internet 4 has many DNS servers. When a host name is sent to any of the DNS servers, that DNS server returns the IP address corresponding to that host name.

For example, the DNS server 6-1 shown in FIG. 1 stores IP address a.a.a.a in correspondence with host name A.

Immediately before accessing a mail server, the mail sending/receiving program gets the IP address of that mail server from the DNS server.

The following describes a procedure of sending electronic mail from a mail sending/receiving program to a mail server. The mail sending/receiving program sends electronic mail to the mail server by following the procedure of SMTP.

The SMTP procedure consists of TCP (Transmission Control Protocol) setup, mail server call, preparation for sending, address notification, sending of body, end confirmation, and TCP end processing. Each of mail server call, preparation for sending, address notification, sending of body, and end confirmation consists of a request from the mail sending/receiving program and a reply from the mail server.

In the SMTP processing, the mail sending/receiving program and the mail server communicate with each other by command statement and return mail code. In a command statement "RCPT from:y@so-net.ne.jp" for example, "RCPT" is a command for telling the mail destination address, which is "y@so-net.ne.jp."

In the return mail code, "Yes" is "250" for example. Some of the return mail codes are: 251 indicates "No such user exists"; 450 indicates "Mail box is in use"; 451 indicates "Abnormal end due to error"; 452 indicates "Necessary resources not enough"; 501 indicates "Command syntax error"; 502 indicates "Command unavailable"; and 550 indicates "Mail box is not found."

The electronic mail has a broadcasting capability. The capability sends a same mail message to many recipients.

For example, when a plurality of mail addresses are written to "To" line of the header, the mail sending/receiving program repeats the process of sending the RCPT command for each of these mail addresses.

The broadcasting is also supported by use of a dedicated header such as "CC" (Carbon Copy) or "BCC" (Blind Carbon Copy) for example.

When mail is sent by use of the CC line or the BCC line, each recipient of the mail knows that the received mail is a copy of the original because the "To" line of the header does not have the recipient address.

When mail is sent by use of the CC line, the header stores the mail address of the recipient. When mail is sent by use of the BCC line, the mail sending/receiving program deletes the BCC line from the header upon processing for RCPT command transmission and sends the body of the mail. The transmission of mail by use of the BCC line is useful when the sender does not want to tell the addresses of the recipients to which a particular mail message is broadcast.

The following describes the processing in which a mail server transfers mail to a mail server near the destination address of mail. The transfer of mail between mail servers is executed in accordance with the SMTP procedure.

In the transfer of mail between mail servers, the sending mail server extracts the domain name from the destination address of mail and sends the extracted domain name to the DNS server.

Because the DNS server stores the relationship between domain name and mail server host name as an MX record, the DNS server sends the host name of the mail server corresponding to the domain name to the mail server which has sent the domain name.

For example, the DNS server 6-2 shown in FIG. 1 stores host name B as related domain name B.B.B.

The mail server which has received the host name sends it to the DNS server.

Because the DNS server stores the relationship between host name and IP address as an A record, the DNS server sends the IP address corresponding to the host name to the mail server which has sent the host name.

For example, the DNS server 6-2 shown in FIG. 1 stores IP address b.b.b.b as related to host name B.

The mail server which has sent the IP address sends mail to the mail server corresponding to the domain name of the destination address of the mail in accordance with the above-mentioned SMTP procedure.

Each mail server can broadcast mail by use of a mailing list. In mail broadcasting by use of a mailing list, an alias capability is used.

Each mail server which uses the alias capability stores a plurality of address groups for a predetermined mail address (representative address). When each mail server receives a mail message addressed to the representative address, the mail server resends a copy of the received mail to all addresses recorded in the representative address. The mail server sequentially sends the mail to the registered mail addresses without rewriting the header of the mail.

The mail server corresponding to the domain name stores the received mail into its mail box called a spool. Each mail server manages the mail for each user and delivers the mail when the receive button of the mail sending/receiving program of the user corresponding to the destination address is pressed by the user.

The reason why the mail server does not send mail to the mail sending/receiving program on the basis of SMTP is that the apparatus executing the mail sending/receiving program is not possibly operating or is not connected to the Internet 4.

The mail server sends mail to the mail sending/receiving program on the basis of POP3. The POP3 procedure consists of TCP setup, mail server call, user authentication, confirmation of mail box contents, checking the number of received mail messages, reception of body, request for deletion, confirmation of end, and ending of TCP. Each of the processes of mail server call, user authentication, confirmation of mail box contents, checking the number of received mail messages, reception of body, request for deletion, confirmation of end consists of a request and a mail server reply from the mail sending/receiving program.

The command statement and return mail code in POP3 are different from those in SMTP.

In POP3, unless the user is authenticated by the user ID and password previously registered with the mail server, mail reception processing is not executed.

Figure 2:
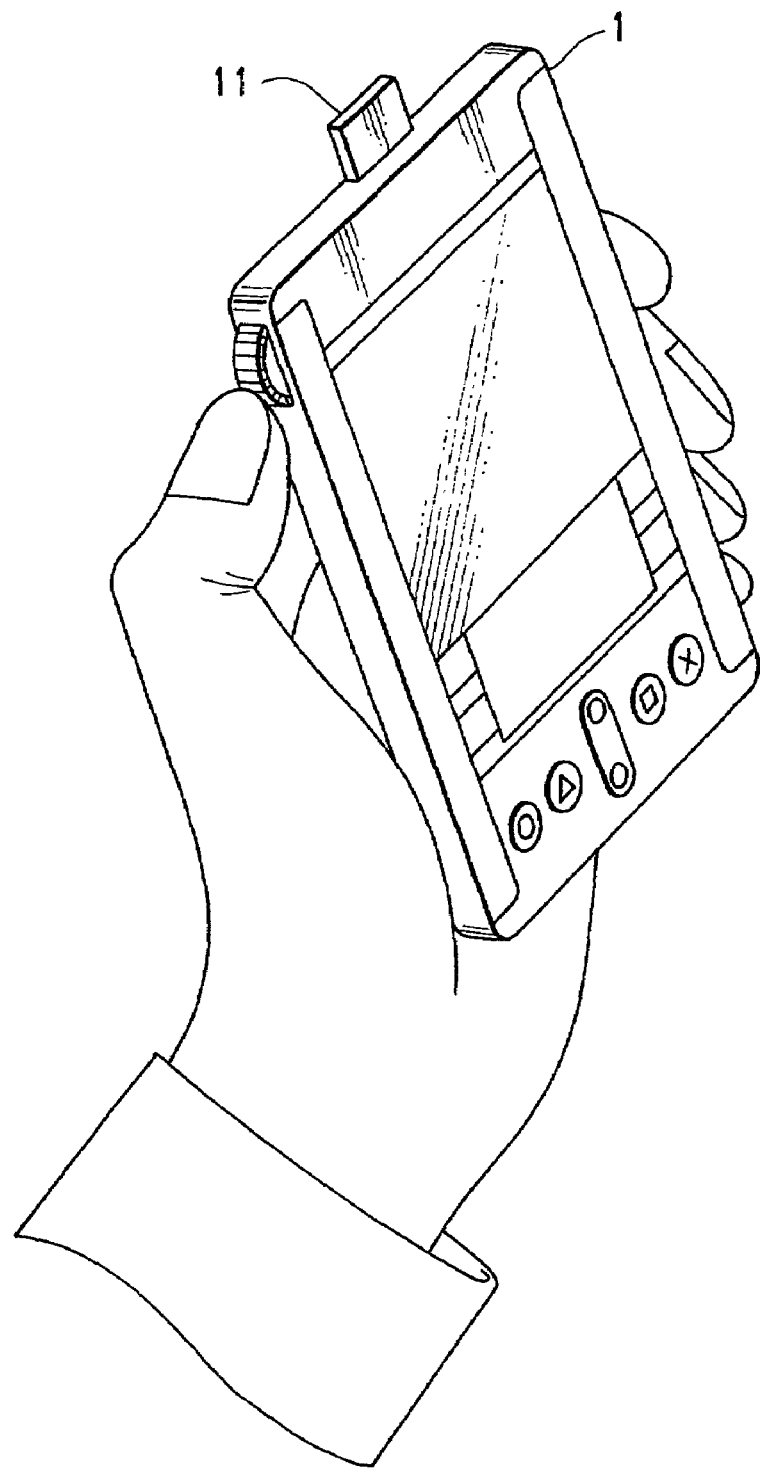
FIG. 2 is a perspective view illustrating an external view of a PDA.
Figure 4:
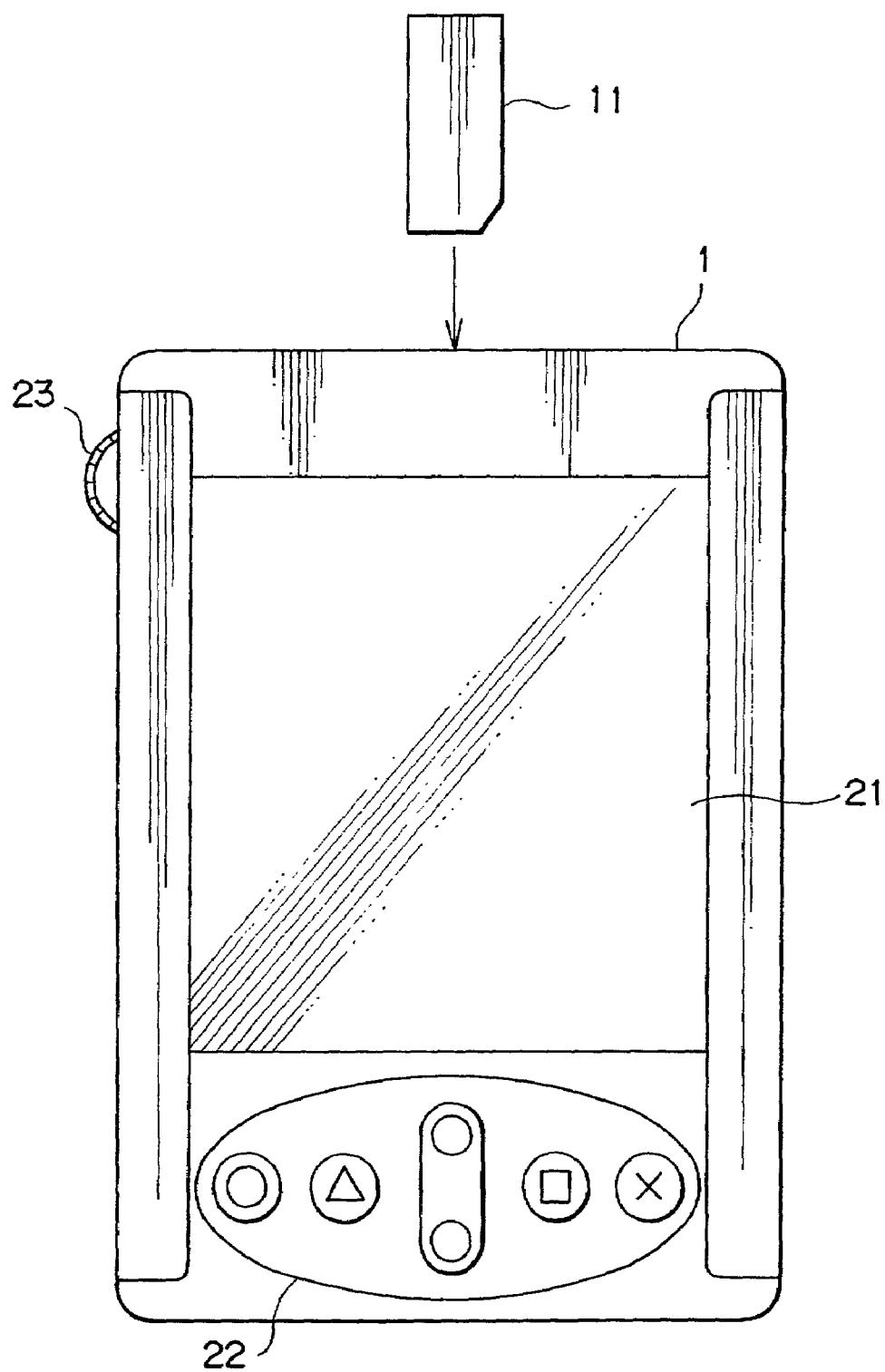
FIG. 4 is a front view illustrating an external view of the PDA.

FIGS. 2 through 4 illustrates the external views of the PDA 1. FIG. 2 illustrates a perspective view of the PDA 1 held in the user's hand. FIG. 3 illustrates a perspective view of the PDA 1 loaded in the cradle 2. FIG. 4 illustrates the front view of PDA 1.

The casing of the PDA 1 is designed so that it can be held by one hand and operated with ease in this condition. A slot is arranged on the top end of the PDA 1 into which a Memory Stick (trademark) 11 incorporating a semiconductor memory is loaded.

The PDA 1 is loaded in the cradle 2 such that the bottom of the PDA 1 comes in contact with the upper surface of the cradle 2. At the bottom of the PDA 1, a USB (Universal Serial Bus) port (not shown) for connecting the PDA 1 to the cradle 2 is arranged.

The PDA 1 has a display section 21, a key section 22, and a jog dial 23.

The display section 21 is constituted by a thin display device such as a liquid crystal display device and displays icons, thumbnails, and text for example. A touch pad is arranged on the upper part of the display section 21. By pressing the touch pad with the finger or a pen, the user can input predetermined data or commands into the PDA 1.

The key section 22 is constituted by input keys for example through which the user inputs the selection of icons or thumbnails displayed on the display section 21.

The jog dial 23 is rotated or pressed into the main body of the PDA 1 to select icons or thumbnails for example displayed on the display section 21.

Figure 5:
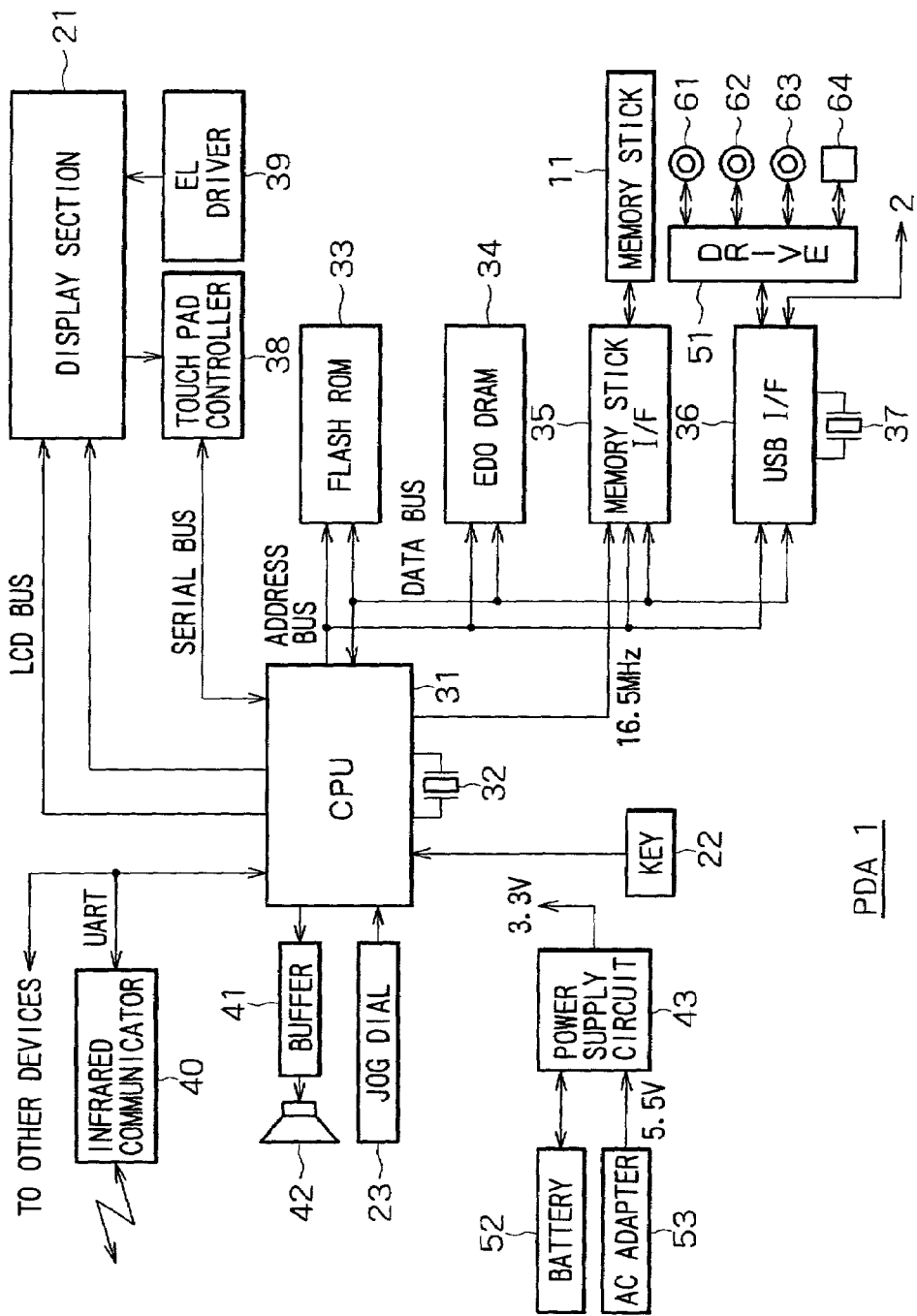
FIG. 5 is a block diagram illustrating a configuration of the PDA.

FIG. 5 shows a configuration of the PDA 1. A CPU (Central Processing Unit) 31 executes various programs such as an operating system and developed application programs stored in a flash ROM (Read Only Memory) 33 or an EDO DRAM (Extended Data Out Dynamic Random Access Memory) 34, in synchronization with a clock signal supplied from an oscillator 32.

The flash ROM 33 is constituted by a flash memory, a kind of EEPROM (Electrically Erasable Programmable Read Only Memory), generally storing data which is basically fixed among the programs and arithmetic parameters for use by the CPU 31. The EDO DRAM 34 stores those parameters which change from time to time in the programs for use by the CPU 31 or in their execution.

A memory stick interface 35 reads data from the Memory Stick 11 loaded in the PDA 1 and writes data supplied from the CPU 31 to the Memory Stick 11.

A USB (Universal Serial Bus) interface 36 inputs data or programs from a drive 51, which is a USB device, in synchronization with a clock signal supplied from an oscillator 37 and supplies the data from the CPU 31 to the drive 51. The USB interface 36 inputs data or programs from the cradle 2, which is a USB device, and supplies data from the CPU 31 to the cradle 2, in synchronization with a clock signal supplied from the oscillator 37.

The drive 51 reads data or programs from a magnetic disc 61, an optical disc 62, a magneto-optical disc 63, or a semiconductor memory 64, each loaded in the drive 51, and supplies these data or programs to the CPU 31 or the EDO DRAM 34 via the USB interface 36. At the same time, the drive 51 stores data and programs into the magnetic disc 61, the optical disc 62, the magneto-optical disc 63, or the semiconductor memory 64.

The flash ROM 33, the EDO DRAM 34, the Memory Stick interface 35, and the USB interface 36 are connected to the CPU 31 via an address bus and a data bus.

The display section 21 receives data from the CPU 31 via an LCD bus and displays an image or text based on the received data. When the touch pad arranged on the upper part of the display section 21 is operated, a touch pad controller 38 receives data (indicative of the coordinates of the touch made, for example) and supplies a signal corresponding to the received data to the CPU 31 via a serial bus.

An EL (Electro Luminescence) driver 39 operates an electro-luminescence element arranged on the rear side of the liquid crystal device of the display section 21 to control the brightness of the display section 21.

An Infrared communicator 40 sends, by use of infrared light as a medium, data received from the CPU 31 to other devices, not shown, via a UART (Universal Asynchronous Receiver Transmitter) and sends data received, by use of infrared light as a medium, from other devices to the CPU 31. The PDA 1 can communicate with other devices via the UART.

An audio reproducing section 42, composed of a speaker and an audio data decode circuit for example, decodes audio data for example received via the Internet 4, reproduces the received data, and sounds the reproduced data. For example, the audio reproducing section 42 reproduces the audio data supplied from the CPU 31 via a buffer 41 to sound the reproduced audio data.

The key section 22, composed of input keys for example, is operated by the user when inputting various commands into the CPU 31.

The jog dial 23 is rotated or pressed by the user to supply corresponding data to the CPU 31.

A power supply circuit 43 converts the voltage of power supplied from a battery 52 or an AC (Alternating Current) adapter 53 and supplies the resultant voltage to the above-mentioned circuits, the CPU 31 through the audio reproducing section 42.

Figure 6:
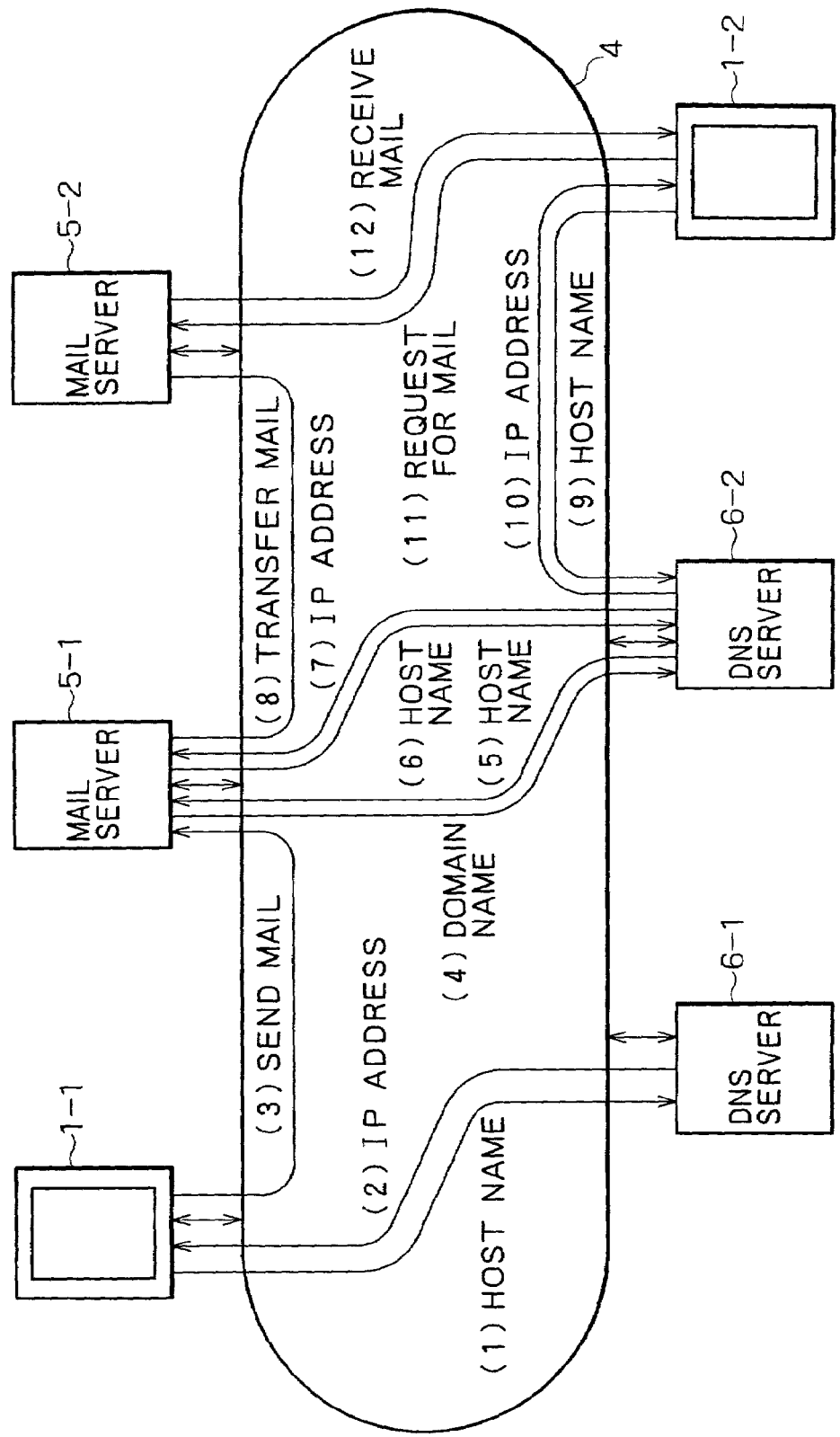
FIG. 6 is a schematic view illustrating a procedure in which mail sent by a PDA is received by the other PDA.

The following describes a procedure in which mail sent by the PDA 1-1 is received by the PDA 1-2 with reference to FIG. 6. The PDA 1-1 sends the host name of the mail server 5-1 to the DNS server 6-1 via the cradle 2-1, the personal computer 3-1, and the Internet 4. The DNS server 6-1 sends, via the Internet 4, to the PDA 1-1 the IP address of the mail server 5-1 stored in the A record as related to the received host name.

On the basis of the IP address of the mail server 5-1 received from the DNS server 6-1, the PDA 1-1 sends mail to the mail server 5-1 via the personal computer 3-1 and the Internet 4 on the basis of the SMTP (Simple Mail Transfer Protocol) procedure.

The mail server 5-1 checks the destination address of received mail and, if the domain name of the destination address does not match the domain of the mail server 5-1, sends the domain name to the DNS server 6-2 via the Internet 4. the DNS server 6-2 sends to the mail server 5-1 the host name of the mail server 5-2 stored in the MX record as related to the received domain name via the Internet 4.

The mail server 5-1 sends to the mail server 6-2 the host name of the mail server 5-2 corresponding to the destination address received from the DNS server 6-2 via the Internet 4. Via the Internet 4, the DNS server 6-2 sends to the mail server 5-1 the IP address of the mail server 5-2 stored in the A record as related to the received host name.

Via the Internet 4, the mail server 5-1 transfers the mail to the mail server 5-2 in accordance with the received IP address and on the basis of the SMTP procedure. The mail server 5-2 checks the destination address of the received mail and, if the domain name of the destination address matches the domain of the mail server 5-2, stores the received mail into its mail box called a spool.

The PDA 1-2 sends to the DNS server 6-2 the host name of the mail server 5-2 via the cradle 2-2, the personal computer 3-2, and the Internet 4. The DNS server 6-2 sends via the Internet 4 the IP address of the mail server 5-2 corresponding to the received host name to the PDA 1-2.

On the basis of the received IP address of the mail server 5-2, the PDA 1-2 requests the mail server 5-2 the mail via the cradle 2-2, the personal computer 3-2, and the Internet 4 on the basis of POP3 (Post Office Protocol Version 3) procedure. The PDA 1-2 receives the mail from the mail server 5-2 via the cradle 2-2, the personal computer 3-2, and the Internet 4 on the basis of POP3 procedure.

Figure 7:
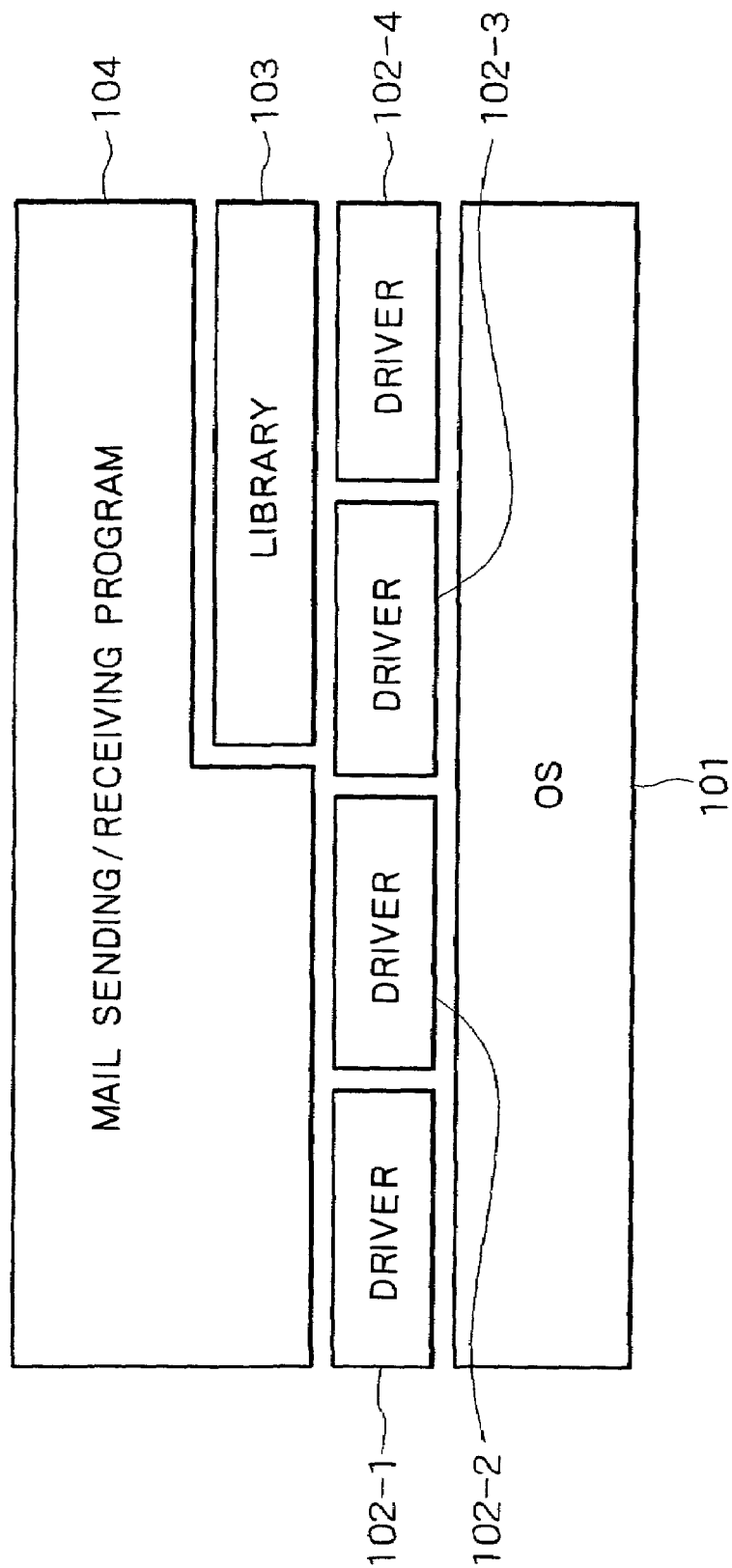
FIG. 7 is a diagram illustrating programs to be executed by the mail sending PDA.

FIG. 7 shows programs to be executed by the mail sending PDA 1. An operating system (hereafter referred to as an OS) 101 controls the basic operations of the PDA 1.

A driver 102-1 is a program for controlling the displaying of the display section 11. A driver 102-2 is a program for controlling the operation of the touch pad controller 38. A driver 102-3 is a program for controlling the reproduction of audio data in the audio reproducing section 42. A driver 102-4 is a program for executing a process corresponding to the input operation in the jog dial 23.

A library 103 stores a plurality of routines for use by application programs such as a mail sending/receiving program 104.

A mail sending/receiving program 104 sends and receive electronic mail via the cradle 2-1 or 2-2, the personal computer 3-1 or 3-2, and the Internet 4.

It should be noted that the configuration of the programs shown in FIG. 7 is substantially the same as that of the programs of a prior-art mail sending/receiving device.

Figure 8:
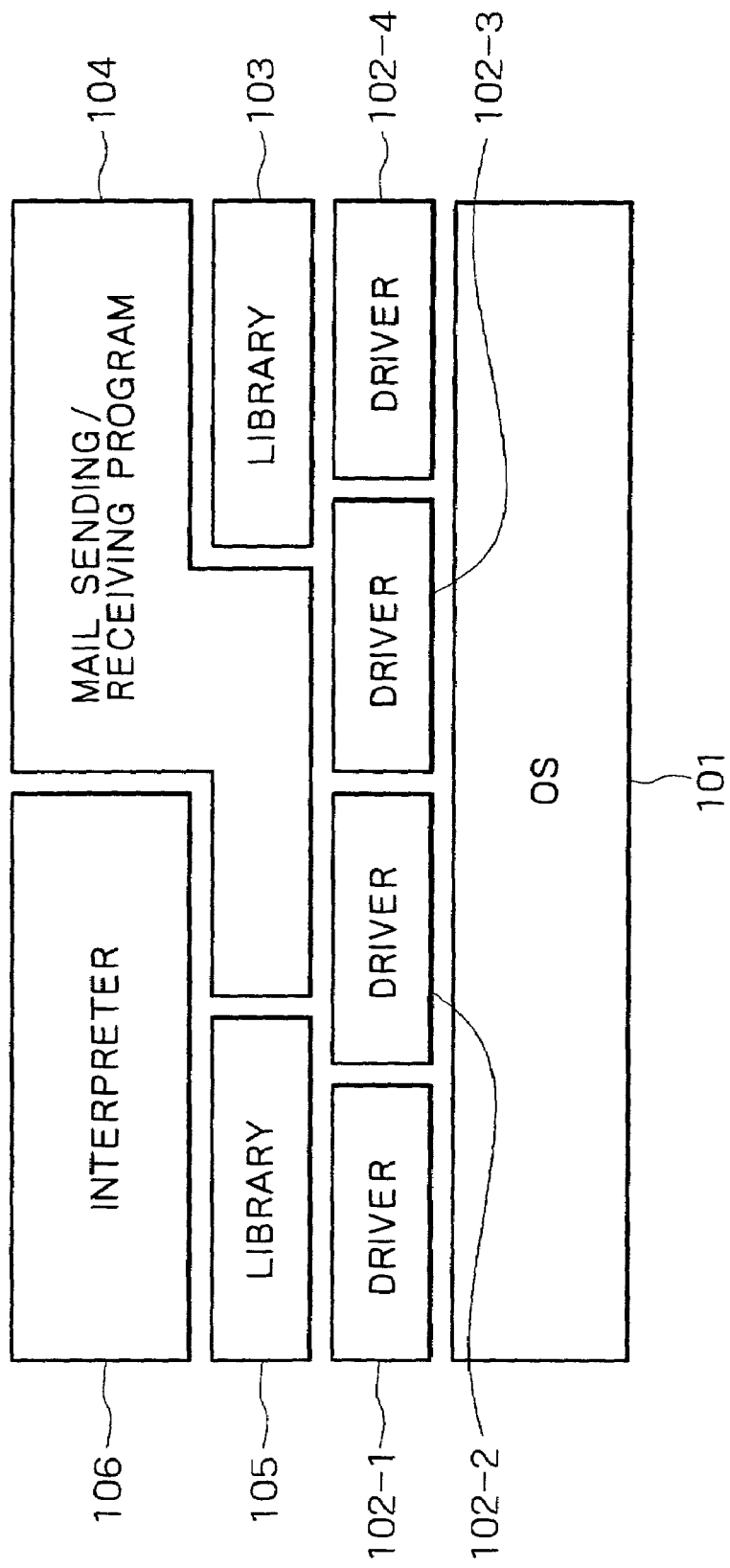
FIG. 8 is a diagram illustrating programs to be executed by the mail sending or receiving PDA.
Figure 9:
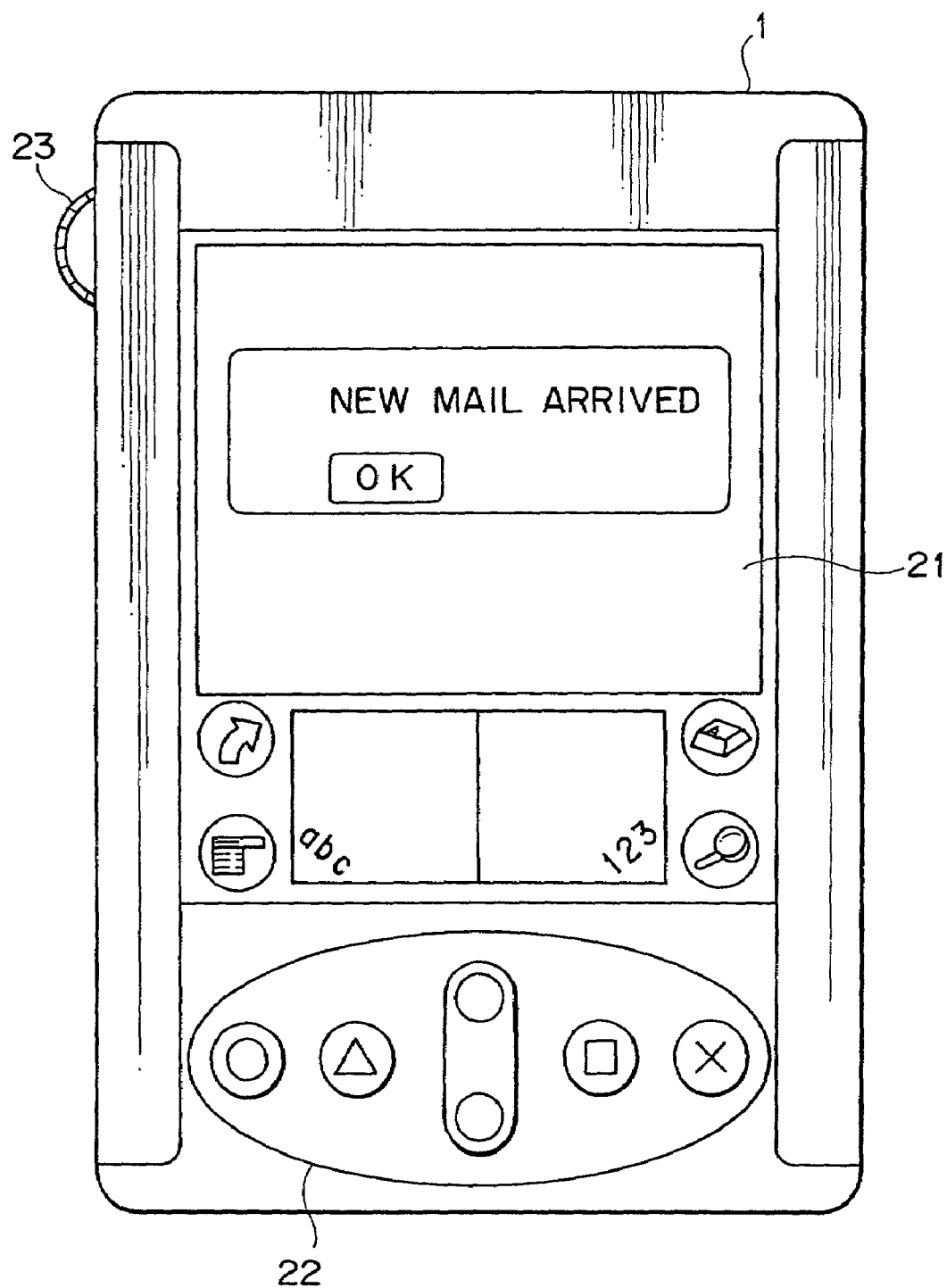
FIG. 9 is a front view illustrating an exemplary display of the PDA.

FIG. 8 illustrates programs to be executed by the PDA 1 when it sends or receives mail. The mail sending/receiving program 104 displays an image illustrated in FIG. 9 for example on the display section 11 when receiving mail from the mail server 5-2. When displaying the received mail, the mail sending/receiving program 104 supplies the received mail to an interpreter 106.

The library 105 stores routines to be used when the interpreter 106 executes scripts.

The interpreter 106 is a program which is plugged in the mail sending/receiving program 104 and extracts a script from the received mail to execute the extracted script. For example, the interpreter 106 causes the driver 102-1 to display a predetermined image on the display section 11 in accordance with the execution of the script and the driver 102-3 to reproduce predetermined audio data from the audio reproducing section 42.

The interpreter 106 causes the drivers 102-1 through 102-4 corresponding to the display section 11 and the audio reproducing section 42 to execute image display and audio reproduction. Therefore, even if the display section 11 or the audio reproducing section 42 is of different types due to different types of the PDA 1, the image display and audio reproduction by the interpreter 106 can be executed with reliability.

Also, the interpreter 106 causes the drivers 102-1 through 102-4 corresponding to the devices such as the display section 11 and the audio reproducing section 42 to execute the processing such as image display and audio reproduction. Therefore, even if devices of various types to be operated in accordance with the execution of the script are incorporated in the PDA 1, these devices can be controlled by the interpreter 106 with reliability.

It should be noted that, if a mail message to be displayed contains a script, the mail sending/receiving program 104 may activate the interpreter 106 and load the library 105.

Figure 10:
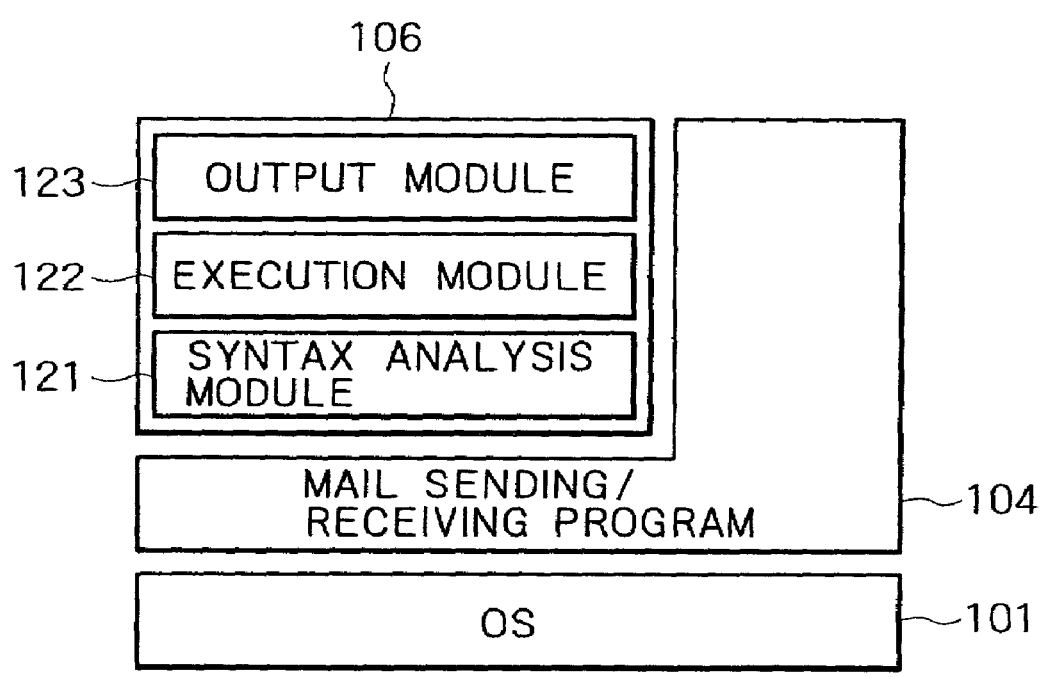
FIG. 10 is a diagram illustrating a detailed structure of an interpreter.

FIG. 10 illustrates a detail structure of the interpreter 106. The interpreter 106 consists of a syntax analysis module 121, an execution module 122, and an output module 123.

Figure 11:
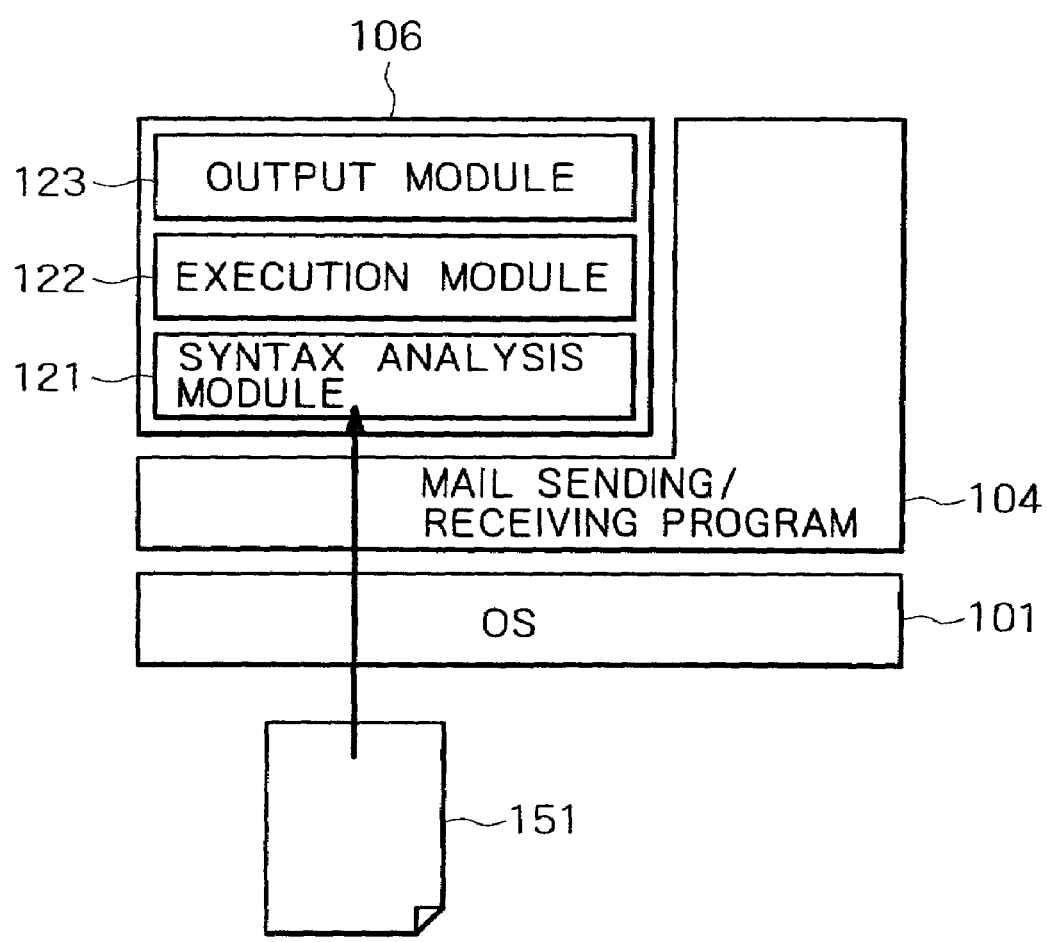
FIG. 11 is a diagram illustrating an operation of the interpreter.

When the mail sending/receiving program 104 displays a mail message 151 as shown in FIG. 11 for example, the syntax analysis module 121 receives the mail message 151 from the mail sending/receiving program 104, extracts a script from the received mail message 151, and supplies the extracted script to the execution module 122.

Figure 12:
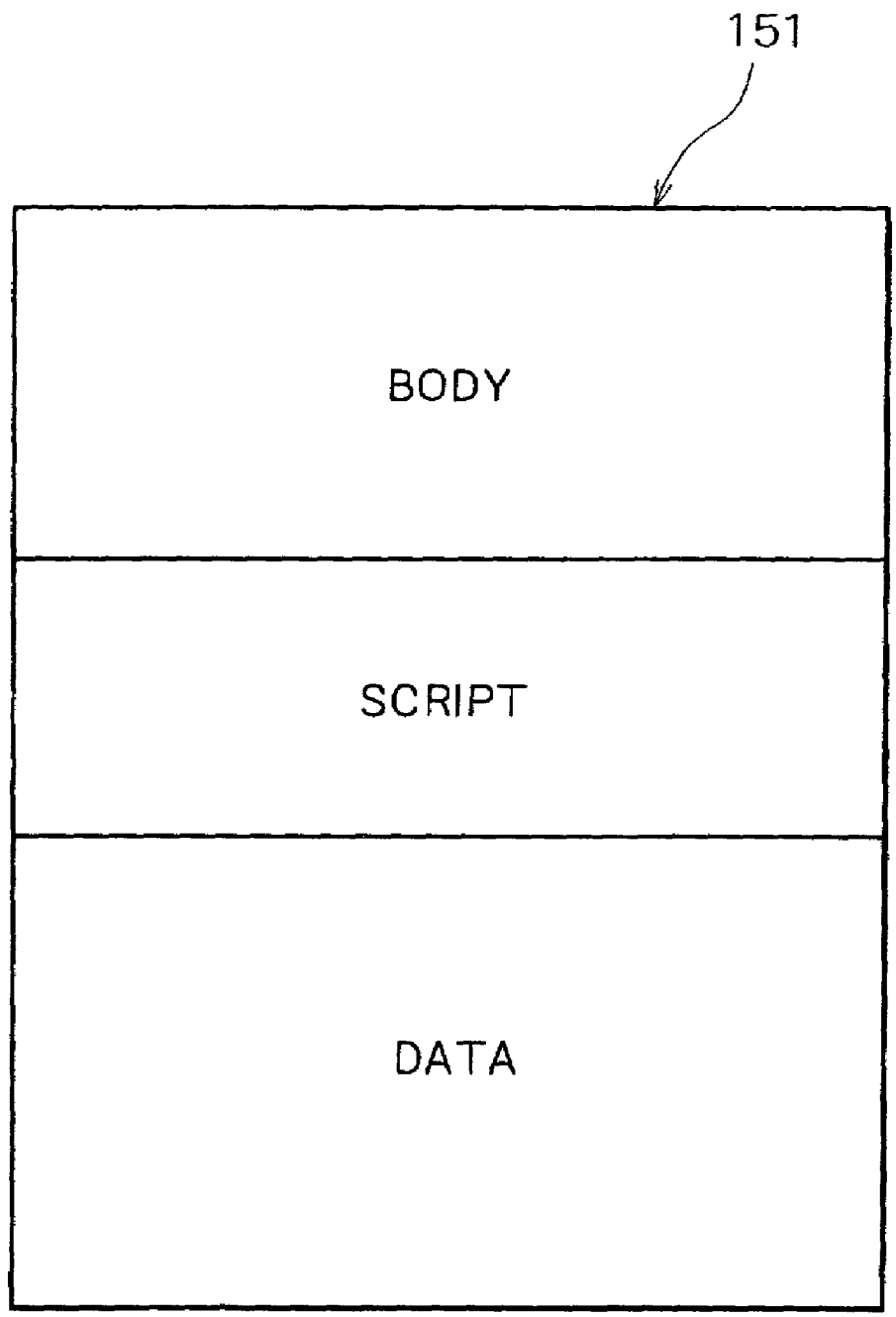
FIG. 12 is a diagram illustrating an exemplary structure of mail message.

FIG. 12 shows an exemplary structure of the message 151 to be sent or received by the PDA 1. The mail message 151, if it contains a script, stores it after a mail body. If the stored script requires data, the mail message 151 stores, after the script, the data necessary for the execution of the script by the interpreter 106.

If the data is stored along with the script in the mail message 151, the syntax analysis module 121 extracts both the script and the data and supplies the extracted script and data to the execution module 122.

Figure 13:
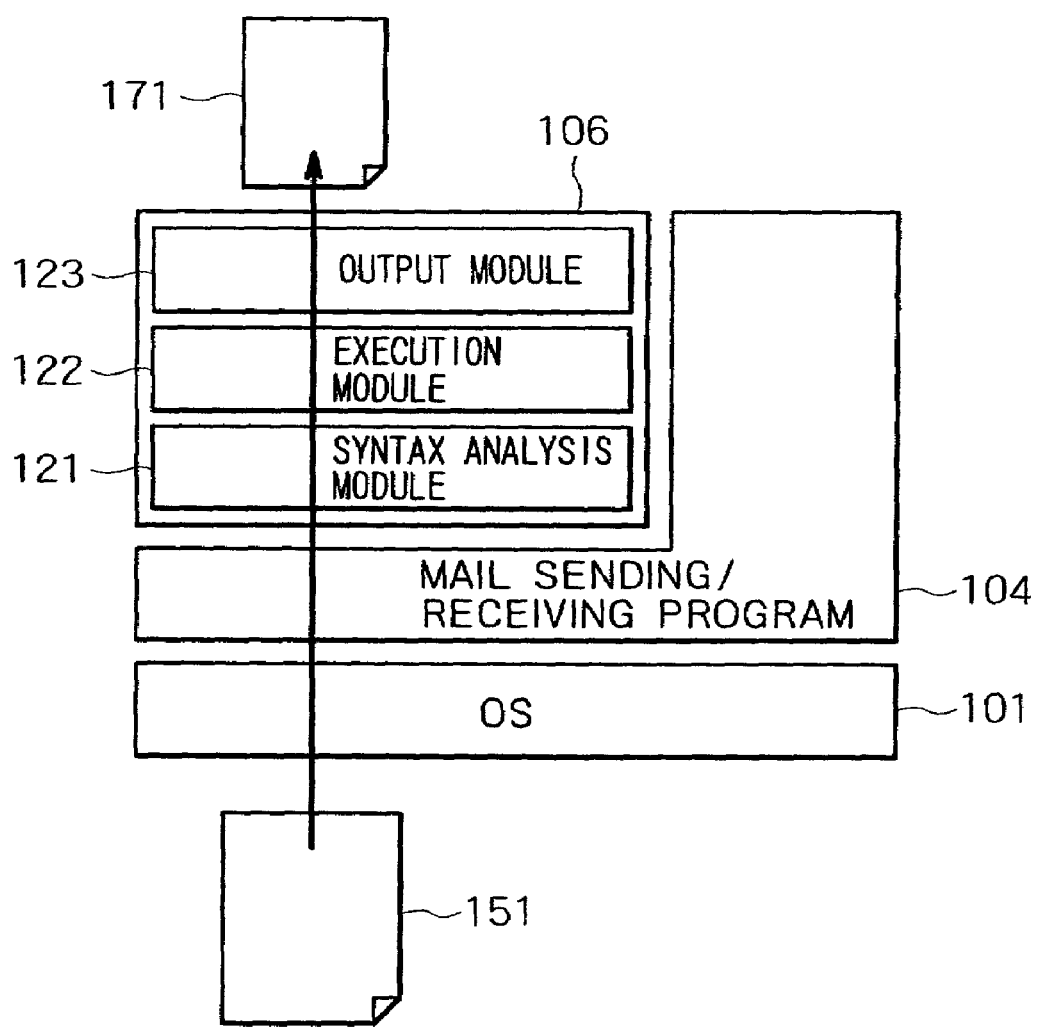
FIG. 13 is a diagram illustrating an operation of the interpreter.

FIG. 13 illustrates the flow of processing of the interpreter 106 to be executed when the mail message 151 stores the script. The syntax analysis module 121 supplies the extracted script to the execution module 122.

The execution module 122 executes the received script. In accordance with a result of the execution of the script, the output module 123 displays an image, outputs audio, or stores output data 171 into the EDO DRAM 34 for example.

Figure 14:
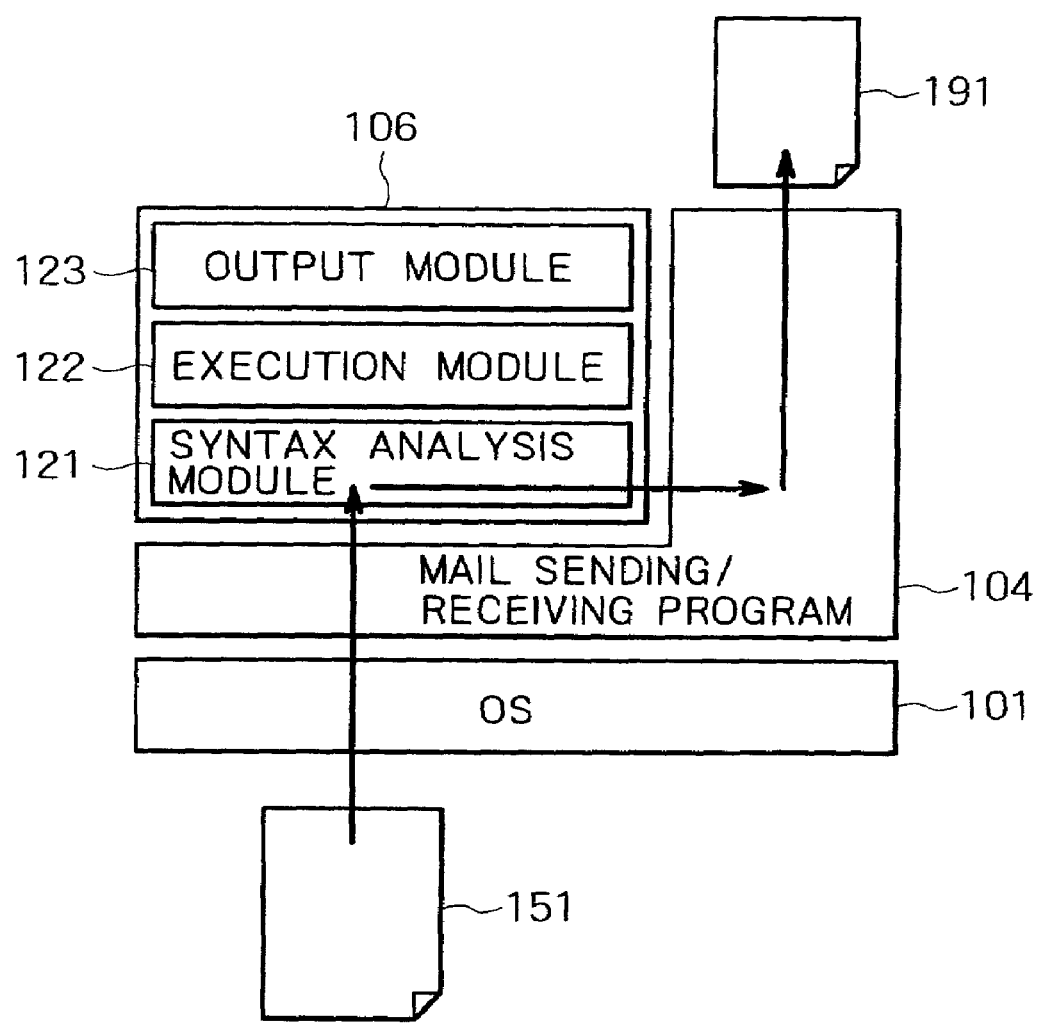
FIG. 14 is a diagram illustrating an operation of the interpreter.

On the other hand, if the syntax analysis module 121 has not extracted a script from the mail message 151 (namely, no script is contained in the mail message 151), the syntax analysis module 121 causes the mail sending/receiving program 104 to execute the subsequent processing, normal mail processing being executed as shown in FIG. 14. At this moment, the mail sending/receiving program 104 supplies text data 191 corresponding to the body of the mail message 151 to the driver 102-1. The driver 102-1 displays the body of the mail message 151 on the display section 11 on the basis of the text data 191.

FIG. 15 shows an example of the mail message 151 for executing the game of Othello. In the example shown in FIG. 15, the mail message consists of a body and a script. The script contained in the mail message shown in FIG. 15 is application/x-emma described in MIME (Multi Purpose Internet Mail Extension).

In the mail message 151 shown in FIG. 15, "To: "Someone"<someone@sony.co.jp>" through "the second move of Othello" correspond to the body and ", - - - , NextPart=_000_0011_01BFA9E7.2EE28580" through ", - - - , Next_Part(Wed_Apr_19_11:42:48_2000_705), - - - , " correspond to the *script*.

Figure 16:
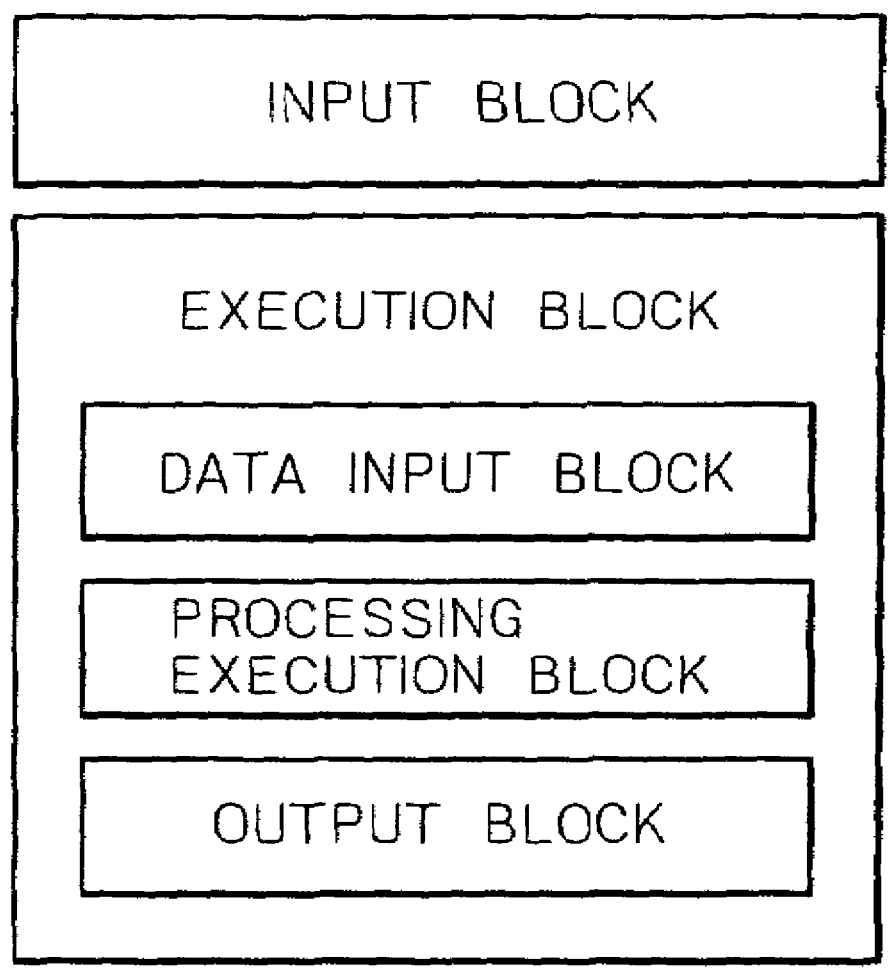
FIG. 16 is a diagram illustrating the execution of a script.

FIG. 16 schematically shows the execution of the script. The script execution is divided into an input block and an execution block.

In the input block, the script is extracted from the mail message 151 by the syntax analysis module 121.

The execution block is further divided into a data input block, a processing execution block, and an output block. In the data input block, the execution module 122 causes the driver 102-1 for example to display an image for data input and the driver 102-2 to control the input from the touch pad controller 38.

The inputting in the data input block is executed by the execution module 122 by controlling the drivers corresponding to a tablet, the key section 22, the jog dial 23, a sensor, the Memory Stick interface 35, an external attached keyboard, a modem, the USB interface 36, the infrared communicator 40, and the drive 52, for example.

In the processing execution block, the execution module 122 executes the processing logic of the script.

In the output block, the output module 123, in accordance with the processing in the processing execution block, causes the driver 102-1 for example to display an image indicative of the result of the processing on the display section 11 and the driver 102-3 to output an audio signal, which is the result of the processing, from the audio reproducing section 42.

In the output block, the outputting is executed by the output module 123 by controlling the drivers corresponding to the display section 11, the modem, the audio reproducing section 42, the Memory Stick interface 35, the USB interface 36, the infrared communicator 40, and the drive 52, for example.

Figure 18:
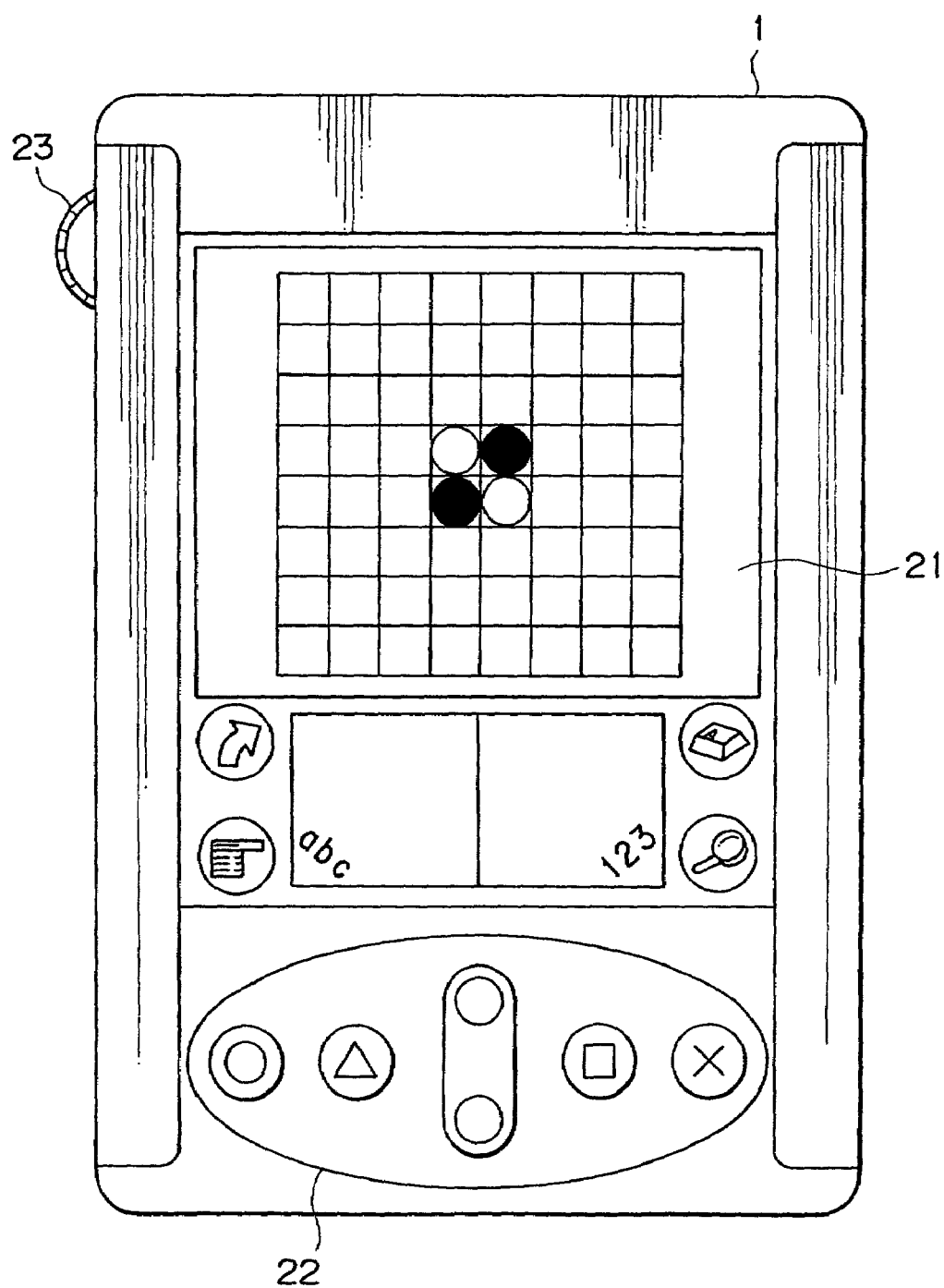
FIG. 18 is a front view illustrating an exemplary display of the PDA.

FIG. 17 shows an example of a script for executing the game of Othello. When the script shown in FIG. 17 is read into the interpreter 106, the execution module 122 activates onload ( ) method, causing show ( ) method to display an Othello board and the pieces on the display section 11 as shown in FIG. 18.

Figure 19:
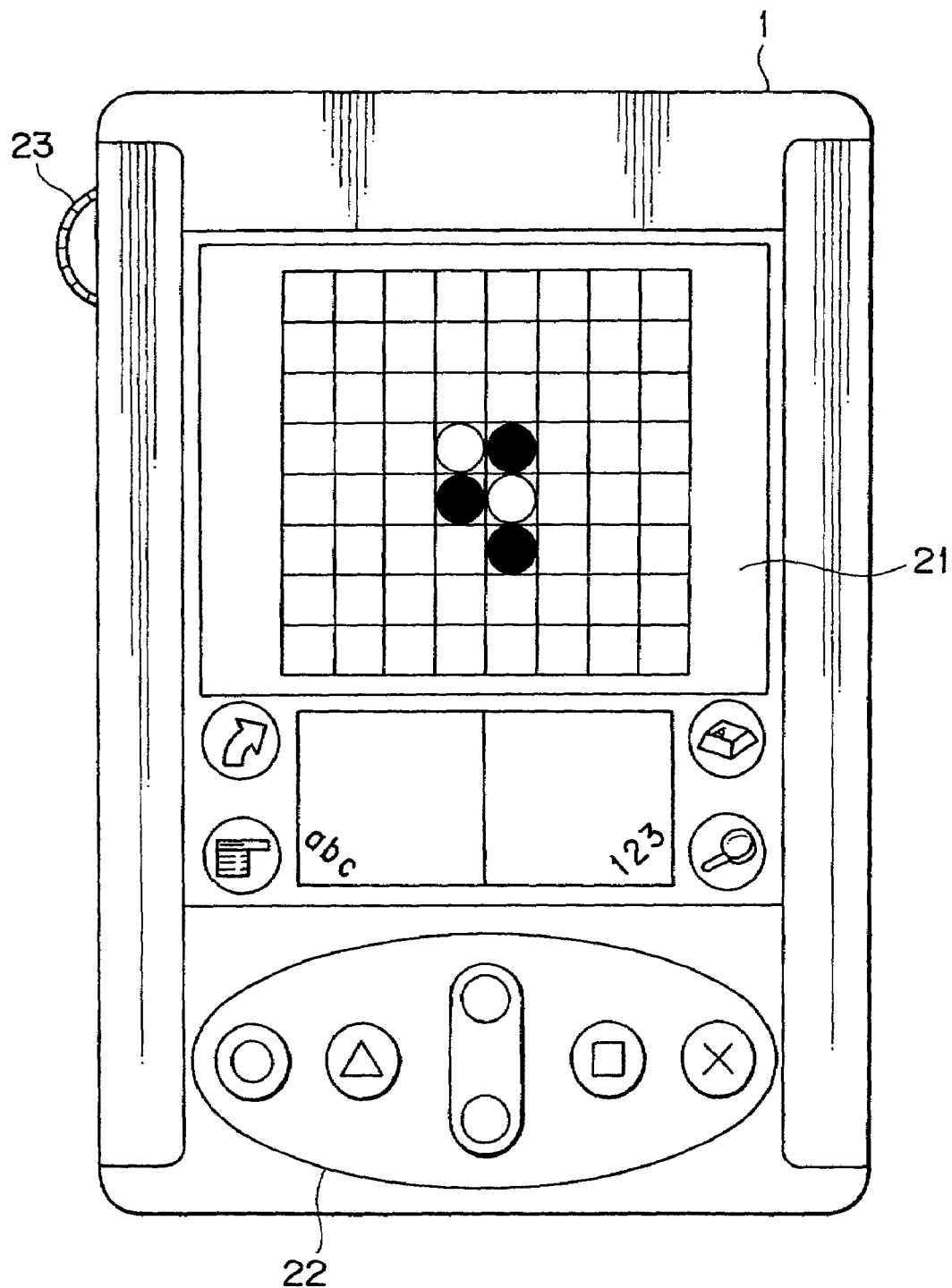
FIG. 19 is a front view illustrating another exemplary display of the PDA.

When the user inputs a new move as shown in FIG. 19, the execution module 122 captures, by ontap ( ) method, the coordinates on the Othello board at which the new move was made. The execution module 122 determines by check ( ) method whether the coordinates corresponding to the new move satisfy the requirements specified by the rule of Othello. If the new move is found not satisfying the requirements, the execution module 122 tells an error by confirm ( ) method (an error message is displayed on the display section 11), repeating the execution of ontap ( ) method.

Figure 20:
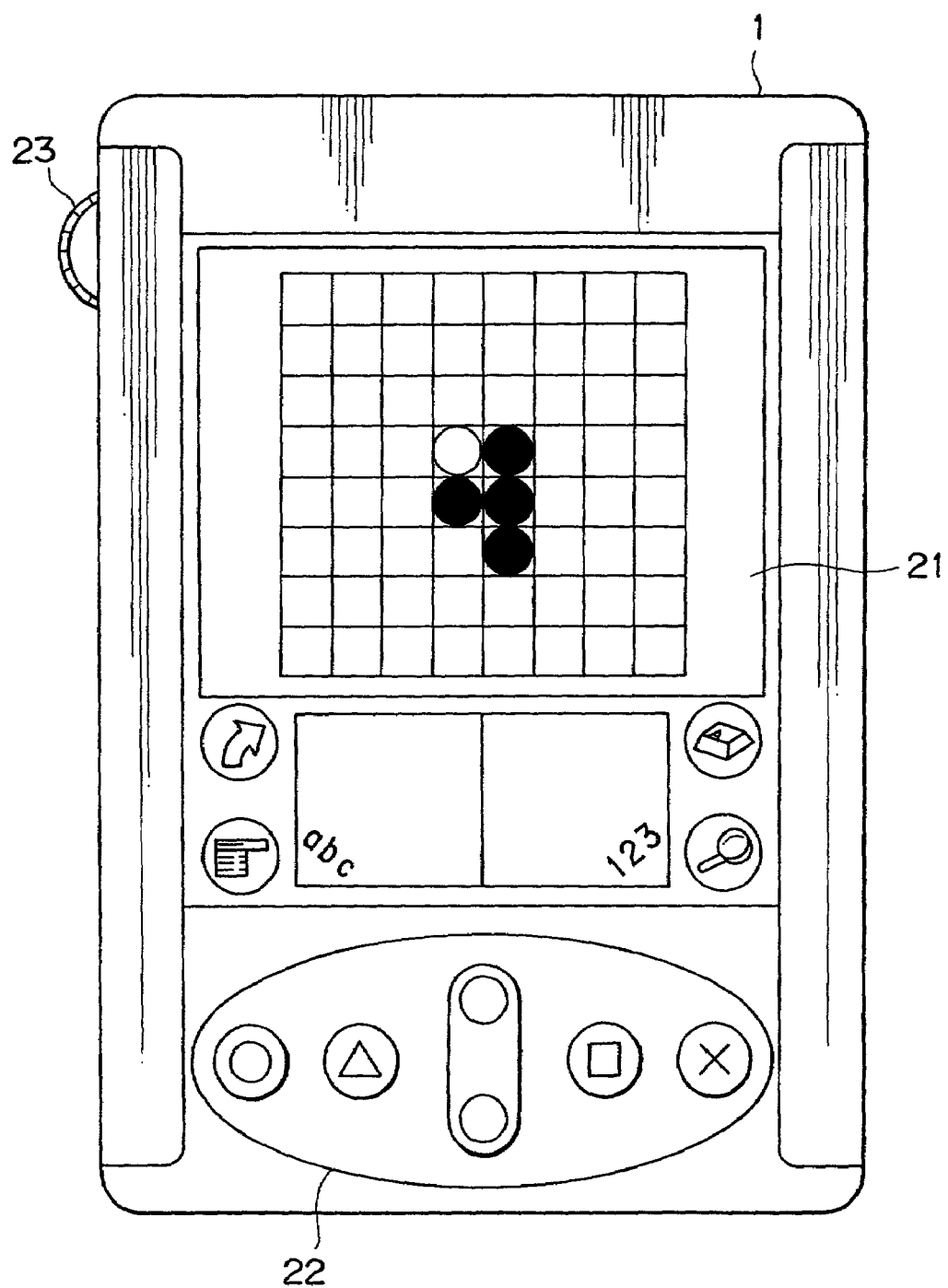
FIG. 20 is a front view illustrating still another exemplary display of the PDA.
Figure 21:
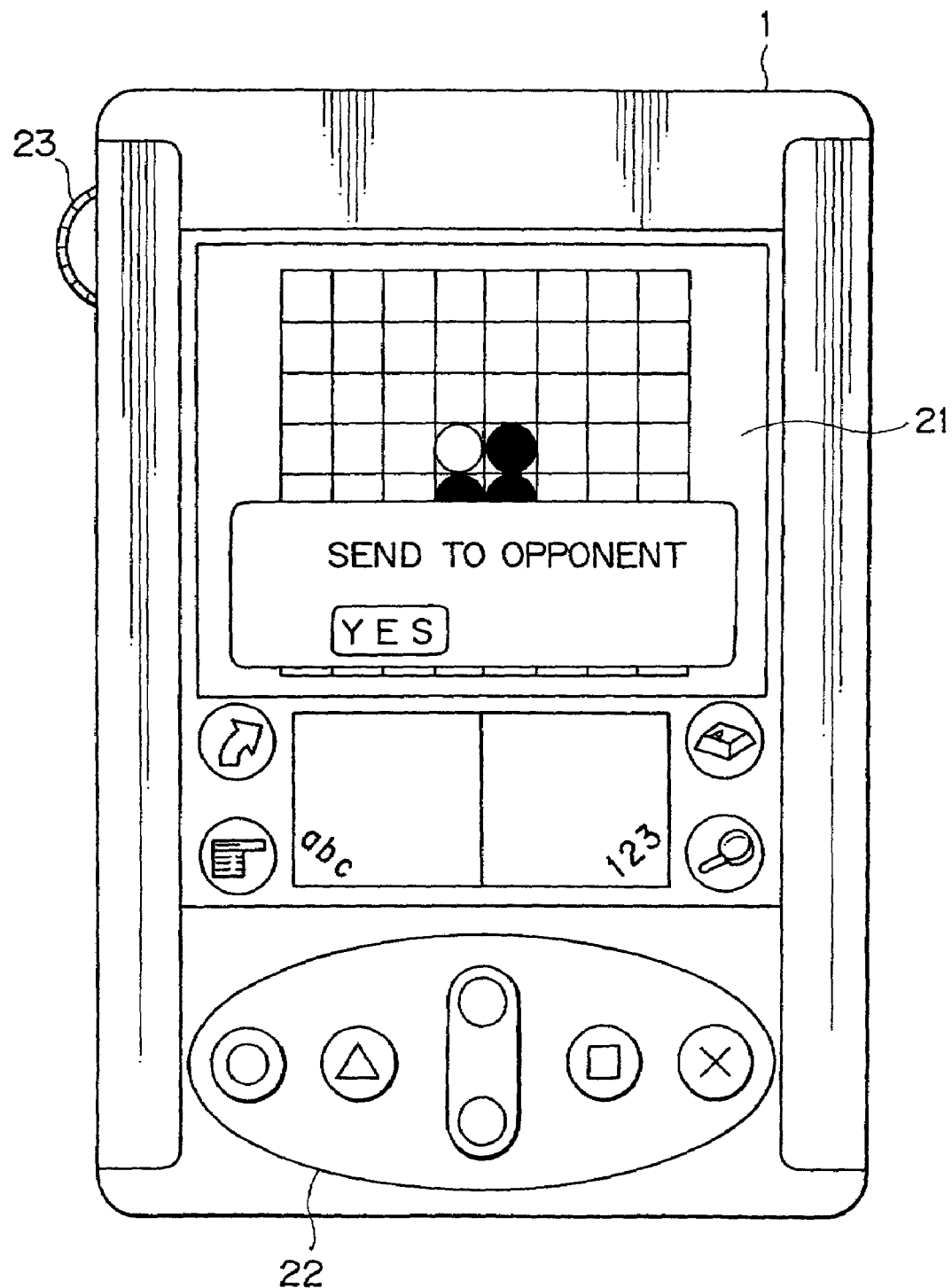
FIG. 21 is a front view illustrating yet another exemplary display of the PDA.

If the new move is found satisfying the requirements, the execution module 122 updates the piece surface by update ( ) method as shown in FIG. 20. The output module 123 executes by sendmail( ) method a process of sending mail to the opponent as shown in FIG. 21, upon which the processing is ended by exit ( ) method.

Figure 22:
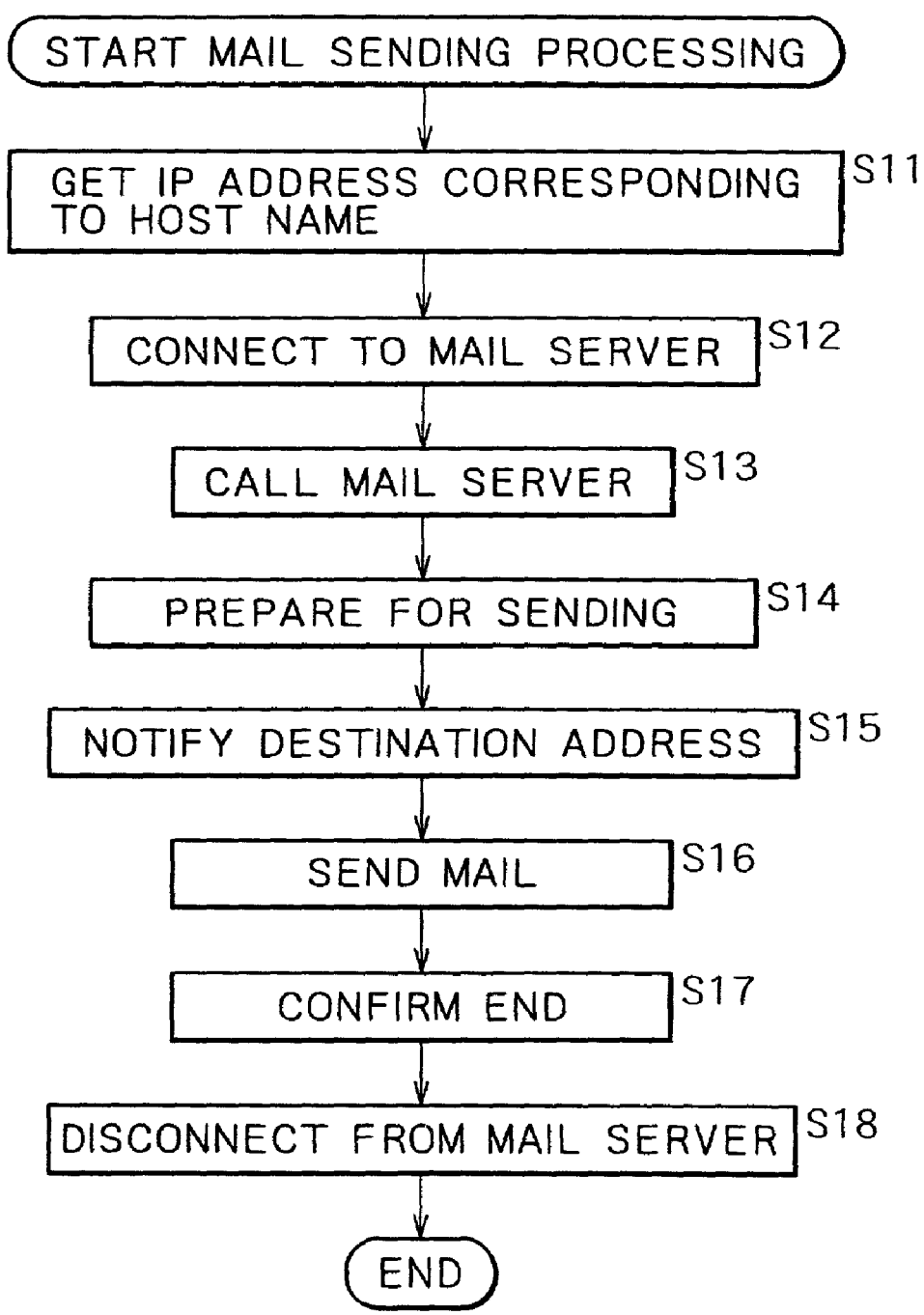
FIG. 22 is a flowchart describing mail send processing.

The following describes the processing of mail sending by the PDA 1 which executes the mail sending/receiving program 104, with reference to the flowchart shown in FIG. 22. In step S11, the mail sending/receiving program 104 causes the USB interface 36 to send the host name corresponding to the mail server 11 to the DNS server 6-1 via the cradle 2, the personal computer 3, and the Internet 4 and gets the IP address corresponding to the mail server 5-1 from the DNS server 6-1.

The processes of steps S12 through S18 are executed on the basis of the SMTP procedure for example.

In step S12, the mail sending/receiving program 104 causes the USB interface 36 to specify the IP address via the cradle 2, the personal computer 3, and the Internet 4, thereby connecting the PDA 1 to the mail server 5-1. In step S13, the mail sending/receiving program 104 causes the USB interface 36 to call the mail server 5-1 via the cradle 2, the personal computer 3, and the Internet 4 (namely, call a mail server program (for example, sendmail (trademark)) which is executed by the mail server 5-1).

In step S14, the mail sending/receiving program 104 causes the USB interface 36 to request the mail server 51 for making preparations for mail sending (namely, notify the mail server program which is executed by the mail server 5-1 of the execution of a mail sending procedure) In step S15, the mail sending/receiving program 104 causes the USB interface 36 to notify the mail server 5-1 of the destination address (mail address) of a mail message to be sent.

In step S16, the mail sending/receiving program 104 causes the USB interface 36 to send the mail message to the mail server 5-1. In step S17, the mail sending/receiving program 104 causes the USB interface 36 to confirm the end of processing with the mail server 5-1.

In step S17, the mail sending/receiving program 104 causes the USB interface 36 to disconnect from the mail server 5-1, upon which the processing comes to an end.

Thus, the PDA 1 can send mail to the mail server 5-1.

It should be noted that the processing in which the mail server 5-1 transfers mail to the mail server 5-2 is generally the same as the mail send processing except for a process of acquiring the host name corresponding to mail destination address and therefore the description of the mail transfer processing is skipped.

Figure 23:
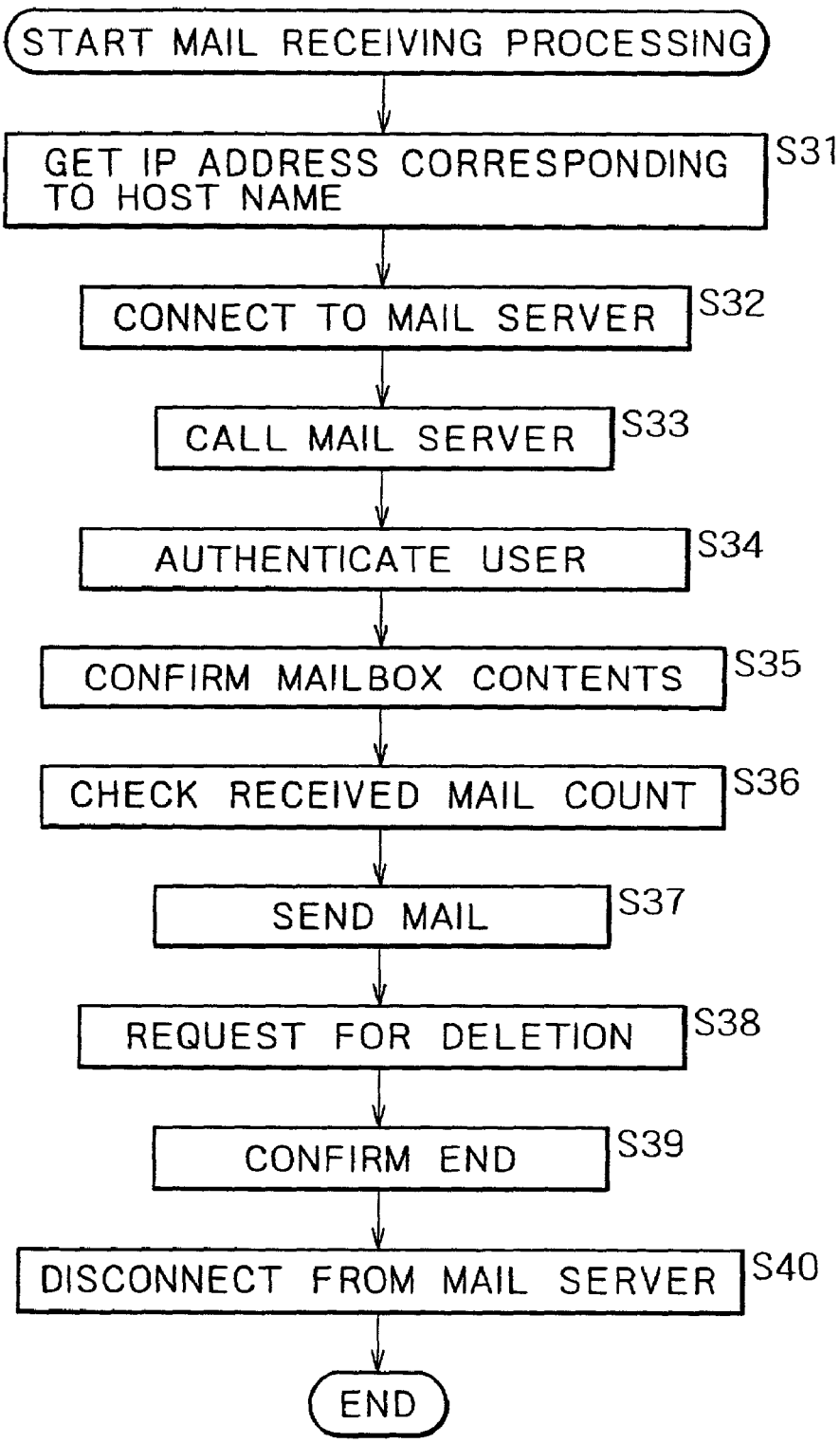
FIG. 23 is a flowchart describing mail receive processing.

The following describes the mail reception processing by the PDA 1 which executes the mail sending/receiving program 104 with reference to the flowchart shown in FIG. 23. In step S31, the mail sending/receiving program 104 causes the USB interface 36 to send the host name corresponding to the mail server 52 to the DNS server 6-2 via the cradle 2, the personal computer 3, and the Internet 4 and gets the IP address corresponding to the mail server 5-2 from the DNS server 6-2.

The processes of steps S32 through S40 are executed on the basis of the POP3 procedure for example.

In step S32, the mail sending/receiving program 104 causes the USB interface 36 to specify the IP address via the cradle 2, the personal computer 3, and the Internet 4, connecting the PDA 1 to the mail server 5-2. In step S33, the mail sending/receiving program 104 causes the USB interface 36 to call the mail server 5-2 via the cradle 2, the personal computer 3, and the Internet 4.

In step S34, the mail sending/receiving program 104 causes the USB interface 36 to send the user ID and password of the user of the PDA 1 to the mail server 5-2 via the cradle 2, the personal computer 3, and the Internet 4, causing the mail server 5-2 to execute the authentication of the user.

In step S35, the mail sending/receiving program 104 causes the USB interface 36 to check the contents of the mail box (storing the mail addressed to the user of the PDA 1) by the mail server 5-2.

In step S36, the mail sending/receiving program 104 causes the USB interface 36 to send the number of mail messages addressed to the user of the PDA 1 by the mail server 5-2 and receives the number of the mails.

In step S37, the mail sending/receiving program 104 causes the USB interface 36 to send the mail addressed to the user of the PDA 1 by the mail server 5-2 and receive the mail sent from the mail server 5-2. Then, the mail sending/receiving program 104 causes the USB interface 36 to request the mail server 5-2 for deleting the mail addressed to the user of the PDA 1. The mail server 5-2 accordingly deletes the mail addressed to the user of the PDA 1.

In step S39, the mail sending/receiving program 104 causes the USB interface 36 to confirm the end of the processing with the mail server 5-2.

In step S40, the mail sending/receiving program 104 causes the USB interface 36 to disconnect the connection with the mail server 5-2, upon which the processing comes to an end.

Thus, the PDA 1 can receive the mail addressed to the user of the PDA 1 from the mail server 5-2.

Figure 24:
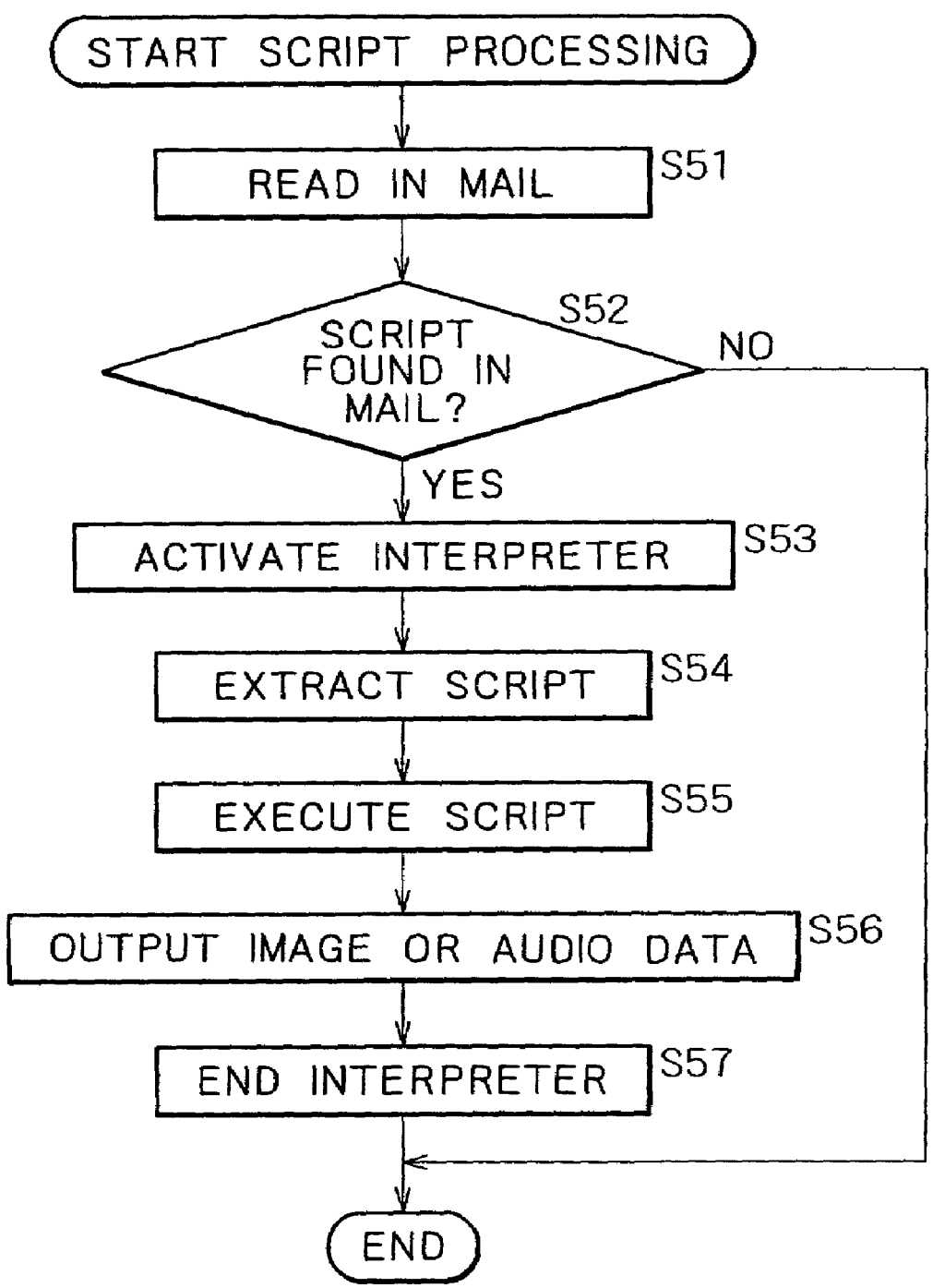
FIG. 24 is a flowchart describing script processing.

The following describes the script processing of the PDA 1 which executes the mail sending/receiving program 104 and the interpreter 106, the processing being executed when the mail sending/receiving program 104 displays a received mail message, with reference to the flowchart shown in FIG. 24. In step S51, the mail sending/receiving program 104 reads in the received mail message 151.

In step S52, the mail sending/receiving program 104 checks whether the read mail message 151 contains a script. If a script is found, the mail sending/receiving program 104 goes to step S53 to start the interpreter 106. The mail sending/receiving program 104 supplies the mail message 151 to the interpreter 106.

It should be noted that the interpreter 106 may have been started beforehand along with the mail sending/receiving program 104.

In step S54, the syntax analysis module 121 of the interpreter 106 extracts the script from the mail message 151 on the basis of the description of the mail message 151. In step S55, the execution module 122 of the interpreter 106 executes the extracted script.

In step S56, the output module 123 of the interpreter 106 executes an image display or audio output process depending on the result of the script execution. In step S57, the mail sending/receiving program 104 ends the interpreter 106, upon which the processing comes to an end.

In step S52, if no script is found, no script processing is required, so that the processes of steps S53 through S57 are skipped, upon which the processing comes to an end.

Thus, when a script is contained in the mail message 151, the PDA 1 activates the interpreter 106 to execute the processing corresponding to the script.

It should be noted that the process of step S52 may be executed by the syntax analysis module 121 of the already activated interpreter 106.

Figure 25:
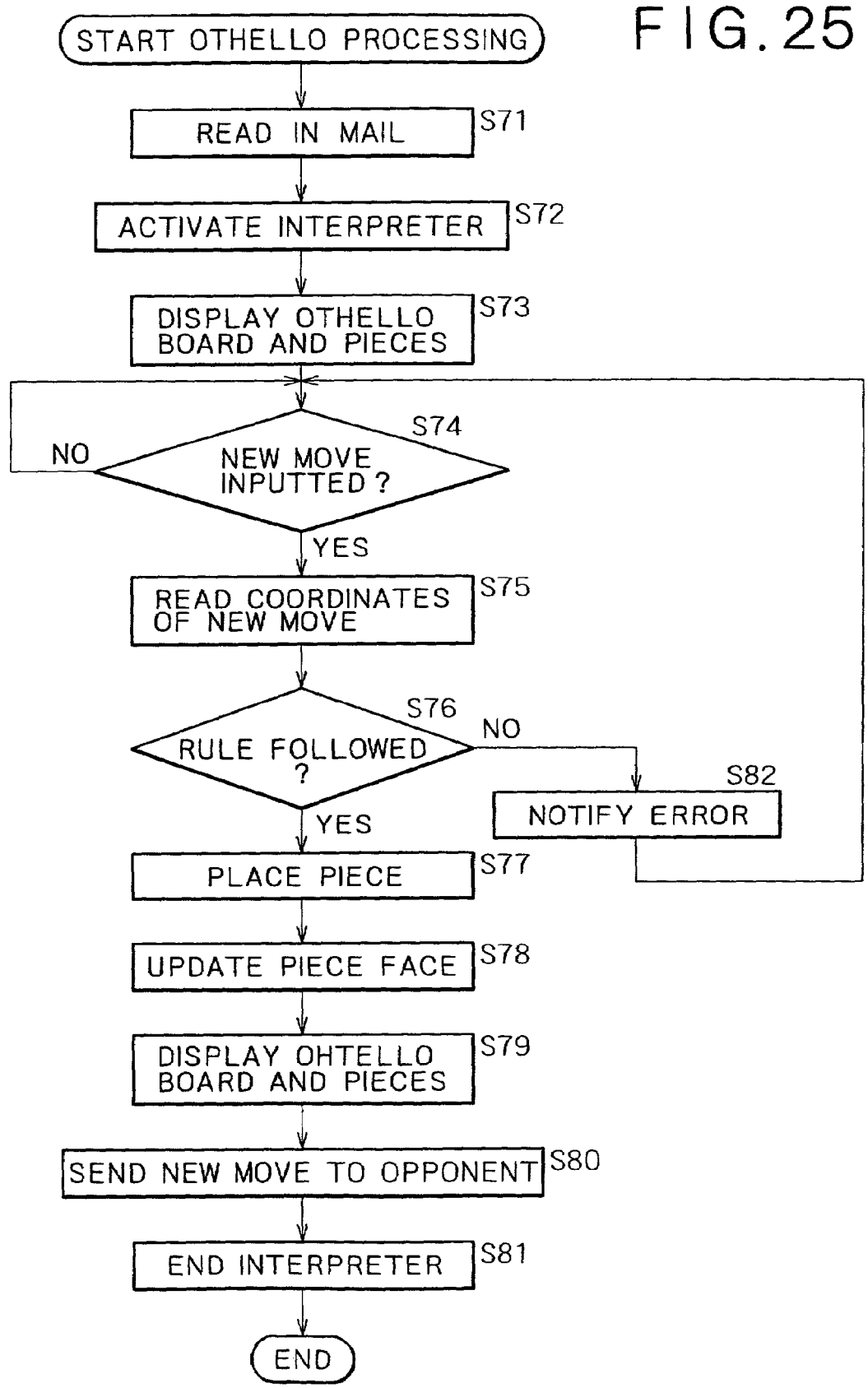
FIG. 25 is a flowchart describing Othello processing.

The following describes the processing of Othello, which is a more specific example of the script execution, with reference to the flowchart shown in FIG. 25. In step S71, the mail sending/receiving program 104 reads in a received message 151.

In step S72, the mail sending/receiving program 104 activates the interpreter 106. In step S73, the output module 123 of the interpreter 106 displays an Othello board and pieces on the display section 11.

In step S74, the execution module 122 determines whether a new move has been made. If no new move is found, the execution module 122 repeats the decision process of step S74 until new move is found.

If a new move is found in step S74, then the execution module 122 reads the coordinates (indicative of a position on the Othello board) of the new move in step S75. In step S76, the execution module 122 determines whether the new move satisfies the requirements specified in the Othello rule. If the new move is found satisfying the requirements, the execution module 122 goes to step S77 to place a piece to the position on the Othello board corresponding to the new move.

In step S78, the execution module 122 executes piece update operation such as reversing the faces of a particular piece. In step S79, the output module 123 displays an Othello board and pieces on the display section 11.

In step S80, the output module 123 causes the USB interface 36 to communicate a new move to the opponent. In step S81, the mail sending/receiving program 104 ends the interpreter 106, upon which the processing comes to an end.

In step S76, if the new move is found not satisfying the requirements of the Othello rule, then, in step S82, the output module 123 displays an error message on the display section 11 to notify the user of the error, upon which the procedure returns to step S74 to repeat the processing from inputting of a new move.

Thus, the PDA 1 executes the Othello game processing on the basis of the script included in the mail message 151.

As described, when the user reads the mail message 151, the PDA 1 executes an action desired by the sender of the mail message 151. If the user does not read the mail message 151, the PDA 1 does not execute the script included in the mail message 151, so that the load of the script processing is minimized.

The PDA 1 can execute various processes corresponding to script descriptions only by executing the interpreter 106, so that, as compared with attaching data to mail, there is no need for storing many application programs corresponding to the kinds of the attached data.

In addition, because the interpreter 106 executes scripts, if the interpreter 106 is security installed, the processing can be executed more safely as compared with the processing directly executed by execution programs attached to mail.

The following describes a mail sending/receiving system practiced as a second embodiment of the invention.

Figure 26:
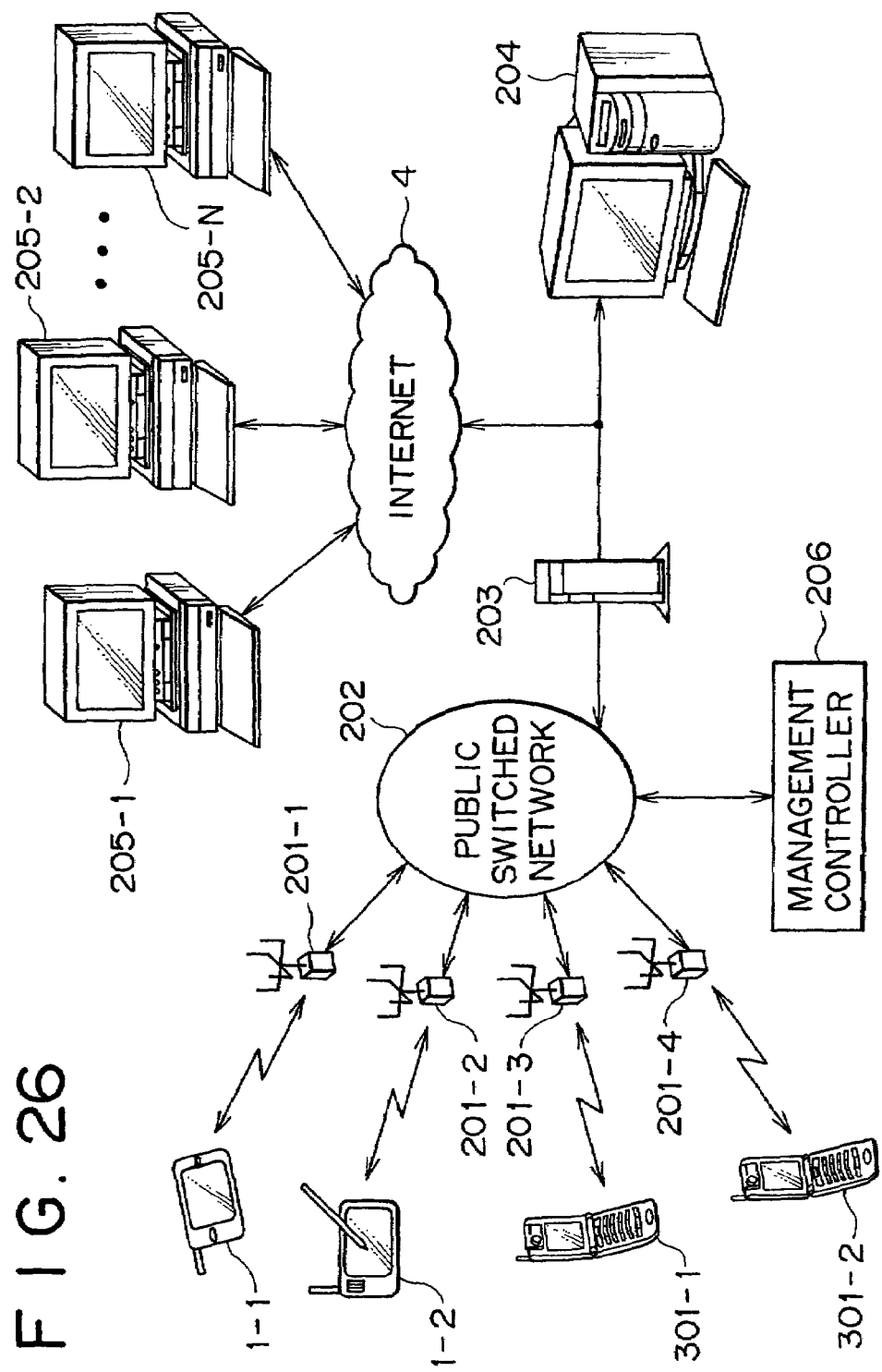
FIG. 26 is a schematic diagram illustrating a mail sending/receiving system practiced as a second embodiment of the invention.

FIG. 26 shows a mail sending/receiving system practiced as a second embodiment of the invention. A public switched network 202 is connected to PDA 1-1 or 1-2 or mobile digital camera phones 301-1 and 301-2 via base stations 201-1 through 201-4, which are stationary wireless stations, each arranged in each of cells obtained by dividing a communication service provision area into a desired size.

The base stations 201-1 through 201-4 wirelessly connect the mobile wireless stations PDAs 1-1 and 1-2 and the mobile digital camera phones 301-1 and 301-2 by code division multiple access, for example W-CDMA (Wideband Code Division Multiple Access) and can communicate mass data with the PDAs 1-1 and 1-2 and the mobile digital camera phones 301-1 and 301-2 at a maximum data transfer rate of 2 Mbps by use of 2 GHz frequency band. Because PDAs 1-1 and 1-2 and the mobile digital camera phones 301-1 and 301-2 can communicate mass data with the base stations 201-1 through 201-4 at the high data transfer rate based on W-CDMA, various kinds of data communication of not only audio talk but also electronic mail sending/receiving, simplified home page browsing, and image sending/receiving can be executed.

The base stations 201-1 through 201-4 are connected to the public switched network 202 by wired line. The public switched network 202 is connected to the Internet 4, a subscriber wired terminal device, a computer network, and a corporate intranet for example, not shown.

An access server 203 of an Internet service provider is connected to the public switched network 202 and to a content server 204 owned by the Internet service provider.

In response to a request from the subscriber wired terminal device, the PDA 1-1 or 1-2, or the mobile digital camera phone 301-1 through 301-4, the content server 204 provides content such as a simplified home page for example in the form of a compact HTML (Hyper Text Markup Language).

The Internet 4 is connected to many WWW (World Wide Web) servers 205-1 through 205-N. The WWW servers 205-1 through 205-N are accessed from the subscriber wired terminal devices, the PDAs 1-1 and 1-2 and the mobile digital camera phones 301-1 and 301-2 in accordance with the TCP (Transmission Control Protocol)/IP (Internet Protocol) standard.

With the PDAs 1-1 and 1-2 and the mobile digital camera phones 301-1 and 301-2, the communication with the base stations 201-1 through 201-4 is made by 2-Mbps simplified transport protocol, while the communication from the base stations 201-1 through 201-4 to the Internet 4 and the WWW servers 205-1 through 205-N is made by TCP/IP.

It is to be noted that a management controller 206 is connected via the public switched network 202 to the subscriber wired terminal devices, the PDAs 1-1 and 1-2, and the mobile digital camera phones 301-1 and 301-2 to perform authentication processing and charge processing on the subscriber wired terminal devices, the PDAs 1-1 and 1-2, and the mobile digital camera phones 301-1 and 301-2.

The mobile digital camera phones 301-1 and 301-2 send or receive mail by the same processing as that of the PDA 1 via the public switched network 202 and the Internet 4. The mobile digital camera phones 301-1 and 301-2, if a script is contained in the received mail, activate the interpreter 106 to execute the script.

In what follows, the mobile digital camera phones 301-1 and 301-2 are generically referred to as a mobile digital camera phone 301 unless they need to be specifically distinguished between.

Figure 27:
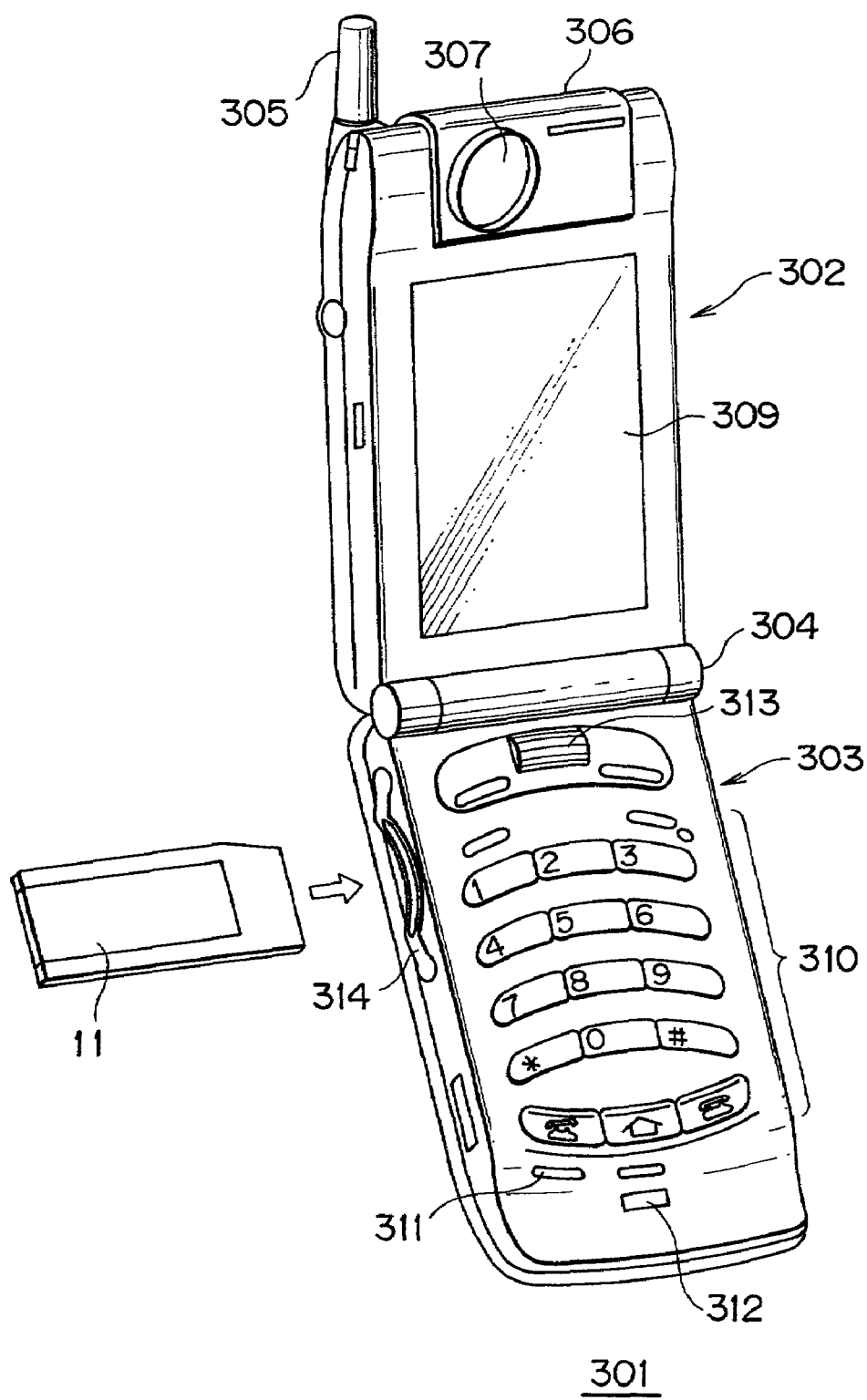
FIG. 27 is a perspective view illustrating an external view of a mobile digital camera phone.

The following describes an external configuration of the mobile digital camera phone 301 to which the present invention is applied. As shown in FIG. 27, the mobile digital camera phone 301 is composed of a display section 302 and a main body 303 and collapsible around a hinge 304 at the center.

The display section 302 has a retractable sending/receiving antenna 305 at the upper left side. The mobile digital camera phone 301 sends and receive radio waves with any of the base stations 201-1 through 201-4, which are stationary wireless stations, via the antenna 305.

The display section 302 has a camera section 306 which is pivotable in a range of about 180 degrees at the upper center section. The mobile digital camera phone 301 images desired objects by a CCD camera 307 housed in the camera section 306.

Figure 28:
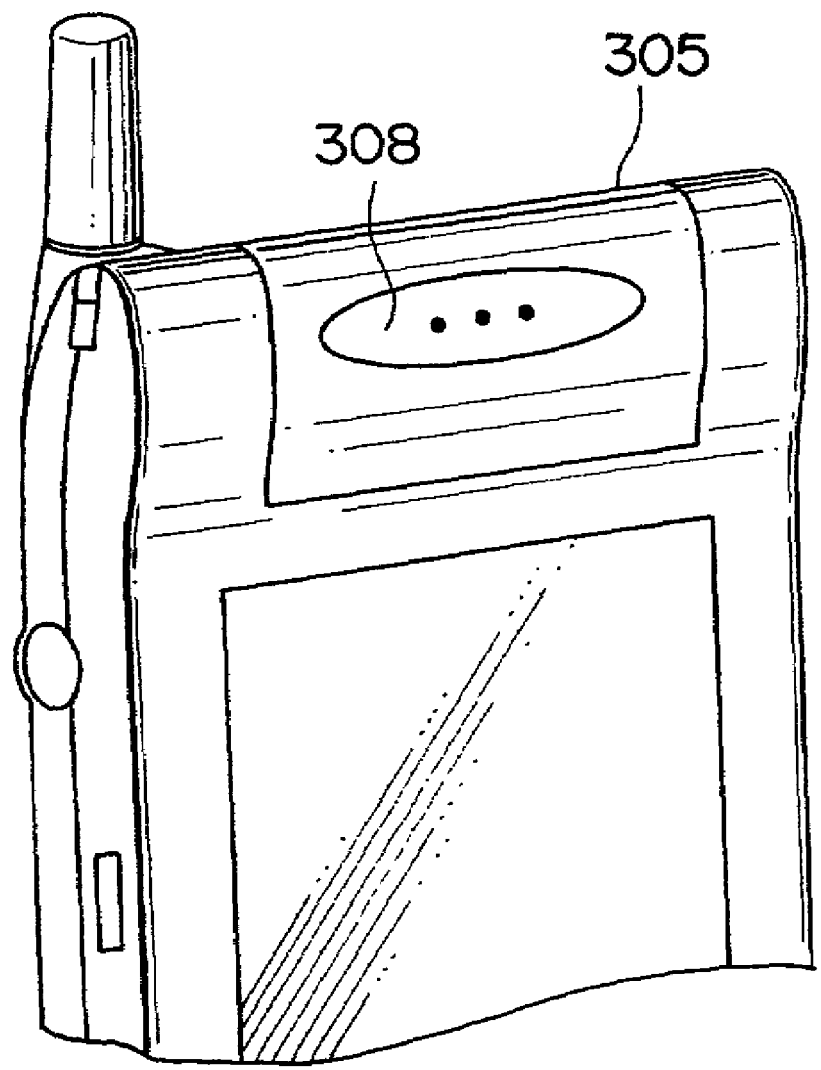
FIG. 28 is a partial perspective view illustrating an external view of a display section of the mobile digital camera phone.

If the camera section 306 is rotated by the user about 180 degrees, the display section 302 is positioned with a speaker 308 arranged at the rear center of the camera section 306 faced to the front side as shown in FIG. 28. Thus, the mobile digital camera phone 301 gets in the normal talk mode.

In addition, the display 302 has a liquid crystal display 309 at the front center section. The liquid crystal display 309 displays the contents of electronic mail, a simplified home page, and an image taken by the CCD camera 307 of the camera section 306 in addition to radio wave reception status, battery remaining amount, and names and numbers of phones and call log registered as a telephone directory.

On the other hand, the main body 303 has operation keys 310 such as numeric keys of "0" through "9", a call key, a redial key, a clear/power key, a clear key, and an electronic mail key on the front surface. Various commands are inputted from these operation keys 310 into the mobile digital camera phone 301.

Below the operation keys 310 of the main body 303, a memo button 311 and a microphone 312 are arranged. When the memo button 311 is pressed, the mobile digital camera phone 301 records the voice of the other party on the phone. The mobile digital camera phone 301 picks up the voice of the user in the talk mode through the microphone 312.

In addition, a rotatable jog dial 313 is arranged over the operation keys 310 on the main body 303 in a manner in which the jog dial 313 is slightly projecting from the surface of the main body 303. In accordance with the rotary operation of the jog dial 313, the mobile digital camera phone 301 executes the scrolling of a telephone directory list or electronic mail messages displayed on the liquid crystal display 309, the turning of the displayed pages of simplified home page, and the feeding of displayed images, for example.

For example, the main body 303 selects a desired telephone number from among those in a telephone directory list displayed on the liquid crystal display 309 by the rotation of the jog dial 313 by the user and, when the jog dial 313 is pressed into the main body 303, enters the selected telephone number, thereby automatically originating a call to the party at the selected telephone number.

It should be noted that a battery pack, not shown, is loaded in the main body 303 at the rear side. When the clear/power key is turned on, power is supplied from the battery pack to each circuit, making the mobile digital camera phone 301 ready for operation.

The main body 303 also has a Memory Stick slot 314 at the upper left side in which the detachable Memory Stick 11 is loaded. When the memo button 311 is pressed, the mobile digital camera phone 301 records the voice of the other party on the phone into the loaded Memory Stick 11. In accordance with the operation of the user, the mobile digital camera phone 301 records an electronic mail message, a simplified home page, or an image taken by the CCD camera 307 into the loaded Memory Stick 11.

The Memory Stick 11 is a kind of flash memory card developed by Sony Corporation, the applicant hereof. The Memory Stick 11 incorporates a flash memory element, one kind of EEPROM (Electrically Erasable and Programmable Read Only Memory), housed in a plastic casing having dimensions of 21.5 mm×50 mm×2.8 mm. The Memory Stick allows writing and reading of various data such as images, voices, and music via a 10-pin terminal.

The Memory Stick 11 uses a proprietary serial protocol which guarantees compatibility with the devices in which it is used even if the specifications of the incorporated flash memory have been changed due to the increase in its capacity for example, realizes the high-speed performance of maximum write rate of 1.5 MB/S and maximum read rate of 2.45 MB/S, and ensures the high reliability by the provision of an error deletion preventing switch.

Consequently, the mobile digital camera phone 301, configured to detachably load the Memory Stick 11, can share data with other electronic devices via the Memory Stick 11.

Figure 29:
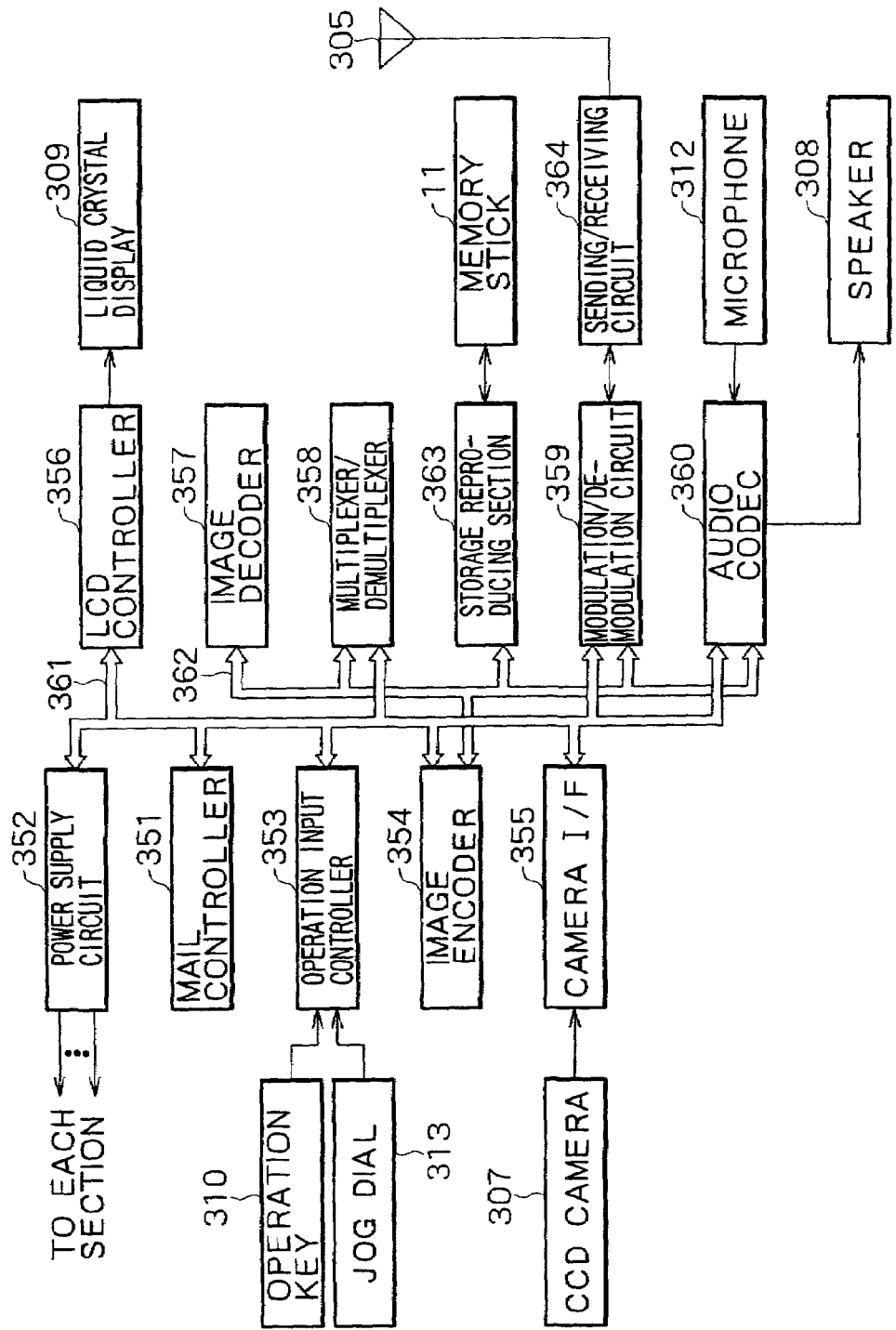
FIG. 29 is a block diagram illustrating a configuration of the mobile digital camera phone.

As shown in FIG. 29, the mobile digital camera phone 301 is configured so that a main controller 351 for centrally controlling each portions of the display section 302 and the main body 303 is connected to a power supply circuit 352, an operation input controller 353, an image encoder 354, a camera interface 355, an LCD (Liquid Crystal Display) controller 356, an image decoder 357, a multiplexer/demultiplexer 358, a storage reproducing section 363, a modulation/demodulation circuit 359, and an audio codec 360 via a main bus 361, and the image encoder 354, the image decoder 357, the multiplexer/demultiplexer 358, the modulation/demodulation circuit 359, and the audio codec 360 are interconnected by a synchronous bus 362.

The power supply circuit 352, when the clear/power key is turned on by the user, supplies power from the battery pack to each component circuit, thereby making the mobile digital camera phone 301 ready for operation.

Under the control of the main controller 351 composed of a CPU, a ROM, and a RAM for example, the mobile digital camera phone 301 converts an audio signal picked up by the microphone 312 in the talk mode into digital audio data through the audio codec 360. The mobile digital camera phone 301 performs spread spectrum on the digital audio data through a modulation/demodulation circuit 359 and performs digital-to-analog conversion and then frequency conversion on the digital audio data through the a sending/receiving circuit 364, sending the resultant digital audio data via the antenna 305.

The mobile digital camera phone 301 amplifies a receive signal received at the antenna 305 in the talk mode, performs frequency conversion and analog-to-digital conversion on the amplified receive signal, performs spread spectrum on the converted signal through the modulation/demodulation circuit 359, and converts the resultant signal into an analog audio signal through the audio codec 360. The mobile digital camera phone 301 outputs a sound corresponding to this analog audio signal from the speaker 308.

Further, in the data communication mode, when sending electronic mail, the mobile digital camera phone 301 sends the text data of electronic mail inputted from the operation keys 310 and the jog dial 313 to the main controller 351 via the operation input controller 353.

The main controller 351 performs spread spectrum on the text data through the modulation/demodulation circuit 359 and then performs digital-to-analog conversion and frequency conversion through the sending/receiving circuit 364, sending the resultant text data to a corresponding base station via the antenna 305.

In the data communication mode, when receiving electronic mail, the mobile digital camera phone 301 performs reverse spread spectrum, through the modulation/demodulation circuit 359 on the receive signal received from the base station CS3 via the antenna 305 to restore the original data and displays the original data on the liquid crystal display 309 through the LCD controller 356 as an electronic mail message.

In the data communication mode, when sending or receiving electronic mail, the main controller 351 executes the mail sending/receiving program 104 and the interpreter 106.

The LCD controller 356 is connected to the liquid crystal display 309 via a flexible printed circuit board having a panel ID setting section like a flexible printed circuit board 11.

Then, the mobile digital camera phone 301 also can record the received electronic mail in accordance with the operation by the user into the Memory Stick 11 via the storage reproducing section 363.

In the data communication mode, when sending image data, the mobile digital camera phone 301 supplies the image data taken by the CCD camera 307 to the image encoder 354 via the camera interface 355.

When not sending image data, the mobile digital camera phone 301 can also display the image data taken by the CCD camera 307 onto the liquid crystal display 309 via the camera interface 355 and the LCD controller 356.

The image encoder 354 converts the image data supplied from the CCD camera 307 into coded image data by coding and compressing based on MPEG2 (Moving Picture Experts Group 2) or MPEG4 for example and sends the coded image data to the multiplexer/demultiplexer 358.

At this moment, the mobile digital camera phone 301 sends an audio signal picked up by the microphone 312 while taking the image by the CCD camera 307 to the multiplexer/demultiplexer 358 via the audio codec 360 as audio data.

The multiplexer/demultiplexer 358 multiplexes the coded image data supplied from the image encoder 354 with the audio data supplied from the audio codec 360 by a predetermined algorithm, performs spread spectrum on the resultant multiplex data through the modulation/demodulation circuit 359, and performs digital-to-analog conversion and frequency conversion through the sending/receiving circuit 364, outputting the resultant data via the antenna 305.

In the data communication mode, when receiving the data of a moving image file linked with a simplified home page for example, the mobile digital camera phone 301 performs reverse spread spectrum on the receive signal received from the corresponding base station via the antenna 305 through the modulation/demodulation circuit 359 and sends the resultant multiplex data to the multiplexer/demultiplexer 358.

The multiplexer/demultiplexer 358 divides the multiplex data into code image data and audio data, supplying the coded image data to the image decoder 357 and the audio data to the audio codec 360 via the synchronous bus 362.

The image decoder 357 generates reproduced moving image data by decoding the coded image data by the corresponding predetermined decoding algorithm such as MPEG2 or MPEG4 for example and supplies the reproduced moving image data to the liquid crystal display 309 via the LCD controller 356. Consequently, the mobile digital camera phone 301 displays the moving image data contained in a moving image file linked with a simplified home page for example.

At the same time, the audio codec 360 converts the audio data into an analog audio signal and supplies it to the speaker 308. Consequently, the mobile digital camera phone 301 reproduces the audio data contained in the moving image file linked with the simplified home page for example.

In this case, as with electronic mail, the mobile digital camera phone 301 also can record the data linked with the received simplified home page into the Memory Stick 11 via the storage reproducing section 363 as operated by the user.

It should be noted that the present invention is applicable to not only the PDA 1 and the mobile digital camera phone 301 but also such terminal devices as a note-size personal computer, a PHS (Personal Handyphone System), and a car navigation system that send and receive electronic mail.

The following describes a detail configuration of the interpreter 106.

FIG. 30 shows an exemplary detailed configuration of the interpreter 106.

A mail syntax analysis block 502, a decoder 503, a syntax analysis block 505, a data structuring block 517, an encoder 518, and a mail generating block 519 shown in FIG. 30 correspond to the syntax analysis module 121 shown in FIG. 10.

A script interpreter 506, an authentication encryption block 507, a resource access manager 508, and a storage module 511 shown in FIG. 30 correspond to the execution module 122 shown in FIG. 10.

An I/O (Input/Output) module 510 shown in FIG. 30 corresponds to the output module 123 shown in FIG. 10.

The mail sending/receiving program 104 supplies a mail message 151 to be opened to the mail syntax analysis block 502 via a mail sending/receiving program 104 interface 501 or gets a mail message 151 generated by the mail generating block 519.

The mail syntax analysis block 502 analyzes the syntax of the mail message 151 supplied from the mail sending/receiving program 104 via the mail sending/receiving program interface 501 and extracts a script and data from the mail message 151. The mail syntax analysis block 502 supplies the extracted script and data to the decoder 503.

A script is a kind of program consisting of a sequence of commands in which a processing procedure is described by character codes such as alphanumeric characters.

The decoder 503 decodes data which is encoded by a coding algorithm such as Base64. Base64 is a binary data encoding algorithm for converting data or programs into 64-type ASCII code strings for transmitting data or programs over a network which transmits only 7-bit data.

It should be noted that the decoder 503 may be adapted to decode coded scripts.

The decoder 503 supplies the decoded script to the syntax analysis block 505 via an interface 504 and the decoded data to the script interpreter 506.

The syntax analysis block 505 replaces a predetermined character string included in the script by an intermediate code which can be processed by the script interpreter 506. The intermediate code is generally classified into (I) a text string such as a result of lexical analysis or a generated text string, (II) an analysis tree or a syntax tree generated as a result of syntax analysis or a tree structure based on Polish notation, and (III) a form near machine language such as a virtual machine code called three-pair or four-pair. In the present specification, the intermediate code denotes the analysis tree.

It should be noted that, in the Java language, the above (3) is called a byte code.

An intermediate code is a code which is temporarily generated for the purpose of convenience in the process of converting a source code in a software program into a finally executable form. Thus, by finely dividing the process of conversion from source to target, a language processing system can be made compatible with a plurality of platforms (or targets) with ease.

In the Java language for example, a source code is temporarily converted into an intermediate code called a byte code, which is stored in a WWW server. The WWW server sends this byte code to the WWW browser of the client side. The Java VM (Virtual Machine) of the client side interprets and executes the byte code. In this case, the difference between platforms (namely, the difference between CPUs and between operating systems) is dissolved by the Java VM, so that the byte code itself is independent of particular platforms. Consequently, in the Java language, the program environment independent of platforms can be realized while minimizing the run-time load (namely, the conversion from byte code to executable code).

In other high-level language compilers, too, a source code is not directly converted into an executable program (normally, a binary code which can be interpreted by the CPU), but it is often converted into an intermediate code which is higher in abstraction than an actual machine (by which code optimization is facilitated because of the freedom from the restrictions of actual machine architecture for example), subsequently generating a final executable binary code.

The syntax analysis block 505 supplies the script with a predetermined character string replaced by an intermediate code to the script interpreter 506.

The script interpreter 506 supplies the script to the authentication encryption block 507 to cause it to determine the validity of the script.

The authentication encryption block 507 applies a hash function such as MD5 (Message Digest 5) for example to the script to compute a hash value corresponding to the script. The authentication encryption block 507 determines whether the computed hash value matches the authentication data contained in the script.

FIG. 31 shows an exemplary mail message 151 which includes authentication data.

In the mail message 151 shown in FIG. 31, the data such as "347a9d8684ab96533fb6b51906fdacf9" arranged between "<SIGNATURE>" and "</SIGNATURE>" is authentication data.

It should be noted that an electronic signature or certificate may be included in the mail message 151 to be authenticated by the authentication encryption block 507 on the basis of the electronic signature or certificate.

If the computed hash value is found matching the authentication data, the authentication encryption block 507 supplies the data indicative of the validity of the script to the script interpreter 506 because the script has not been modified.

If the computed hash value is found not matching the authentication data, the authentication encryption block 507 supplies the data indicative of the invalidity the script to the script interpreter 506 because the script has been modified.

When the data indicative of the invalidity of the script is supplied from the authentication encryption block 507, the script interpreter 506 does not execute that script.

When the data indicative of the validity of the script is supplied from the authentication encryption block 507, the script interpreter 506 executes that script on the basis of the data supplied from the decoder 503.

Thus, the script interpreter 506 executes only the valid scripts, so that the mail sending/receiving system associated with the present invention can prevent the attacks based on modified, invalid scripts, thereby guaranteeing the security in script execution.

When displaying an image on the display section 21 or retrieving data inputted from the touch pad, the script interpreter 506 causes the resource access manager 508 to execute the processing of image display or data retrieval.

When storing data into the flash ROM 33 or the EDO DRAM 34 or retrieving data from the flash ROM 33 or the EDO DRAM 34, the script interpreter 506 causes the resource access manager 508 to execute the processing of data storage or data retrieval.

When accessing a schedule note program 512, an address note program 513, a memo note program 514, a TODO note program 515, or an application program 516, the script interpreter causes the resource access manager 508 to access the schedule note program 512, the address note program 513, the memo note program 514, the TODO note program 515, or the application program 516.

When requested by the script interpreter 506 for displaying an image on the display section 21 or requested for retrieving the data inputted from the touch pad, the resource access manager 508 causes, via a platform resource access interface 509, the I/O module 510 to display the image on the display section 21 or retrieve the data inputted from the touch pad. The data inputted from the touch pad and retrieved by the I/O module 510 is supplied to the resource access manager 508 via the platform resource access interface 509.

The resource access manager 508 supplies the data inputted from the touch pad and retrieved by the I/O module 510 to the script interpreter 506.

When requested by the script interpreter 506 for storing data into the flash ROM 33 or the EDO DRAM 34 or requested for retrieving data from the flash ROM 33 or the EDO DRAM 34, the resource access manager 508 causes, via the platform resource access interface 509, the storage module 511 to store the data into the flash ROM 33 or the EDO DRAM 34 or retrieve data from the flash ROM 33 or the EDO DRAM 34. The data retrieved by the storage module 511 from the flash ROM 33 or the EDO DRAM 34 is supplied to the resource access manager 508 via the platform resource access interface 509.

The resource access manager 508 supplies the data retrieved by the storage module 511 from the flash ROM 33 or the EDO DRAM 34 to the script interpreter 506.

When requested by the script interpreter 506 for accessing the schedule note program 512, the address note program 513, the memo note program 514, the TODO note program 515, or the application program 516, the resource access manager 508 accesses the schedule note program 512, the address note program 513, the memo note program 514, the TODO note program 515, or the application program 516 via the platform resource access interface 509.

The schedule note program 512 is an application program for recording schedule to a schedule note or displaying recorded schedule.

The memo note program 514 is an application program for recording memo to a memo note or displaying recorded memo.

The TODO note program 515 is an application program for recording items to be done by the user or displaying recorded items to be done by the user.

The application program 516 executes predetermined processing.

The data structuring block 517, when sending desired data attached with the mail message 151, converts this data supplied from the script interpreter 506 into a predetermined data structure.

For example, when discontinuing the execution of the script and sending the data indicative of script execution status attached with the mail message 151, the script interpreter 506 supplies the data indicative of script execution status such as a program counter value or the data stored in a push-down stack to the data structuring block 517.

The data structuring block 517 converts the predetermined data indicative of the script execution status supplied from the script interpreter 506 into a predetermined data structure.

The data structuring block 517 supplies the data of the predetermined data structure to the encoder 518 via the interface 504.

When sending a desired script attached to the mail message 151, the script interpreter 506 supplies the script to the encoder 518 via the interface 504.

The encoder 518 encodes, by Base64 for example, the data having the predetermined structure supplied from the data structuring block 517. The encoder 518 supplies the coded data to the mail generating block 519. The encoder 518 supplies the script supplied from the script interpreter 506 to the mail generating block 509 without change.

It should be noted that the encoder 518 may be adapted to encode the script.

The mail generating block 519 generates a mail message 151 which stores the coded data and the script supplied from the encoder 518. The mail generating block 519 supplies the generated mail message 151 to the mail sending/receiving program 104 via the mail sending/receiving program plug-in interface 501.

The mail sending/receiving program 104 sends the mail message 151 supplied from the mail generating block 519.

A script launcher 520 selects, on the basis of the input from the touch pad of the display section 21, one of an Othello game script 531, a circulation mail script 532, an automatically deleted mail script 533, an animated mail script 534, and an update mail script 535 and supplies the selected script to the syntax analysis block 505 via the interface 504.

Figure 32:
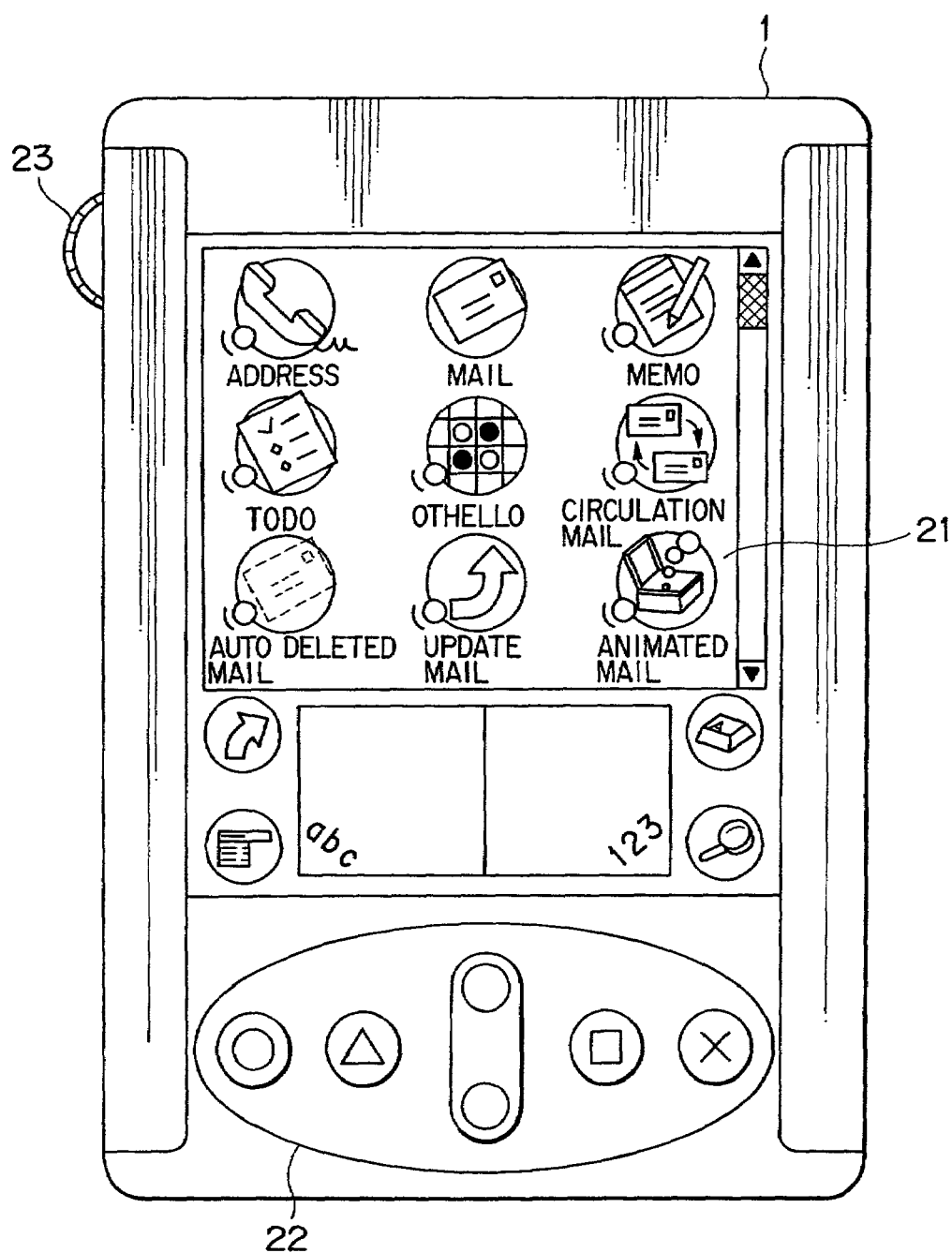
FIG. 32 is a front view illustrating exemplary icons displayed on the display section.

As shown in FIG. 32 for example, of the icons shown on the display section 21, if an icon labeled Othello is selected, the script launcher 520 reads the Othello game script 531 corresponding to the Othello icon from a script database 521 and supplies the script to the syntax analysis block 505 via the interface 504.

Of the icons shown on the display section 21, if an icon labeled circulation mail is selected, the script launcher 520 reads the circulation mail script 532 corresponding to the circulation mail icon from the script database 521 and supplies the script to the syntax analysis block 505 via the interface 504.

The syntax analysis block 505 replaces a predetermined character string included in the Othello game script 531, the circulation mail script 532, the automatically deleted mail script 533, the animated mail script 534 or the update mail script 535 by an intermediate code which can be processed by the script interpreter 506. The syntax analysis block 505 supplies the intermediate code script to the script interpreter 506.

The script interpreter 506 executes the Othello game script 531, the circulation mail script 532, the automatically deleted mail script 533, the animated mail script 534 or the update mail script 535, which character string is replaced by an intermediate code supplied from the syntax analysis block 505.

Thus, the interpreter 106 of which configuration is shown in FIG. 30 executes the script attached to the mail message 151 when it is opened, thereby executing the processing of displaying a predetermined image on the display section 21, the process corresponding to the touch pad operation on the display section 21, the storing of desired data into the flash ROM 33 or the EDO DRAM 34, or the retrieving data from the flash ROM 33 or the EDO DRAM 34, for example.

Therefore, the attachment of a script for executing predetermined processing to the mail message 151 allows its sender to cause its recipient to take desired actions quickly and securely.

For example, even if the recipient of the mail message 151 uses a small-sized terminal device, too small to make a prompt response to the mail, the sender of the mail message 151 can have its recipient make a response quickly and securely.

When the mail sending/receiving program 104 is going to open the message 151, the interpreter 106 executes the script attached thereto, so that the recipient of the mail need not acquire the corresponding script before the reception of the mail message 151.

A newly created script is transmitted as attached to the mail message 151, so that its recipient can quickly get the script, thereby quickly executing the newly created script.

Also, the interpreter 106 of which configuration is shown in FIG. 30 executes a stored script to execute the processing such as displaying a predetermined image on the display section 21, executing a process corresponding to a touch pad operation on the display section 21, storing desired data into the flash ROM 33 or the EDO DRAM 34, or retrieving data from the flash ROM 33 or the EDO DRAM 34, for example.

Moreover, the interpreter 106 of which configuration is shown in FIG. 30 executes a stored script to generate a mail message 151 storing a desired script, sending the created mail message 151 to the mail sending/receiving program 104.

The following describes the changing of platforms and script transmission media.

Figure 33:
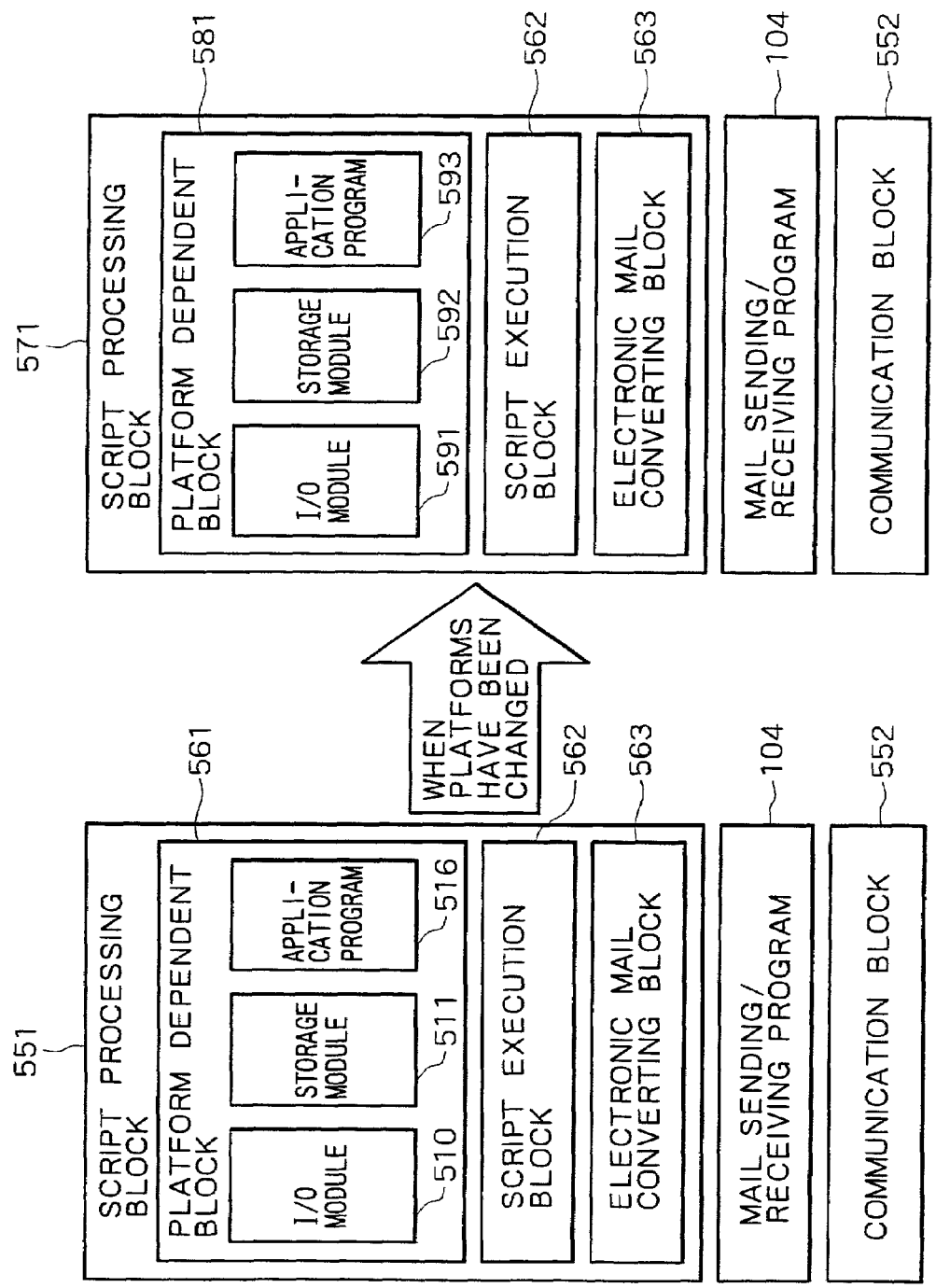
FIG. 33 is a diagram illustrating the changing of the components of the interpreter caused by the changing of platforms.

FIG. 33 illustrates the changing of the configuration of the interpreter 106 in which the OS 101 is changed to Windows CE (trademark of Microsoft Corporation) for example or another operating system.

A script processing block 551 shown in FIG. 33 consists of a platform dependent block 561, a script execution block 562, and an electronic mail converting block 563.

The platform dependent block 561 is composed of an I/O module 510, a storage module 511, and an application module 516.

The script execution block 562 corresponds to the syntax analysis block 505, the script interpreter 506, the authentication encryption block 507, the resource access manager 508, and the data structuring block 517 shown in FIG. 30.

The electronic mail converting block 563 corresponds to the mail sending/receiving program plug-in interface 501, the mail syntax analysis block 502, the decoder 503, the interface 504, the encoder 518, and the mail generating block 519 shown in FIG. 30.

A communication block 552 corresponds to the USB interface 36, shown in FIG. 5, which receives a mail message 151 via the cradle 2 and the Internet 4.

For example, a platform change, such as changing of the OS 101 to another operating system, takes place, a script processing block 571 corresponding to the changed platform is changed from the platform dependent block 561 to a platform dependent block 581. The script execution block 562 and the electronic mail converting block 563 remain unchanged.

The platform dependent block 581 is composed of an I/O module 591 corresponding to the changed platform, a storage module 592, and an application program 593.

Thus, if the platforms are changed, changing the platform dependent portions alone allows the interpreter 106 to execute the script attached to the mail message 151.

Figure 34:
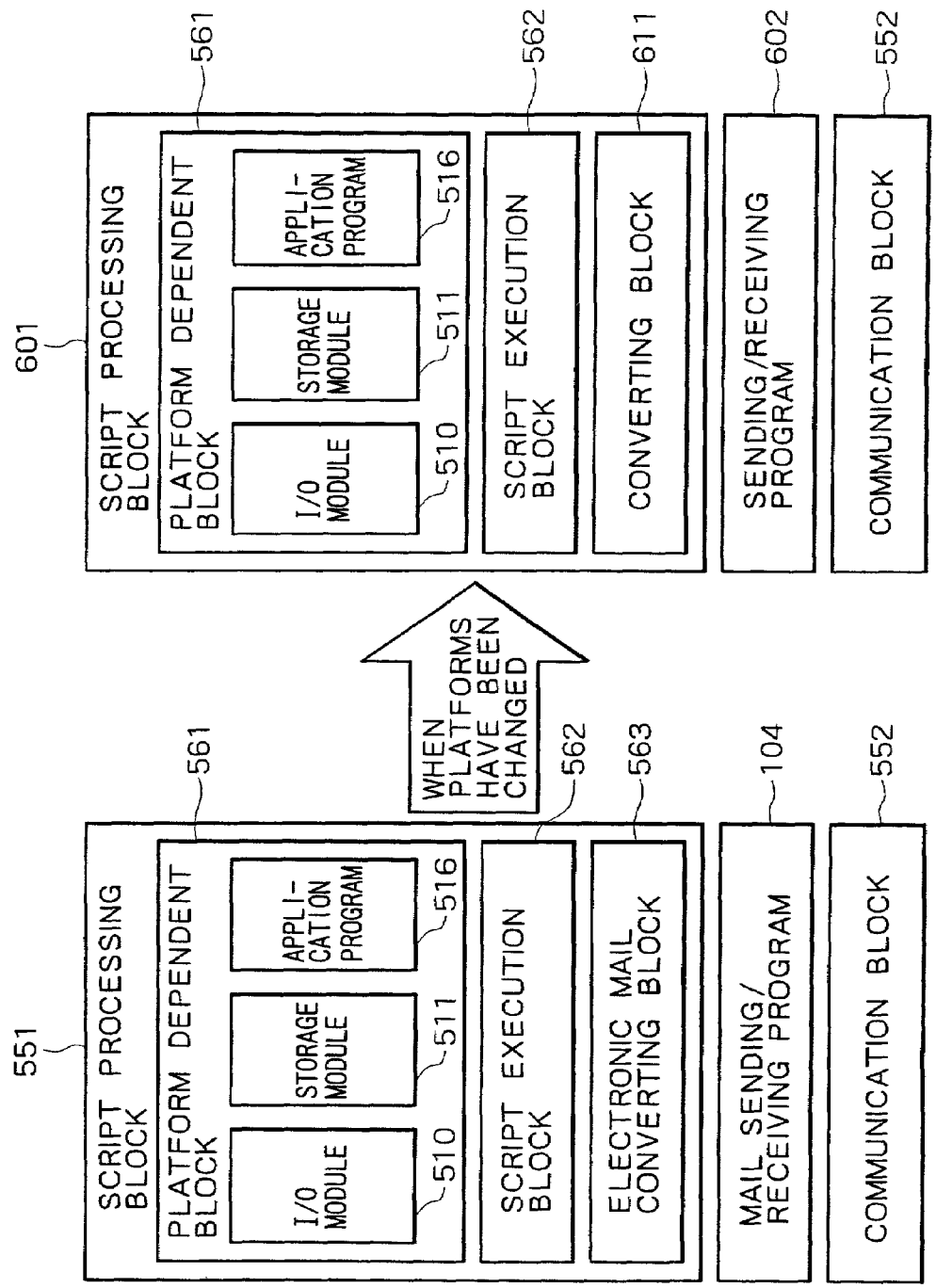
FIG. 34 is a diagram illustrating the changing of the components of the interpreter caused by the changing of script transmission media.

FIG. 34 illustrates a change in the configuration of the interpreter 106 when script transmission media have been changed such as transmitting a script itself by the communication compliant with the Bluetooth specification for example.

A script processing block 601 after the changing of script transmission media consists of a platform dependent block 561, a script execution block 562, and a converting block 611.

A sending/receiving program 602 is a program for causing a communication block 603 which executes communication compliant with the Bluetooth specification or the like to receive or send a script and data. The sending/receiving program 602 gets the script and data received by the communication block 603 and supplies the script and data to the converting block 611 of the platform dependent block 561.

In addition, the sending/receiving program 602 causes the communication block 603 to send the script and data supplied from the converting block 611.

The converting block 611 converts a predetermined character string in the script supplied from the sending/receiving program 602 and supplies the converted script to the script execution block 562. Further, the converting block 611 converts the script and data supplied from the script execution block 562 and supplies the converted script and data to the sending/receiving program 602.

The script execution block 562 executes the script supplied from the converting block 611.

Thus, even if the script transmission media are changed, changing of the transmission-dependent portion alone allow the interpreter 106 to execute scripts without changing of the whole transmission-dependent portion.

Figure 35:
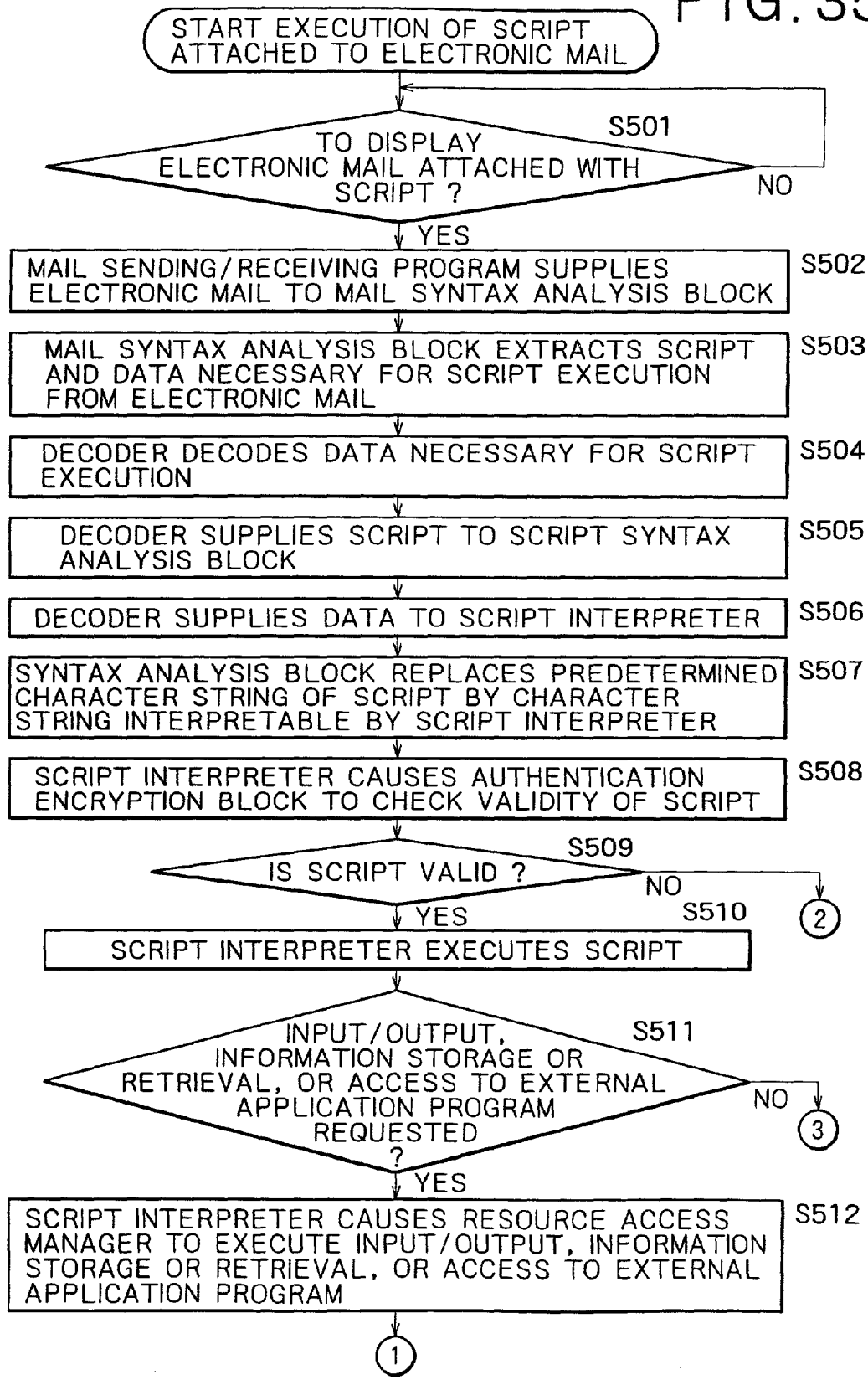
FIG. 35 is a flowchart describing the execution of a script attached to electronic mail by the interpreter of which configuration is shown in FIG. 30.
Figure 36:
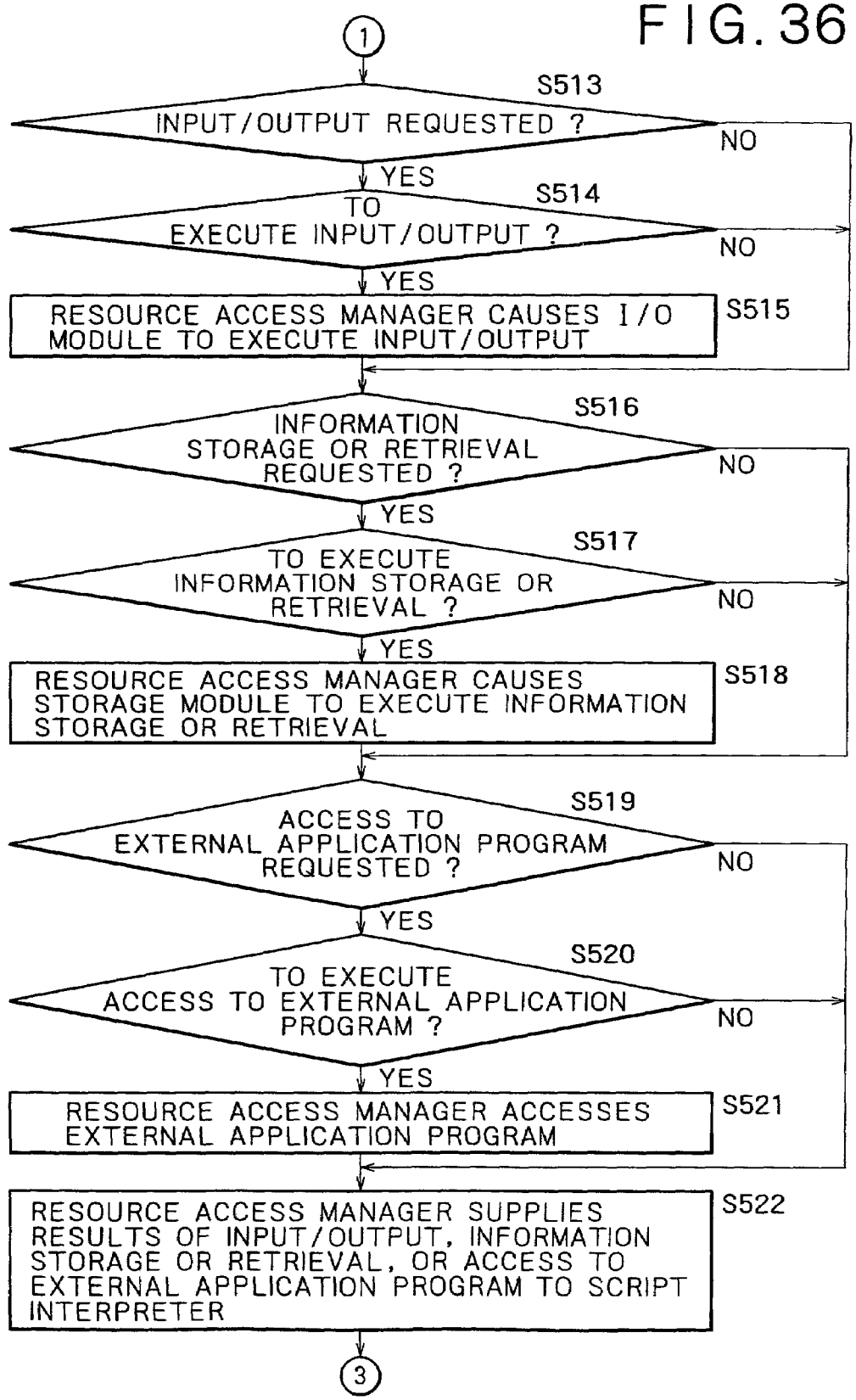
FIG. 36 is a flowchart describing the execution of the script attached to electronic mail by the interpreter of which configuration is shown in FIG. 30.
Figure 37:
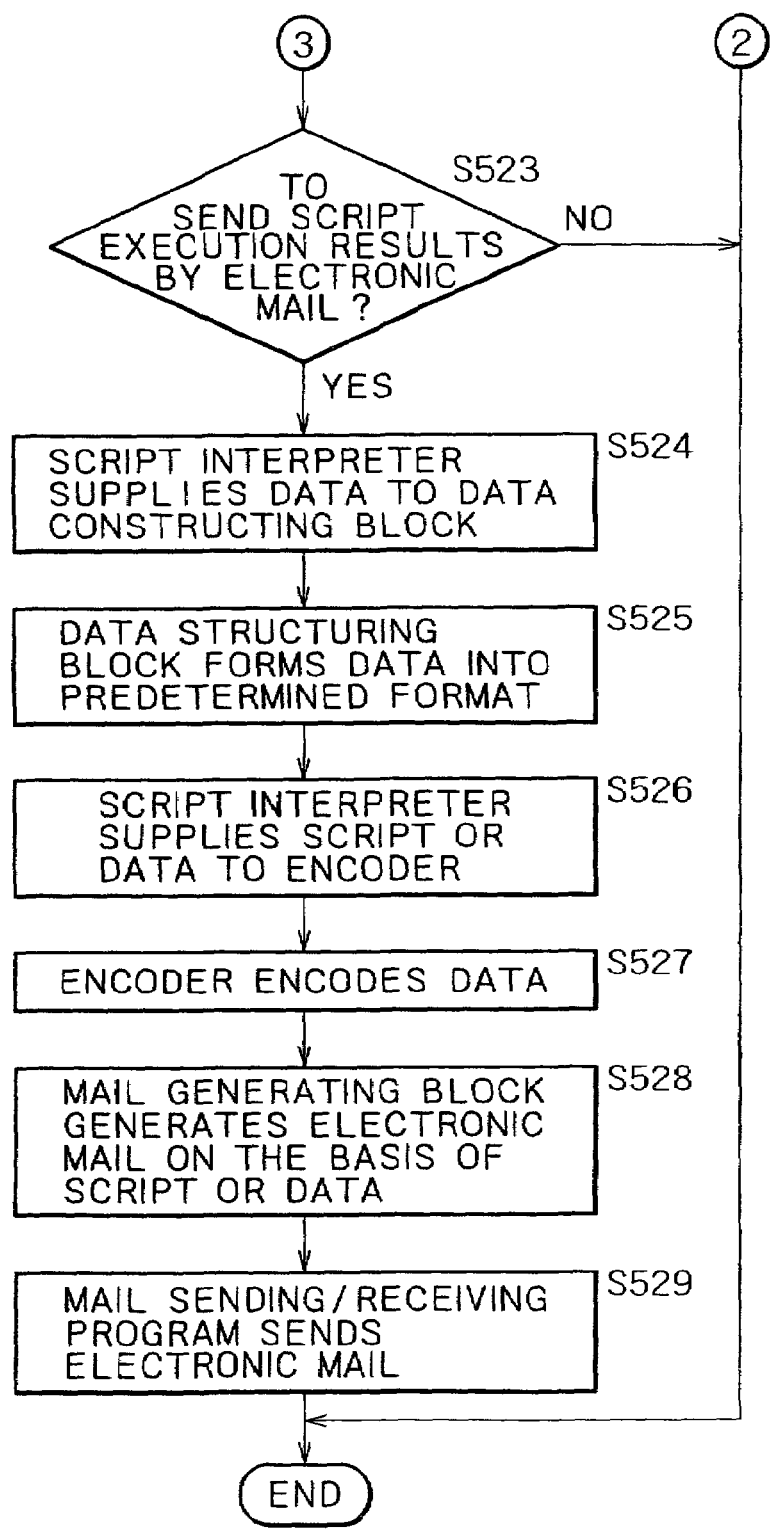
FIG. 37 is a flowchart describing the execution of the script attached to electronic mail by the interpreter of which configuration is shown in FIG. 30.

The following describes the execution of a script attached to electronic mail by the interpreter 106 of which configuration is shown in FIG. 30, with reference to the flowcharts shown in FIGS. 35 through 37.

In step S501, the mail sending/receiving program 104 determines whether the mail message 151 having a script is to be displayed or not. If the mail message 151 having a script is found not to be displayed, the procedure returns to step S501 to repeat the decision process.

In step S501, if the mail message 151 having a script is found to be displayed, then, in step S502, the mail sending/receiving program 104 supplies the mail message 151 to be opened to the mail syntax analysis block 502 via the mail sending/receiving program plug-in interface 501.

In step S503, the mail syntax analysis block 502 extracts the script and the data necessary for script execution from the mail message 151 obtained from the mail sending/receiving program 104. The data necessary for script execution is data corresponding to the program counter value or stack pointer value indicative of the script execution status when the script execution is discontinued, the data indicative of an Othello game piece arrangement, the data for drawing animation, the data for program updating, or the data indicative of electronic mail circulation status, for example.

The mail syntax analysis block 502 supplies the extracted script and data necessary for script execution to the decoder 503.

In step S504, the decoder 503 decodes, by Base64 for example, the data necessary for script execution supplied from the mail syntax analysis block 502.

In step S505, the decoder 503 supplies the script to the syntax analysis block 505 via the interface 504.

In step S506, the decoder 503 supplies the data necessary for script execution to the script interpreter 506 via the interface 504.

In step S507, the syntax analysis block 505 replaces a predetermined character string in the script supplied from the decoder 503 by an intermediate code which can be interpreted by the script interpreter 506. The syntax analysis block 505 supplies the script with the predetermined character string replaced by the intermediate code to the script interpreter 506.

In step S508, the script interpreter 506 supplies the script to the authentication encryption block 507 to cause it to check the validity of the script. The authentication encryption block 507 extracts authentication data from the script supplied from the script interpreter 506 and applies a hash function to the script to generate a hash value. The authentication encryption block 507 determines the validity of the script on the basis of a match between the extracted authentication data and the generated hash value.

The authentication encryption block 507 supplies the data indicative of the validity or invalidity of the script to the script interpreter 506.

In step S509, the script interpreter 506 determines on the basis of the data supplied from the authentication encryption block 507 whether the script is valid or not. If the script is found invalid, it indicates that the script has been modified, so that the processing comes to an end without executing the script.

In step S509, if the script is found valid, then the script interpreter 506 executes the script in step S510.

In step S511, the script interpreter 506 determines by executing the script whether input/output, information storage or retrieval, or access to external application program has been requested. If the request is found requested, then, in step S512, the script interpreter 506 causes the resource access manager 508 to execute the requested input/output operation, information storage or retrieval, or access to external application program.

In step S513, the resource access manager 508 determines whether an input/output operation has been requested. If an input/output operation is found requested, then, in step S514, the resource access manager 508 causes the I/O module 510 to display a dialog box on the display section 21 which prompts the user to input whether to execute the input/output operation, thereby determining whether to execute the input/output operation on the basis of the user input operation.

If the input/output operation is found to be executed in step S514, then the resource access manager 508 causes the I/O module 510 to execute the input/output processing such as image displaying in step S515, upon which the procedure goes to step S516.

If no input/output operation is found requested in step S513, it indicates that no input/output processing is required, so that the processes of steps S514 and S515 are skipped, upon which the procedure goes to step S516.

If the input/output operation is fount not to be executed in step S514, it indicates that no input/output operation should be executed, so that the process of step S515 is skipped, upon which the procedure goes to step S516.

In step S516, the resource access manager 508 determines whether information storage or retrieval has been requested or not. If information storage or retrieval is found requested, then, in step S517, the resource access manager 508 causes the I/O module 510 to display the dialog box on the display section 21 which prompts the user to input whether to execute the information storage or retrieval, thereby determining whether to execute the information storage or retrieval on the basis of the user input operation.

If the information storage or retrieval is found to be executed in step S517, then the resource access manager 508 causes the storage module 511 to execute information storage or retrieval with the flash ROM 33 for example in step S518, upon which the procedure goes to step S519.

If the information storage or retrieval is found not requested in step S516, it indicates that the information storage or retrieval processing is not required, so that the processes of steps S517 and S518 are skipped, upon which the procedure goes to step S519.

If the information storage or retrieval is found not to be executed in step S517, it indicates that the information storage or retrieval processing should not be executed, so that the process of step S518 is skipped, upon which the procedure goes to step S519.

In step S519, the resource access manager 508 determines whether access to an external application program such as the schedule note program 512, the address note program 513, the memo note program 514, the TODO note program 515, or the application program 516 has been requested or not. If the access to any of these external application programs is found requested, then, in step S520, the resource access manager 508 causes the I/O module 510 to display a dialog box on the display section 21 for making the user input whether to execute the access to any external application program, thereby determining whether to execute the access to any external application program on the basis of the input operation by the user.

If the access to an external application program is found to be executed in step S520, then the resource access manager 508 accesses the specified external application program in step S521, upon which the procedure goes to step S522.

If the access to an external application program is found not requested in step S519, it indicates that the processing of accessing an external application program is not required, so that the processes of steps S520 and S521 are skipped, upon which the procedure goes to step S522.

If the access to an external application program is found not to be executed in step S520, it indicates that the processing for accessing an external application program should not be executed, so that the process of step S521 is skipped, upon which the procedure goes to step S522.

In step S522, the resource access manager 508 supplies the results of the input/output operation, the information storage or retrieval, or the access to an external application program to the script interpreter 506.

In step S523, the script interpreter 506 determines on the basis of the user operation or the script description whether to send a script execution result by electronic mail. If the script execution result is to be sent, then, in step S524, the script interpreter 506 supplies to the data constructing block 517 the data to be attached to electronic mail such as script execution status indicating data which must be formed into a predetermined format.

In step S525, the data constructing block 517 forms the data supplied from the script interpreter 506 into a predetermined format. The data constructing block 517 supplies the formatted data to the encoder 518 via the interface 504.

In step S526, the script interpreter 506 supplies the script or data to be attached to electronic mail to the encoder 518 via the interface 504. The data to be supplied by the script interpreter 506 to the encoder 518 need not be formatted by the data constructing block 517.

In step S527, the encoder 518 encodes, by Base64 for example, the data supplied from the data constructing block 517 or the data supplied from the script interpreter 506. The encoder 518 supplies the coded data and script to the mail generating block 519.

In step S528, the mail generating block 519 generates a mail message 151 attached with the script or data on the basis of the script or data supplied from the encoder 518. The mail generating block 519 supplies the generated mail message 151 to the mail sending/receiving program 104 via the mail sending/receiving program plug-in interface 501.

In step S529, the mail sending/receiving program 104 sends the mail message 151 supplied from the mail generating block 519, upon which the processing comes to an end.

If, in step S511, an input/output operation, information storage or retrieval, or the access to an external application program is found not requested, it indicates that the processing for the input/output operation, information storage or retrieval, or the access to an external application program is not required, so that the processes of steps S512 through S522 are skipped, upon which the procedure goes to step S523, in which the script interpreter determines whether to send a script execution result by electronic mail.

If, in step S523, the script execution result is found not to be sent, it indicates that the processing for sending electronic mail is not required, so that the processes of steps S524 through S529 are skipped, upon which the processing comes to an end.

Thus, the interpreter of which configuration is shown in FIG. 30, when displaying the mail message 151 attached with a script, extracts the script from the mail message 151 and executes the extracted script.

When an input/output operation, information storage or retrieval, or the access to an external application program is requested by the execution of the script attached to the mail message 151, the interpreter 106 of which configuration is shown in FIG. 30 can execute the requested input/output operation, information storage or retrieval, or access to an external application program.

When the sending of a script execution result by electronic mail is requested, the interpreter 106 of which configuration is shown in FIG. 30 can send the mail message 151 attached with the script or data in accordance with the script execution result.

Figure 38:
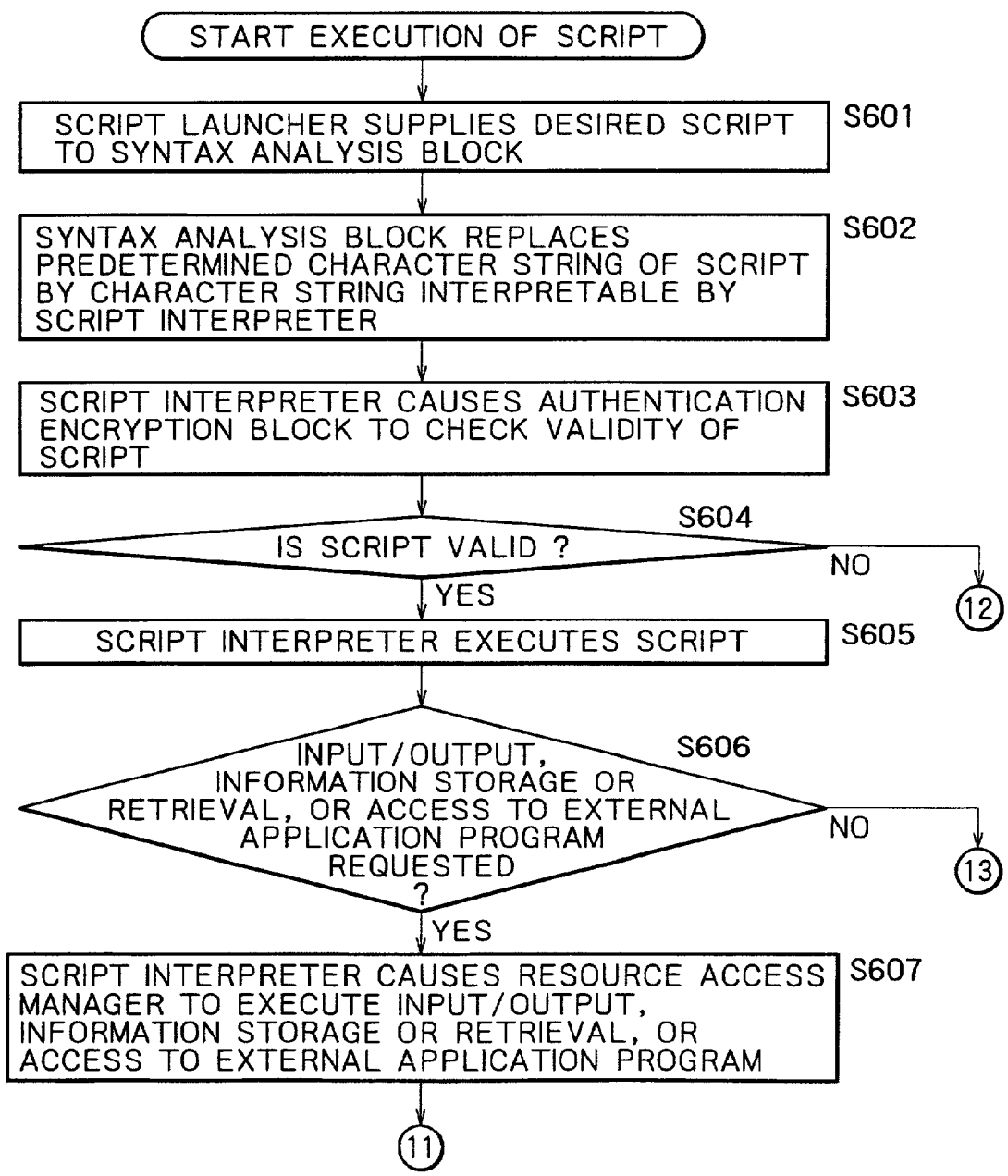
FIG. 38 is a flowchart describing the execution of a script stored in a script database by the interpreter of which configuration is shown in FIG. 30.
Figure 39:
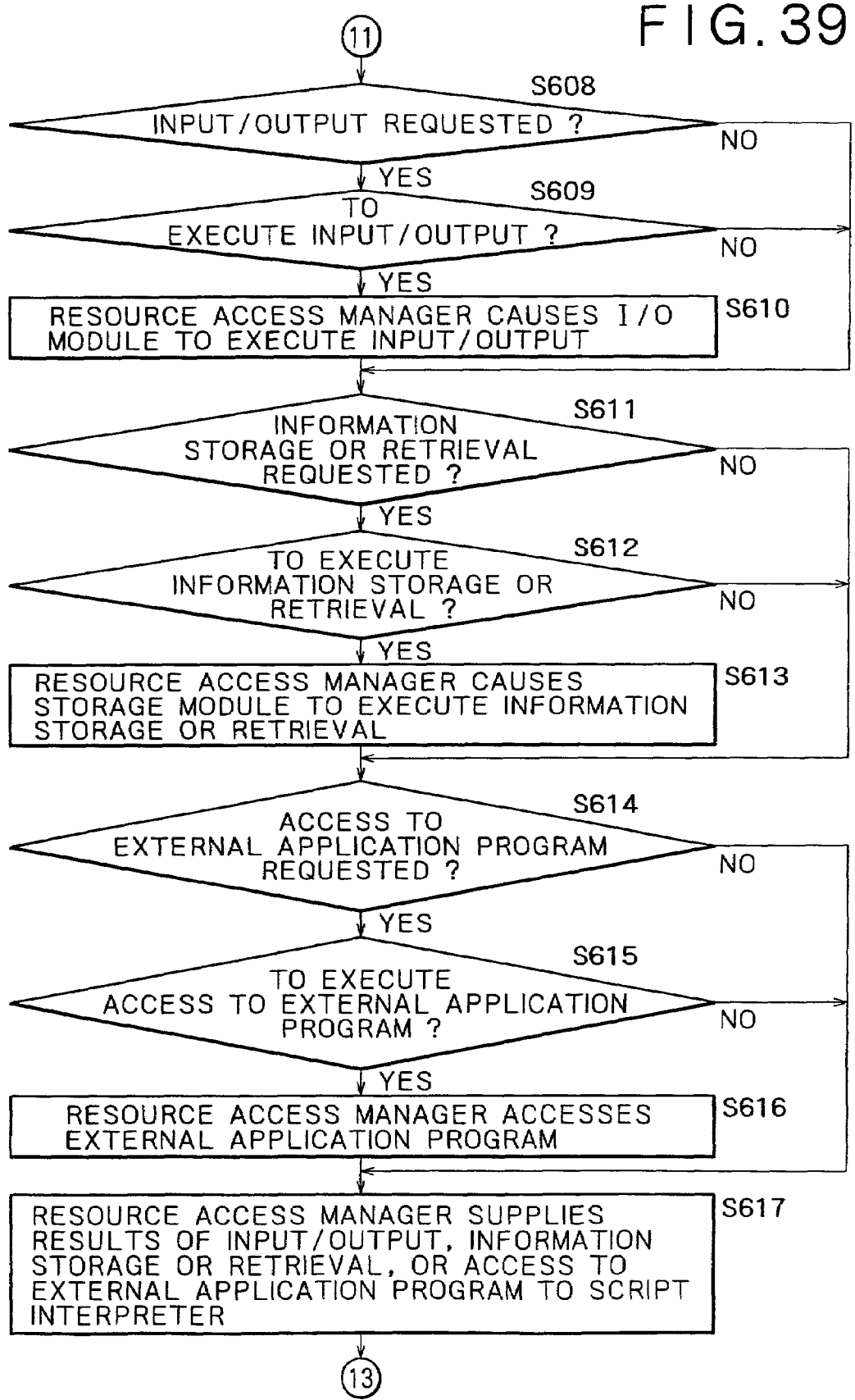
FIG. 39 is a flowchart describing the execution of the script stored in the script database by the interpreter of which configuration is shown in FIG. 30.
Figure 40:
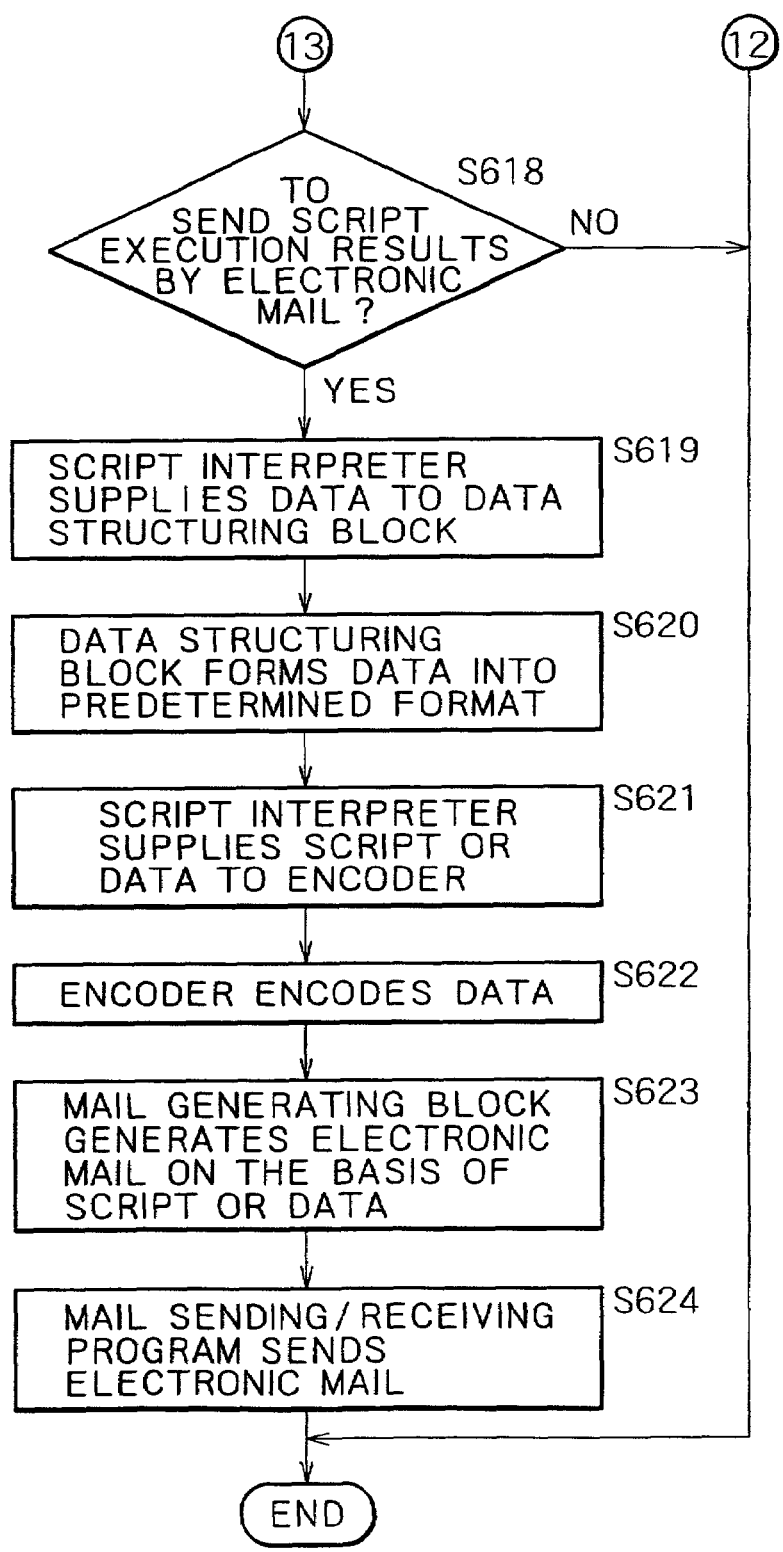
FIG. 40 is a flowchart describing the execution of the script stored in the script database by the interpreter of which configuration is shown in FIG. 30.

The following describes the processing for executing scripts stored in the script database 521 by the interpreter 106 of which configuration is shown in FIG. 30, with reference to the flowcharts shown in FIGS. 38 through 40.

In step S601, on the basis of the input from the touch pad, the script launcher 520 selects one of the Othello game script 531, the circulation mail script 532, the automatically deleted mail script 533, the animated mail script 534, and the update mail script 535 for example stored in the script database 521 and supplies the selected script to the syntax analysis block 505 via the interface 504.

The processes of steps S602 through S624 are the same as those of steps S507 through S529 and therefore their descriptions are omitted.

Thus, the interpreter 106 of which configuration is shown in FIG. 30 can execute the selected script stored in the script database.

When an input/output operation, information storage or retrieval, or an access to an external application program is requested by the execution of the stored script, the interpreter 106 of which configuration is shown in FIG. 30 can execute the requested input/output operation, information storage or retrieval, or access to an external application program.

By executing the selected script stored in the script database, the interpreter 106 of which configuration is shown in FIG. 30 can send the mail message 151 attached with the script or data.

The above-mentioned sequences of processes can be executed by hardware or software. The execution by software is supported by a computer in which the programs constituting the software are installed in a dedicated hardware device beforehand or by a general-purpose personal computer for example, capable of executing various capabilities in which these programs are installed from a recording medium.

The recording medium may be a package medium constituted by the magnetic disk 61 (including floppy disk), the optical disc 62 (including CD-ROM (Compact Disc-Read Only Memory) and DVD (Digital Versatile Disc)), the magneto-optical disk 63 (including MD (Mini Disk)), or the semiconductor memory 64 shown in FIG. 5 or the flash ROM 33 or a hard disk in which programs are stored temporarily or permanently. The storage of programs in these recording media is executed by use of wired or wireless communication media such as the public switched network 202, a local area network, the Internet 4, or digital satellite broadcasting via the interfaces such as router and modem as required.

It should be noted that the steps describing the programs to be stored in the program storage medium are not only executed in a time-dependent manner in the order described, but also in parallel or in a discrete manner.

Term "system" used herein denotes a total apparatus composed of a plurality of component devices.

While a preferred embodiment of the present invention has been described using specific terms, such description is for illustrative purposes only, and it is to be understood that changes and variations may be made without departing from the spirit or scope of the following claims.

What is claimed is:

1. A receiving apparatus for receiving mail of a sending apparatus, comprising:

extracting means for extracting a script and data attached to said mail as an attachment file in operative association with a command for opening said mail;

executing means for executing syntax analysis on said extracted script; and output control means for executing processing corresponding to said data accompanying said script or corresponding to an input event and controlling the output of a result of said processing, wherein said data is status information of specific point of processing, which has been executed by said sending apparatus.

2. The receiving apparatus according to claim 1, wherein said output control means sends return mail corresponding to said mail in accordance with the execution of said script.

3. A communication system having a sending apparatus for sending mail and a receiving apparatus for receiving said mail, wherein said sending apparatus comprises:

a generator configured to generate by executing a first script, a second script and status information of specific point of processing, which has been executed by said sending apparatus, to be stored in said mail;

a memory configured to store said second script and said data into said mail; and a sending controller configured to control the sending of said mail storing said second script and said data;

said receiving apparatus comprises:

an extractor configured to extract said second script and data in operative association with a command for opening said mail;

an execution unit configured to execute syntax analysis on said extracted second script; and an output controller configured to execute processing corresponding to said data accompanying said second script or corresponding to an input event and controlling the output of a result of said processing, wherein said data is status information of specific point of processing, which has been executed by said sending apparatus.

4. A receiving method for a receiving apparatus for receiving mail, comprising the steps of:

extracting a script and data attached to said mail as an attachment file in operative association with a command for opening said mail, said data being status information of specific point of processing, which has been executed by said sending apparatus;

executing syntax analysis on said extracted script; and executing processing corresponding to data accompanying said script or corresponding to an input event and controlling the output of a result of said processing.

5. A recording medium storing a computer-readable program for processing reception of mail, comprising the steps of:

extracting a script and data attached to said mail as an attachment file in operative association with a command for opening said mail, said data being status information of specific point of processing, which has been executed by said sending apparatus;

executing syntax analysis on said extracted script; and executing processing corresponding to data accompanying said script or corresponding to an input event and controlling the output of a result of said processing.

6. A sending apparatus for sending mail comprising:

generating means for generating, by executing a first script, a second script and status information of specific point of processing, which has been executed by said sending apparatus, to be stored in said mail;

storage means for storing said second script and said data into said mail; and sending control means for controlling the sending of said mail storing said second script and said data.

7. A recording medium storing a computer-readable program for processing sending of mail, said program comprising the steps of:

generating, by executing a first script, a second script and status information of specific point of processing, which has been executed by said sending apparatus, to be stored in said mail;

storing said second script and said data into said mail; and controlling the sending of said mail storing said second script and said data.

8. A sending method for a sending apparatus for sending mail, comprising the steps of:

generating, by executing a first script, a second script and status information of specific point of processing, which has been executed by said sending apparatus, to be stored in said mail;

storing said second script and said data into said mail; and controlling the sending of said mail storing said second script and said data.

* * * * *